(12) United States Patent
Polar Seminario et al.

(10) Patent No.: US 12,457,127 B2
(45) Date of Patent: Oct. 28, 2025

(54) INTERNET OF THINGS (IOT) INTELLIGENT ELECTRONIC DEVICES, SYSTEMS AND METHODS

(71) Applicant: EI ELECTRONICS LLC, Westbury, NY (US)

(72) Inventors: Jorge A. Polar Seminario, Westbury, NY (US); Luna A. Koval, Commack, NY (US); Erran Kagan, Great Neck, NY (US)

(73) Assignee: EI ELECTRONICS LLC, Westbury, NY (US)

(*) Notice: Subject to any disclaimer, the term of this patent is extended or adjusted under 35 U.S.C. 154(b) by 1170 days.

(21) Appl. No.: 15/257,142

(22) Filed: Sep. 6, 2016

(65) Prior Publication Data
US 2017/0063566 A1   Mar. 2, 2017

Related U.S. Application Data

(63) Continuation-in-part of application No. 15/173,955, filed on Jun. 6, 2016, now Pat. No. 10,771,532, and
(Continued)

(51) Int. Cl.
*H04L 12/28* (2006.01)
*G01D 4/00* (2006.01)
(Continued)

(52) U.S. Cl.
CPC ........ *H04L 12/2816* (2013.01); *G01D 4/004* (2013.01); *G01R 21/133* (2013.01); *G05B 19/042* (2013.01); *H04L 51/02* (2013.01); *H04L 63/029* (2013.01); *H04L 67/06* (2013.01); *H04L 67/12* (2013.01); *G01R 22/063* (2013.01);
(Continued)

(58) Field of Classification Search
CPC .. G06F 16/2358; H04L 12/2816; H04L 67/12
See application file for complete search history.

(56) References Cited

U.S. PATENT DOCUMENTS 2,883,255 A    4/1959   Anderson
2,987,704 A    6/1961   Gimpel et al.
(Continued)

FOREIGN PATENT DOCUMENTS

CN    101799681 A    8/2010
CN    111444240 A    7/2020
(Continued)

OTHER PUBLICATIONS

WhatIs.com, "What is a Network Interface Card?", https://www.techtarget.com/searchnetworking/definition/network-interface-card?_gl=1*13qjdky*_ga*NzA1MzE3NjAyLjE2Mzl3NzU5NjA.*_ga_TQKE4GS5P9*MTYzMjk1MDkzNC4yLjEuMTYzMjk1MTY3Ny4w&_ga=2.164813883.525309060.1632950935-705317602.1632775960, Sep. 27, 2021; 5 pp. (Year: 2021).*

(Continued)

Primary Examiner — Marc S Somers
(74) Attorney, Agent, or Firm — Robinson + Cole LLP

(57) ABSTRACT

The present disclosure is directed to an intelligent electronic device (IED) configured for use in an Internet of Things (IoT) environment. The IoT environment of the present disclosure may include one or more objects or things in addition to the IED coupled together via a network, where each device is configured for IoT communication.

19 Claims, 28 Drawing Sheets

Related U.S. Application Data a continuation-in-part of application No. 14/742,302, filed on Jun. 17, 2015, now Pat. No. 12,260,078, which is a continuation-in-part of application No. 13/831,708, filed on Mar. 15, 2013, now Pat. No. 10,275,840, said application No. 15/173,955 is a continuation-in-part of application No. 13/644,877, filed on Oct. 4, 2012, now abandoned, said application No. 13/831,708 is a continuation-in-part of application No. 13/644,877, filed on Oct. 4, 2012, now abandoned.

(60) Provisional application No. 62/214,423, filed on Sep. 4, 2015, provisional application No. 61/542,935, filed on Oct. 4, 2011.

(51) Int. Cl.
*G01R 21/133* (2006.01)
*G05B 19/042* (2006.01)
*H04L 9/40* (2022.01)
*H04L 51/02* (2022.01)
*H04L 67/06* (2022.01)
*H04L 67/12* (2022.01)
*G01R 22/06* (2006.01)

(52) U.S. Cl.
CPC ....... G05B 2219/2642 (2013.01); Y02B 90/20 (2013.01); Y04S 20/30 (2013.01); Y04S 40/18 (2018.05); Y04S 40/20 (2013.01)

(56) References Cited

U.S. PATENT DOCUMENTS

| | | | |
|---|---|---|---|
| 3,142,820 A | 7/1964 | Daniels | |
| 3,453,540 A | 7/1969 | Dusheck, Jr. | |
| 3,824,441 A | 7/1974 | Heyman et al. | |
| 4,246,623 A | 1/1981 | Sun | |
| 4,466,071 A | 8/1984 | Russell | |
| 4,489,386 A | 12/1984 | Breddan | |
| 4,884,021 A | 11/1989 | Hammond et al. | |
| 4,996,646 A | 2/1991 | Farrington | |
| 5,014,229 A | 5/1991 | Mofachern | |
| 5,166,887 A | 11/1992 | Farrington et al. | |
| 5,170,360 A | 12/1992 | Porter et al. | |
| 5,185,705 A | 2/1993 | Farrington | |
| 5,212,441 A | 5/1993 | McEachern et al. | |
| 5,224,054 A | 6/1993 | Wallis | |
| 5,233,538 A | 8/1993 | Wallis | |
| 5,237,511 A | 8/1993 | Caird et al. | |
| 5,298,854 A | 3/1994 | McEachern et al. | |
| 5,298,855 A | 3/1994 | McEachern et al. | |
| 5,298,856 A | 3/1994 | McEachern et al. | |
| 5,298,859 A | 3/1994 | McEachern et al. | |
| 5,298,885 A | 3/1994 | McEachern et al. | |
| 5,298,888 A | 3/1994 | McEachern et al. | |
| 5,300,924 A | 4/1994 | McEachern et al. | |
| 5,301,122 A | 4/1994 | Halpern | |
| 5,302,890 A | 4/1994 | McEachern et al. | |
| 5,307,009 A | 4/1994 | McEachern et al. | |
| 5,315,527 A | 5/1994 | Beckwith | |
| 5,347,464 A | 9/1994 | McEachern et al. | |
| 5,544,064 A | 8/1996 | Beckwith | |
| 5,559,719 A | 9/1996 | Johnson et al. | |
| 5,574,654 A | 11/1996 | Bingham et al. | |
| 5,581,173 A | 12/1996 | Yalla et al. | |
| 5,706,204 A | 1/1998 | Cox et al. | |
| 5,724,556 A | 3/1998 | Souder et al. | |
| 5,764,523 A | 6/1998 | Yoshinaga et al. | |
| 5,774,366 A | 6/1998 | Beckwith | |
| 5,796,977 A * | 8/1998 | Sarangdhar ............. | G06F 13/18 711/141 |
| 5,801,643 A | 9/1998 | Williams et al. | |
| 5,819,203 A | 10/1998 | Moore et al. | |
| 5,822,165 A | 10/1998 | Moran | |
| 5,832,210 A | 11/1998 | Akiyama et al. | |
| 5,874,903 A | 2/1999 | Shuey et al. | |
| 5,898,387 A | 4/1999 | Davis et al. | |
| 5,899,960 A | 5/1999 | Moore et al. | |
| 5,986,574 A | 11/1999 | Colton | |
| 6,018,690 A | 1/2000 | Saito et al. | |
| 6,028,857 A | 2/2000 | Poor | |
| 6,038,516 A | 3/2000 | Alexander et al. | |
| 6,073,169 A | 6/2000 | Shuey et al. | |
| 6,098,175 A | 8/2000 | Lee | |
| 6,100,817 A | 8/2000 | Mason, Jr. et al. | |
| 6,121,593 A * | 9/2000 | Mansbery ............... | A47J 27/62 219/495 |
| 6,151,653 A | 11/2000 | Lin et al. | |
| 6,157,329 A | 12/2000 | Lee et al. | |
| 6,167,329 A | 12/2000 | Engel et al. | |
| 6,195,614 B1 | 2/2001 | Kochan | |
| 6,279,037 B1 | 8/2001 | Tams et al. | |
| 6,289,267 B1 | 9/2001 | Alexander et al. | |
| 6,343,299 B1 | 1/2002 | Huang et al. | |
| 6,393,458 B1 | 5/2002 | Gigliotti et al. | |
| 6,396,839 B1 | 5/2002 | Ardalan et al. | |
| 6,405,128 B1 | 6/2002 | Bechtolsheim et al. | |
| 6,437,692 B1 | 8/2002 | Petite et al. | |
| 6,487,457 B1 | 11/2002 | Hull et al. | |
| 6,493,644 B1 | 12/2002 | Jonker et al. | |
| 6,496,511 B1 | 12/2002 | Wang et al. | |
| 6,519,537 B1 | 2/2003 | Yang | |
| 6,528,957 B1 | 3/2003 | Luchaco | |
| 6,560,608 B1 | 5/2003 | Tomm et al. | |
| 6,564,332 B1 | 5/2003 | Nguyen et al. | |
| 6,565,608 B1 | 5/2003 | Fein et al. | |
| 6,615,147 B1 | 9/2003 | Jonker et al. | |
| 6,636,030 B1 | 10/2003 | Rose et al. | |
| 6,657,552 B2 | 12/2003 | Belski et al. | |
| 6,671,654 B1 | 12/2003 | Forth et al. | |
| 6,671,802 B1 | 12/2003 | Ptt | |
| 6,717,394 B2 | 4/2004 | Elms | |
| 6,735,535 B1 | 5/2004 | Kagan et al. | |
| 6,751,563 B2 | 6/2004 | Spanier et al. | |
| 6,836,737 B2 | 12/2004 | Petite et al. | |
| 6,842,707 B2 | 1/2005 | Raichle et al. | |
| 6,900,738 B2 | 5/2005 | Crichlow | |
| 6,957,158 B1 | 10/2005 | Hancock et al. | |
| 6,972,364 B2 | 12/2005 | Diedrichsen | |
| 6,985,087 B2 | 1/2006 | Soliman | |
| 7,006,934 B2 | 2/2006 | Jonker et al. | |
| 7,010,438 B2 | 3/2006 | Hancock et al. | |
| 7,043,459 B2 | 5/2006 | Peevey | |
| 7,049,975 B2 | 5/2006 | Vanderah et al. | |
| 7,050,808 B2 | 5/2006 | Janusz et al. | |
| 7,072,779 B2 | 7/2006 | Hancock et al. | |
| 7,085,824 B2 | 8/2006 | Forth et al. | |
| 7,085,938 B1 | 8/2006 | Pozzuoli et al. | |
| 7,126,493 B2 | 10/2006 | Junker et al. | |
| 7,129,848 B2 | 10/2006 | Milliot et al. | |
| 7,203,319 B2 | 4/2007 | Ben-Zur et al. | |
| 7,243,050 B2 | 7/2007 | Armstrong | |
| 7,249,265 B2 | 7/2007 | Carolsfeld et al. | |
| 7,271,996 B2 | 9/2007 | Kagan et al. | |
| 7,299,308 B2 | 11/2007 | Kondo et al. | |
| 7,304,586 B2 | 12/2007 | Wang et al. | |
| 7,337,081 B1 | 2/2008 | Kagan | |
| 7,342,507 B2 | 3/2008 | Jonker et al. | |
| 7,436,687 B2 | 10/2008 | Patel | |
| 7,444,454 B2 | 10/2008 | Yancey et al. | |
| 7,511,468 B2 | 3/2009 | McEachern et al. | |
| 7,514,907 B2 | 4/2009 | Rajda et al. | |
| 7,616,656 B2 | 11/2009 | Wang et al. | |
| 7,668,663 B2 | 2/2010 | Kurnik et al. | |
| 7,702,779 B1 | 4/2010 | Gupta et al. | |
| 7,739,728 B1 | 6/2010 | Koehler et al. | |
| 7,813,822 B1 | 10/2010 | Hoffberg | |
| 7,899,630 B2 | 3/2011 | Kagan | |
| 7,916,015 B1 | 3/2011 | Evancich et al. | |
| 7,916,060 B2 | 3/2011 | Zhu et al. | |
| 7,921,199 B1 | 4/2011 | Shirriff et al. | |
| 7,961,736 B2 | 6/2011 | Ayyagari | |

(56) References Cited

U.S. PATENT DOCUMENTS

| | | | |
|---|---|---|---|
| 7,962,298 B2 | 6/2011 | Przydatek et al. | |
| 7,999,696 B2 | 8/2011 | Wang et al. | |
| 8,019,836 B2 | 9/2011 | Elliott et al. | |
| 8,024,073 B2* | 9/2011 | Imes | F24F 11/63 |
| | | | 700/276 |
| 8,078,418 B2 | 12/2011 | Banhegyesi et al. | |
| 8,160,824 B2 | 4/2012 | Spanier et al. | |
| 8,190,381 B2 | 5/2012 | Spanier et al. | |
| 8,193,929 B1 | 6/2012 | Siu et al. | |
| 8,250,246 B2 | 8/2012 | Brockmann et al. | |
| 8,335,936 B2 | 12/2012 | Jonsson et al. | |
| 8,402,267 B1 | 3/2013 | Graham et al. | |
| 8,599,036 B2 | 12/2013 | Wang et al. | |
| 8,635,036 B2 | 1/2014 | Pamulaparthy et al. | |
| 8,717,007 B2 | 5/2014 | Banhegyesi | |
| 8,812,979 B2 | 8/2014 | Khanke et al. | |
| 8,933,815 B2 | 1/2015 | Kagan et al. | |
| 9,080,894 B2 | 7/2015 | Spanier et al. | |
| 9,094,227 B2 | 7/2015 | Park | |
| 9,161,102 B2 | 10/2015 | Millstein et al. | |
| 9,268,552 B1 | 2/2016 | Kiiskila et al. | |
| 9,310,792 B2* | 4/2016 | Lu | G05B 19/042 |
| 9,660,994 B2 | 5/2017 | McQuillan et al. | |
| 10,303,860 B2 | 5/2019 | Koval et al. | |
| 10,972,556 B1 | 4/2021 | Cheng et al. | |
| 11,276,395 B1 | 3/2022 | Jones et al. | |
| 2002/0024453 A1 | 2/2002 | Maeda | |
| 2002/0032535 A1 | 3/2002 | Alexander et al. | |
| 2002/0048269 A1 | 4/2002 | Hong et al. | |
| 2002/0052972 A1 | 5/2002 | Yim | |
| 2002/0065872 A1 | 5/2002 | Genske et al. | |
| 2002/0073211 A1 | 6/2002 | Lin et al. | |
| 2002/0105435 A1 | 8/2002 | Yee et al. | |
| 2002/0120723 A1 | 8/2002 | Forth et al. | |
| 2002/0129342 A1 | 9/2002 | Kil et al. | |
| 2002/0133504 A1 | 9/2002 | Mahos et al. | |
| 2002/0162014 A1 | 10/2002 | Przydatek et al. | |
| 2002/0169570 A1 | 11/2002 | Spanier et al. | |
| 2002/0174223 A1 | 11/2002 | Childers et al. | |
| 2002/0188706 A1 | 12/2002 | Richards et al. | |
| 2003/0005130 A1 | 1/2003 | Cheng | |
| 2003/0014200 A1 | 1/2003 | Jonker et al. | |
| 2003/0065757 A1 | 4/2003 | Mentze et al. | |
| 2003/0084280 A1 | 5/2003 | Bryan et al. | |
| 2003/0093429 A1 | 5/2003 | Nishikawa et al. | |
| 2003/0110380 A1 | 6/2003 | Carolsfeld et al. | |
| 2003/0163508 A1 | 8/2003 | Goodman | |
| 2003/0178982 A1 | 9/2003 | Elms | |
| 2003/0179714 A1 | 9/2003 | Gilgenbach et al. | |
| 2003/0187550 A1 | 10/2003 | Wilson et al. | |
| 2003/0200285 A1 | 10/2003 | Hansen et al. | |
| 2003/0204756 A1* | 10/2003 | Ransom | G01D 4/004 |
| | | | 713/300 |
| 2003/0226058 A1 | 12/2003 | Miller et al. | |
| 2004/0078474 A1 | 4/2004 | Ramaswamy | |
| 2004/0088408 A1 | 5/2004 | Tsyganskiy | |
| 2004/0098459 A1* | 5/2004 | Leukert-Knapp | G06F 11/327 |
| | | | 709/206 |
| 2004/0107025 A1 | 6/2004 | Ransom et al. | |
| 2004/0122833 A1 | 6/2004 | Forth et al. | |
| 2004/0127775 A1 | 7/2004 | Miyazaki et al. | |
| 2004/0128260 A1 | 7/2004 | Amedure et al. | |
| 2004/0138834 A1 | 7/2004 | Blackett et al. | |
| 2004/0162642 A1 | 8/2004 | Gasper et al. | |
| 2004/0170181 A1 | 9/2004 | Bogdon et al. | |
| 2004/0172207 A1 | 9/2004 | Hancock et al. | |
| 2004/0177062 A1 | 9/2004 | Urquhart et al. | |
| 2004/0187028 A1 | 9/2004 | Perkins et al. | |
| 2004/0193329 A1 | 9/2004 | Ransom et al. | |
| 2004/0208182 A1 | 10/2004 | Boles et al. | |
| 2004/0243735 A1 | 12/2004 | Rosenbloom et al. | |
| 2004/0250059 A1 | 12/2004 | Ramelson et al. | |
| 2005/0027464 A1 | 2/2005 | Jonker et al. | |
| 2005/0033956 A1 | 2/2005 | Krempl | |
| 2005/0060110 A1 | 3/2005 | Jones et al. | |
| 2005/0093571 A1 | 5/2005 | Suaris et al. | |
| 2005/0138421 A1 | 6/2005 | Fedronic et al. | |
| 2005/0138432 A1 | 6/2005 | Ransom et al. | |
| 2005/0144437 A1 | 6/2005 | Ransom et al. | |
| 2005/0169309 A1 | 8/2005 | Tripathi et al. | |
| 2005/0183128 A1 | 8/2005 | Assayag et al. | |
| 2005/0187725 A1 | 8/2005 | Cox | |
| 2005/0202808 A1 | 9/2005 | Fishman et al. | |
| 2005/0234837 A1 | 10/2005 | Ramachandran et al. | |
| 2005/0240540 A1 | 10/2005 | Borleske et al. | |
| 2005/0253682 A1 | 11/2005 | Kato et al. | |
| 2005/0273280 A1 | 12/2005 | Cox | |
| 2005/0273281 A1* | 12/2005 | Wall | G01D 4/004 |
| | | | 702/60 |
| 2006/0020788 A1 | 1/2006 | Han et al. | |
| 2006/0047787 A1 | 3/2006 | Agarwal et al. | |
| 2006/0052958 A1 | 3/2006 | Hancock et al. | |
| 2006/0066456 A1 | 3/2006 | Jonker et al. | |
| 2006/0066903 A1 | 3/2006 | Shiimori | |
| 2006/0083260 A1 | 4/2006 | Wang et al. | |
| 2006/0085419 A1 | 4/2006 | Rosen | |
| 2006/0089932 A1 | 4/2006 | Buehler et al. | |
| 2006/0145890 A1 | 7/2006 | Junker et al. | |
| 2006/0155422 A1 | 7/2006 | Uy et al. | |
| 2006/0155442 A1 | 7/2006 | Luo et al. | |
| 2006/0161360 A1 | 7/2006 | Yao et al. | |
| 2006/0161400 A1 | 7/2006 | Kagan | |
| 2006/0200599 A1 | 9/2006 | Manchester et al. | |
| 2006/0206433 A1 | 9/2006 | Scoggins | |
| 2006/0265720 A1 | 11/2006 | Cai et al. | |
| 2006/0267560 A1 | 11/2006 | Rajda et al. | |
| 2006/0274899 A1 | 12/2006 | Zhu et al. | |
| 2007/0047735 A1 | 3/2007 | Celli et al. | |
| 2007/0058634 A1 | 3/2007 | Gupta et al. | |
| 2007/0061786 A1 | 3/2007 | Zhou et al. | |
| 2007/0067119 A1 | 3/2007 | Loewen et al. | |
| 2007/0067121 A1 | 3/2007 | Przydatek et al. | |
| 2007/0096765 A1 | 5/2007 | Kagan | |
| 2007/0096942 A1* | 5/2007 | Kagan | G01D 4/002 |
| | | | 340/870.02 |
| 2007/0106618 A1 | 5/2007 | Wu et al. | |
| 2007/0114987 A1 | 5/2007 | Kagan | |
| 2007/0120705 A1 | 5/2007 | Kiiskila et al. | |
| 2007/0136236 A1 | 6/2007 | Kussmaul et al. | |
| 2007/0152058 A1 | 7/2007 | Yeakley et al. | |
| 2007/0186111 A1 | 8/2007 | Durand | |
| 2007/0240159 A1 | 10/2007 | Sugiyama | |
| 2007/0255861 A1 | 11/2007 | Kain et al. | |
| 2007/0263643 A1 | 11/2007 | Wadhawan | |
| 2007/0266004 A1 | 11/2007 | Wall et al. | |
| 2008/0028395 A1 | 1/2008 | Motta et al. | |
| 2008/0033920 A1 | 2/2008 | Colclasure et al. | |
| 2008/0046205 A1 | 2/2008 | Gilbert et al. | |
| 2008/0052384 A1 | 2/2008 | Marl et al. | |
| 2008/0071482 A1 | 3/2008 | Zweigle et al. | |
| 2008/0074285 A1 | 3/2008 | Guthrie | |
| 2008/0077806 A1 | 3/2008 | Cui et al. | |
| 2008/0086222 A1 | 4/2008 | Kagan | |
| 2008/0103631 A1 | 5/2008 | Koliwad et al. | |
| 2008/0104149 A1 | 5/2008 | Vishniac et al. | |
| 2008/0130639 A1 | 6/2008 | Costa-Requena et al. | |
| 2008/0147334 A1 | 6/2008 | Kagan | |
| 2008/0168434 A1 | 7/2008 | Gee et al. | |
| 2008/0172192 A1 | 7/2008 | Banhegyesi | |
| 2008/0187116 A1 | 8/2008 | Reeves et al. | |
| 2008/0195562 A1 | 8/2008 | Worth et al. | |
| 2008/0195794 A1 | 8/2008 | Banker | |
| 2008/0201723 A1 | 8/2008 | Bottaro et al. | |
| 2008/0215264 A1 | 9/2008 | Spanier et al. | |
| 2008/0228830 A1 | 9/2008 | Hawtin | |
| 2008/0234957 A1 | 9/2008 | Banhegyesi et al. | |
| 2008/0235355 A1 | 9/2008 | Spanier et al. | |
| 2008/0238406 A1 | 10/2008 | Banhegyesi | |
| 2008/0238713 A1 | 10/2008 | Banhegyesi et al. | |
| 2008/0243404 A1 | 10/2008 | Banhegyesi | |
| 2009/0012728 A1 | 1/2009 | Spanier et al. | |
| 2009/0037163 A1 | 2/2009 | Kong et al. | |
| 2009/0055912 A1 | 2/2009 | Choi et al. | |
| 2009/0070168 A1 | 3/2009 | Thompson et al. | |

(56) References Cited

U.S. PATENT DOCUMENTS

| | | | |
|---|---|---|---|
| 2009/0070447 A1* | 3/2009 | Jubinville | H04L 67/025 709/223 |
| 2009/0082879 A1 | 3/2009 | Dooley et al. | |
| 2009/0082980 A1 | 3/2009 | Thurmond et al. | |
| 2009/0094317 A1 | 4/2009 | Venkitaraman | |
| 2009/0096654 A1 | 4/2009 | Zhu et al. | |
| 2009/0115626 A1 | 5/2009 | Vaswani et al. | |
| 2009/0119476 A1 | 5/2009 | Jernigan et al. | |
| 2009/0172519 A1 | 7/2009 | Xu et al. | |
| 2009/0190486 A1 | 7/2009 | LaVigne et al. | |
| 2009/0196187 A1 | 8/2009 | Ooba et al. | |
| 2009/0196206 A1 | 8/2009 | Weaver et al. | |
| 2009/0228224 A1 | 9/2009 | Spanier et al. | |
| 2009/0235075 A1 | 9/2009 | Cho et al. | |
| 2009/0235090 A1 | 9/2009 | Chang | |
| 2009/0276102 A1 | 11/2009 | Smith et al. | |
| 2009/0292894 A1 | 11/2009 | Henry et al. | |
| 2009/0300165 A1* | 12/2009 | Tuckey | G05B 23/0224 709/224 |
| 2009/0307178 A1 | 12/2009 | Kuhns et al. | |
| 2009/0327483 A1 | 12/2009 | Thompson et al. | |
| 2010/0004350 A1 | 1/2010 | Zalich et al. | |
| 2010/0030734 A1 | 2/2010 | Chunilal | |
| 2010/0031076 A1 | 2/2010 | Wan et al. | |
| 2010/0054276 A1 | 3/2010 | Wang et al. | |
| 2010/0057387 A1 | 3/2010 | Kagan et al. | |
| 2010/0057628 A1 | 3/2010 | Trinidad et al. | |
| 2010/0058355 A1 | 3/2010 | Gernaey | |
| 2010/0073192 A1 | 3/2010 | Goldfisher et al. | |
| 2010/0094851 A1 | 4/2010 | Bent et al. | |
| 2010/0121996 A1 | 5/2010 | Schmidt et al. | |
| 2010/0169709 A1 | 7/2010 | Chiu et al. | |
| 2010/0169876 A1 | 7/2010 | Mann | |
| 2010/0175062 A1 | 7/2010 | Kim | |
| 2010/0217871 A1 | 8/2010 | Gammon | |
| 2010/0238003 A1 | 9/2010 | Chan et al. | |
| 2010/0278187 A1 | 11/2010 | Hart et al. | |
| 2010/0299441 A1 | 11/2010 | Hughes et al. | |
| 2010/0324845 A1 | 12/2010 | Spanier et al. | |
| 2011/0004350 A1 | 1/2011 | Cheifetz et al. | |
| 2011/0004426 A1 | 1/2011 | Wright et al. | |
| 2011/0015961 A1 | 1/2011 | Chan | |
| 2011/0016021 A1 | 1/2011 | Manning | |
| 2011/0029461 A1 | 2/2011 | Hardin, Jr. | |
| 2011/0040809 A1 | 2/2011 | Spanier et al. | |
| 2011/0069709 A1* | 3/2011 | Morris | H04L 47/527 370/394 |
| 2011/0072423 A1 | 3/2011 | Fukata | |
| 2011/0078305 A1 | 3/2011 | Varela | |
| 2011/0093843 A1 | 4/2011 | Endo et al. | |
| 2011/0106589 A1 | 5/2011 | Blomberg et al. | |
| 2011/0107357 A1 | 5/2011 | Cullimore | |
| 2011/0157837 A1* | 6/2011 | Balgard | G05B 19/0426 361/728 |
| 2011/0178651 A1 | 7/2011 | Choi et al. | |
| 2011/0184671 A1 | 7/2011 | Abiprojo et al. | |
| 2011/0282508 A1 | 11/2011 | Goutard et al. | |
| 2011/0296496 A1 | 12/2011 | O'Donnell et al. | |
| 2012/0041696 A1 | 2/2012 | Sanderford et al. | |
| 2012/0059932 A1 | 3/2012 | Messer et al. | |
| 2012/0078547 A1 | 3/2012 | Murdoch | |
| 2012/0079471 A1 | 3/2012 | Vidal et al. | |
| 2012/0099478 A1 | 4/2012 | Fu et al. | |
| 2012/0109999 A1 | 5/2012 | Futty et al. | |
| 2012/0126995 A1 | 5/2012 | Sobotka et al. | |
| 2012/0173032 A1 | 7/2012 | Pamulaparthy et al. | |
| 2012/0209057 A1 | 8/2012 | Siess et al. | |
| 2012/0216244 A1 | 8/2012 | Kumar et al. | |
| 2012/0245595 A1 | 9/2012 | Kesavadas et al. | |
| 2012/0265357 A1 | 10/2012 | Song et al. | |
| 2012/0299744 A1 | 11/2012 | Sfaelos | |
| 2013/0055389 A1 | 2/2013 | Alvarez et al. | |
| 2013/0066965 A1 | 3/2013 | Foti | |
| 2013/0073059 A1* | 3/2013 | Brian | G05B 15/02 700/17 |
| 2013/0073374 A1 | 3/2013 | Heath | |
| 2013/0084882 A1 | 4/2013 | Khorashadi et al. | |
| 2013/0103657 A1 | 4/2013 | Ikawa et al. | |
| 2013/0151849 A1 | 6/2013 | Graham et al. | |
| 2013/0158918 A1 | 6/2013 | Spanier et al. | |
| 2013/0198507 A1 | 8/2013 | Kasuya | |
| 2013/0200702 A1 | 8/2013 | Schöppner | |
| 2013/0293390 A1 | 11/2013 | Buhan et al. | |
| 2013/0318627 A1 | 11/2013 | Lundkvist et al. | |
| 2014/0025321 A1 | 1/2014 | Spanier | |
| 2014/0058572 A1 | 2/2014 | Stein et al. | |
| 2014/0094194 A1 | 4/2014 | Schwent et al. | |
| 2014/0149836 A1 | 5/2014 | Bedard et al. | |
| 2014/0172885 A1 | 6/2014 | Sekharan | |
| 2014/0236371 A1 | 8/2014 | Ishihara et al. | |
| 2014/0277788 A1 | 9/2014 | Forbes, Jr. | |
| 2014/0281620 A1 | 9/2014 | Rallo et al. | |
| 2014/0325679 A1 | 10/2014 | Heo et al. | |
| 2015/0089061 A1 | 3/2015 | Li et al. | |
| 2015/0143108 A1 | 5/2015 | Demeter et al. | |
| 2015/0178865 A1 | 6/2015 | Anderson et al. | |
| 2015/0185748 A1 | 7/2015 | Ishchenko et al. | |
| 2015/0286394 A1 | 10/2015 | Koval | |
| 2015/0294013 A1 | 10/2015 | Ozer | |
| 2015/0316907 A1 | 11/2015 | ElBsat et al. | |
| 2015/0317151 A1 | 11/2015 | Falcy et al. | |
| 2015/0317589 A1 | 11/2015 | Anderson et al. | |
| 2015/0324896 A1 | 11/2015 | Marson et al. | |
| 2015/0341969 A1 | 11/2015 | Brochu et al. | |
| 2016/0011616 A1* | 1/2016 | Janous | G05B 15/02 700/297 |
| 2016/0034437 A1 | 2/2016 | Yong et al. | |
| 2016/0156184 A1 | 6/2016 | Sharma et al. | |
| 2016/0283256 A1 | 9/2016 | Standley et al. | |
| 2016/0294953 A1 | 10/2016 | Prabhakar et al. | |
| 2016/0359684 A1* | 12/2016 | Rizqi | H04L 41/147 |
| 2016/0364648 A1 | 12/2016 | Du et al. | |
| 2017/0011320 A1 | 1/2017 | Anderson et al. | |
| 2017/0039372 A1 | 2/2017 | Koval et al. | |
| 2017/0063566 A1 | 3/2017 | Seminario et al. | |
| 2017/0140149 A1 | 5/2017 | Dumas et al. | |
| 2017/0147329 A1 | 5/2017 | Shutt et al. | |
| 2017/0162320 A1 | 6/2017 | Rumrill | |
| 2017/0180137 A1 | 6/2017 | Spanier et al. | |
| 2017/0185056 A1 | 6/2017 | Satou | |
| 2017/0238805 A1 | 8/2017 | Addison et al. | |
| 2017/0270414 A1 | 9/2017 | Ignatova et al. | |
| 2017/0285114 A1 | 10/2017 | Bickel et al. | |
| 2017/0317495 A1 | 11/2017 | Pavlovski et al. | |
| 2017/0373500 A1 | 12/2017 | Shafi et al. | |
| 2018/0025423 A1 | 1/2018 | Utsumi et al. | |
| 2018/0066860 A1 | 3/2018 | Carlson et al. | |
| 2018/0260695 A1 | 9/2018 | Majumdar et al. | |
| 2018/0260920 A1 | 9/2018 | Saratsis et al. | |
| 2018/0275898 A1 | 9/2018 | Bhansali et al. | |
| 2019/0086891 A1 | 3/2019 | Kawamoto et al. | |
| 2019/0102411 A1 | 4/2019 | Hung et al. | |
| 2019/0138964 A1 | 5/2019 | Morita et al. | |
| 2019/0205116 A1 | 7/2019 | Chen et al. | |
| 2019/0260204 A1 | 8/2019 | Koval et al. | |
| 2019/0340545 A1 | 11/2019 | Minegishi et al. | |
| 2019/0349733 A1 | 11/2019 | Nolan et al. | |
| 2020/0143522 A1 | 5/2020 | Vogels et al. | |
| 2020/0266628 A1 | 8/2020 | Kato et al. | |

FOREIGN PATENT DOCUMENTS

| | | |
|---|---|---|
| JP | 2001312712 A | 11/2001 |
| JP | 2009225629 A | 10/2009 |
| KR | 101522175 B1 | 5/2015 |
| WO | 2008099035 A1 | 8/2008 |

(56) References Cited

FOREIGN PATENT DOCUMENTS

WO  2009044369 A2  4/2009
WO  2009044369 A3  5/2009

OTHER PUBLICATIONS

The Study Genius, "What is NIC (Network Interface Card)? How NIC works?", https://web.archive.org/web/20201117135313/https://www.thestudygenius.com/what-is-nic-network-interface-card/, 9 pp., Nov. 17, 2020 (Year: 2020).*
ION Technology, 7500 ION 7600 ION High Visibility Energy & Power Quality Compliance Meters, Power Measurement, specification, pp. 1-8, revision date Nov. 30, 2000.
Microsoft TechNet, Using DNS Servers with DHCP, Jan. 21, 2005; Accessed from https://technet.microsoft.com/en-us/library/cc787034 on Jun. 9, 2015; pp. 1-4.
"Use Excel As A Web Browser" at https://www.youtube.com/watch?v=A7LukCXev78 (Year: 2010). 1 pp.
Allard, Jeremie, et al., "Jini meets UPnP: an architecture for Jini/UPnP interoperability.", Proceedings of the 2003 Symposium on Applications and the Internet, 2003. IEEE, 2003, 8 pages.
Braden, R (editor), "Requirements for Internet Hosts—Application and Support", RFC 1123, pp. 1-97, Oct. 1989.
Chima, Chikodi, "How Social Media Will Make the smart Energy Grid More Efficient", mashable.com, Feb. 8, 2011, pp. 1-4.
Codingfreak, "https://web.archive.org/web/201 00426123449/http://codingfreak.blogspot.com/201 0/01 /iptables-rate-limitincoming.htm", Apr. 26, 2010, 3 pp.
Communicator EXT 3.0 User Manual Revision 1.32, Electro Industries/Gauge Tech, 558 pages, Aug. 27, 2007.
Crockford, Douglas, "https://web.archive.org/web/20030621 080211/http://www.crockford.com/javascript/jsmin.html", Oct. 28, 2002, 2 pp.
Deutsch, P., Emtage, A., and Marine, A., "How to Use Anonymous FTP", RFC1635, pp. 1-13, May 1994.
Duncan, Brent K. et al., "Protection, metering, monitoring, and control of medium-voltage power systems.", IEEE Transactions on Industry Applications, vol. 40, No. 1, Jan./Feb. 2004; pp. 33-40.
Futura+Series, "Advanced Power Monitoring and Analysis for the 21st Century", Electro Industries/Gauge Tech, specification, 8 pages, Apr. 13, 2000.
Gonzales, Jesus and Papa, Mauricio, "Passive Scanning in Modbus Networks;" 2008, in IFIP International Federation for Information Processing, vol. 253, Critical Infrastructure Protection; 2008; pp. 175-187.
Hubbert, "What is flat file?", WhatIs.com, http://searchsqlserver.techtarget.com/definition/flat-file, Jul. 2006, 1 pp.
HW Virtual Serial Port, "HW Virtual Serial Port" Jul. 2003, http://www.trcontrolsolutions.com/pdfs/hw_vsp_v104_en.pdf; pp. 1-4.
IEC 61000-4-15: Electromagnetic compatibility (EMC) Part 4: Testing and measuring techniques, Section 15: Flickermeter-Functional and design specifications; CENELEC—European Committee for Electrotechnical Standardization; pp. 1-25; Apr. 1998.
ION Technology 7700 ION 3-Phase Power Meter, Analyzer and Controller, Power Measurement, specification, pp. 1-10, revision date Dec. 8, 1998.
ION Technology, 7500 ION High Visibility 3-Phase Energy & Power Quality Meter, Power Measurement, specification, pp. 1-8, revision date Mar. 21, 2000.
ION7550/ion7650 PowerLogic power-monitoring units, Technical data sheets, pp. 1-12, Copyright 2006 Schneider Electric.
Natarajan "4 Easy Steps to Upgrade Linksys Wireless Router" thegeekstuff.com, 2009, 3 pages. retreived from https://www.thegeekstuff.com/2009/06/how-to-upgrade-linksys-wireless-router-firmware on Jun. 7, 2019 (Year: 2009).
Nexus 1250 Installation and Operation Manual Revision 1.20, Electro Industries/Gauge Tech, 50 pages, Nov. 8, 2000.
Nexus 1250, Precision Power Meter & Data Acquisition Node, Accumeasure Technology, Electro Industries/Gauge Tech, specification, 16 pages, Nov. 1999.
Performance Power Meter & Data Acquisition Node, Electro Industries/Gauge Tech, Nexus 1250 specification, 8 pages, Dec. 14, 2000, 8 pp.
Postel, J.B., and Reynolds, J.K. "File Transfer Protocol (FTP)", RFC959, pp. 1-66, Oct. 1985.
PowerLogic Series 4000 Circuit Monitors, pp. 1-4; Document #3020HO0601; Jan. 2006.
RFC2228 FTP Security Extensions; Network Working Group, Internet Society, 1997; Retrieved from https://tools.ietf.org/html/rfc2228 Apr. 18, 2019; (Year: 1997); pp. 1-28.
Speirs, "What is binary file?", WhatIs.com, http://whatis.techtarget.com/definition/binary-file, Apr. 2005, 1 pp.
UPnP Forum, "UPnP Device Architecture 1.0", Rev. Apr. 24, 2008, pp. 1-80.
User's Installation & Operation and User's Programming Manual. The Futura Series, Electro Industries, pp. 1-64, Copyright 1995.
White, Russ, "Working with IP addresses"; http://web.archive.org/web/20060508172602/http://www.cisco.com/web/about/ac123/ac147/archived_issues/ipj_9-1/ip_addresses.tml, May 8, 2006; Copyright 1992-2006 Cisco Systems, Inc., pp. 1-8.
Wikipedia, Burst mode (computing), https://web.archive.org/web/20081018044345/http://en.wikipedia.org/wiki/Burst_mode_(computing), Oct. 18, 2008, 1 pp.
Wikipedia, File Transfer Protocol, https://web.archive.org/web/20051216071210/http:en.wikipedia.org/wiki/File_Transfer_Protocol, Dec. 16, 2005, 9 pp.
Wikipedia, Universal Plug and Play, https://web.archive.org/web/2001014015536/http://en.wikipedia.org/wiki/Universal_Plug_and_Play, Oct. 14, 2007, 14 pp.
Wils, Andrew, et al., "Device discovery via residential gateways.", IEEE Transactions on Consumer Electronics, vol. 48, No. 3; Aug. 2002; pp. 478-483.
Yum, Secured Remote Data, Manual p. 2012; Retrieved from yum.baseurl.org/wiki/securedRemoteData on Apr. 18, 2019. (Dated Reference from Archive.org attached) (Year: 2012) pp. 1-2.
Zeinalipour-Yazti et ai, MicroHash: An Efficient Index Structure for Flash-Based Sensor Devices, Proceedings of the 4th Conference on USENIX Conference on File and Storage Technologies, vol. 4, Dec. 2005, pp. 14.
Zhang, Chun, et al., "On supporting containment queries in relational database management systems.", ACM SIGMOD Record. vol 30. No. 2. ACM, 2001; pp. 425-436.
Microsoft, Computer Dictionary, 2002, 5th Ed. (Year: 2002) Definition of Javascript, 3 pp.
Paladion, https://www.paladion.net/blogs/introduction-to-code-obfuscation, 2004 (Year: 2004), 52 pp.
Wikipedia, User Datagram Protocol, https://web.archive.org/web/20050823032448/https://en. wikipedia .org/wiki/User_Datagram_Protocol, Aug. 23, 2005, 2 pp. (Year: 2005).
"The Debian New Maintainer's Guide", Debian.org, 2011, Chapters 1, 6, and 8. retrieved from https:/lweb.archive.org/web/2011 051401193B/http://www.debian.org/doc/manuals/maint-guide/start.en.html (April 2B, 2021). (Year: 2011).
Microsoft, Microsoft Computer Dictionary, 5th Ed. 2002; pp. 174, 215, and 276 (excerpt includes table of contents and frontmatter). (Year: 2002).
Trunov, A.S., Voronova, L.I., Voronov, V.I., Sukhachev, D.I. and Strelnikov, V.G., Mar. 2018. Legacy applications modelintegration to support scientific experiment. In 2018 Systems of Signals Generating and Processing in the Field of on BoardCommunications (pp. 1-7). IEEE. (Year: 2018).
Tufekci, P., 2014. Prediction of full load electrical power output of a base load operated combined cycle power plant using machinelearning methods. International Journal of Electrical Power & Energy Systems, 60, pp. 126-140. (Year: 2014).
Andersen, M.P. and Culler, D.E., 2016. Btrdb: Optimizing storage system design for timeseries processing. In 14th {USENIX} Conference on File and Storage Technologies ({FAST} 16) (pp. 39-52). (Year: 2016).

(56) References Cited

OTHER PUBLICATIONS

Dong Yu, Wayne Xiong, Jasha Droppo, Andreas Stolcke, Guoli Ye, Jinyu Li, Geoffrey Zweig, 2016. Proc. Interspeech: Deep Convolutional Neural Networks with Layer-wise Context Expansion and Attention, 5 pages, Sep. 2016.

Janetzko, H., Stoffel, F., Mittelstadt, S. and Keim, DA, 2014. Anomaly detection for visual analytics of power consumption data. Computers & Graphics, 38, pp. 27-37. (Year: 2014).

Kezunovic, M., 2011. Smart fault location for smart grids. IEEE transactions on smart grid, 2(1), pp. 11-22. (Year: 2011).

Pan, J., Zi, Y., Chen, J., Zhou, Z. and Wang, B., 2017. LiftingNet: A novel deep learning network with layerwise feature earningfrom noisy mechanical data for fault classification. I EEE Transactions on Industrial Electronics, 65(6), pp. 4973-4982. (Year: 2017).

Milanovic, J.V., Aung, M.T. and Gupta, C.P., 2005. The influence of fault distribution on stochastic prediction of voltage sags. IEEE Transactions on Power Delivery, 20(1), pp. 278-285. (Year:2005).

Wikipedia, Dojo Toolkit, hUps://web.archive.org/web/20130201004903/hUps://en.wikipedia.org/wiki/Dojo_Toolkit, Feb. 1, 2013, 10 pp.(Year: 2013).

Xia et al. 2018 IEEE Access, "Secure Session Key Management Scheme for Meter-Reading System Based on LoRa Technology", pp. 75015-75024 (Year: 2018).

Wiratama et al., "Gas Billing System based on Automatic Meter Reading on Diaphragm Gas Meter with Email Notification", IEEE, 2018 International Electronics Symposium on Knowledge Creation and Intelligent Computing (IES-KCIC), 2018, pp. 395-402.

\* cited by examiner

Figure 11 - Block diagram of the email Alarm/Notification Implementation

Figure 12- Flowchart of the Event Buffering implemented in the DSP Side

Figure 13 - Flowchart of the Event Poller implemented in the network card side

Figure 14 - Event Classification Flow Chart

Email formatter flow chart

Figure 16 - State machine of the function used to send the message through SMTP (client)

FIG. 21 – Plain text view of Alarm/Notification email Implementation

FIG. 22 – HTML view of Alarm/Notification email Implementation

INTERNET OF THINGS (IOT) INTELLIGENT ELECTRONIC DEVICES, SYSTEMS AND METHODS

PRIORITY

This application claims priority to U.S. Provisional Patent Application No. 62/214,423 filed Sep. 4, 2015, entitled "INTELLIGENT ELECTRONIC DEVICE COMMUNICATION SOLUTIONS FOR NETWORK TOPOLOGIES", the contents of which are hereby incorporated by reference in its entirety.

This application is a continuation-in-part application of U.S. patent application Ser. No. 15/173,955 filed on Jun. 6, 2016, which is a continuation-in-part application of U.S. patent application Ser. No. 13/644,877 filed on Oct. 4, 2012, which claims priority to U.S. Provisional Patent Application No. 61/542,935 filed Oct. 4, 2011, the contents of all of which are hereby incorporated by reference in their entireties.

This application is a continuation-in-part application of U.S. patent application Ser. No. 14/742,302 filed on Jun. 17, 2015, which is a continuation-in-part application of U.S. patent application Ser. No. 13/831,708 filed on Mar. 15, 2013, which is a continuation-in-part application of U.S. patent application Ser. No. 13/644,877 filed on Oct. 4, 2012, which claims priority to U.S. Provisional Patent Application No. 61/542,935 filed Oct. 4, 2011, the contents of all of which are hereby incorporated by reference in their entireties.

BACKGROUND

Field

The present disclosure relates generally to intelligent electronic devices (IEDs) and, in particular, to a system and method for sending/receiving data to/from intelligent electronic devices (IEDs) at high speeds over a network. More particularly, the present disclosure is directed to Alarm/Notification email functionality of an intelligent electronic device.

Description of the Related Art

Monitoring of electrical energy by consumers and providers of electric power is a fundamental function within any electric power distribution system. Electrical energy may be monitored for purposes of usage, equipment performance and power quality. Electrical parameters that may be monitored include volts, amps, watts, vars, power factor, harmonics, kilowatt hours, kilovar hours and any other power related measurement parameters. Typically, measurement of the voltage and current at a location within the electric power distribution system may be used to determine the electrical parameters for electrical energy flowing through that location.

Devices that perform monitoring of electrical energy may be electromechanical devices, such as, for example, a residential billing meter or may be an intelligent electronic device ("IED"). Intelligent electronic devices typically include some form of a processor. In general, the processor is capable of using the measured voltage and current to derive the measurement parameters. The processor operates based on a software configuration. A typical consumer or supplier of electrical energy may have many intelligent electronic devices installed and operating throughout their operations. IEDs may be positioned along the supplier's distribution path or within a customer's internal distribution system. IEDs include revenue electric watt-hour meters, protection relays, programmable logic controllers, remote terminal units, fault recorders and other devices used to monitor and/or control electrical power distribution and consumption IEDs are widely available that make use of memory and microprocessors to provide increased versatility and additional functionality. Such functionality includes the ability to communicate with remote computing systems, either via a direct connection, e.g., a modem, a wireless connection or a network IEDs also include legacy mechanical or electromechanical devices that have been retrofitted with appropriate hardware and/or software allowing integration with the power management system.

Typically, an IED is associated with a particular load or set of loads that are drawing electrical power from the power distribution system. The IED may also be capable of receiving data from or controlling its associated load. Depending on the type of IED and the type of load it may be associated with, the IED implements a power management function that is able to respond to a power management command and/or generate power management data. Power management functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof.

Conventional IEDs include the ability to communicate with remote computing systems. Traditionally, IEDs would transfer data using serial based download commands. These commands would be accessed via an RS232, and RS485 or an Ethernet port encapsulating the serial request with an Ethernet message using any Ethernet protocol such as Hypertext Transfer Protocol (HTTP) or Transmission Control Protocol/Internet Protocol (TCP/IP). For instance, host software or a "master" would make a request for a set of data from one or more memory registers in an IED slave. At that point, the IED slave would then communicate the data stored in the memory registers back to the host software utilizing a serial transfer. This technology is inherently limited because host software traditionally is limited by the amount of memory registers that it would be able to accept at any one time. For example, if the serial based protocol is Modbus, a recognized industry standard protocol, most software master systems are limited by the protocol definition to 255 bytes of data that can be transferred at any one time. Thus, to pull large amount of data, many such requests would have to be sent to the IED or meter repeatedly. This would create many delays due to processing and data traffic.

SUMMARY

In accordance with embodiments of the present disclosure, there are provided herein methods and systems for improving data transfer from an intelligent electronic device (IED) to external devices, such as servers, PC clients, other IEDs, etc., via a network interface. In one embodiment, the present disclosure is directed to an Alarm/Notification email feature of an intelligent electronic device.

The email Alarm/Notification feature, allows the meter or intelligent electronic device (IED) to send messages via Simple Mail Transfer Protocol (email), when important events happen in the meter. The email sent may include user selectable metering values, useful to get an idea to the user of the reason of event. Basically, the user configures some parameters as, which events are important, which aren't and do not need of monitoring, what metering values should be included in the email message, and the recipient of the message. There are two levels of importance the user can configure. The first, low importance is called Notification email. The second, high importance is called Alarm email. Notification emails are sent within a configurable periodicity. This means the user can select how often the Notification emails should be sent by the meter in the case of selected events are detected. If several events happen in between the selected periodicity for sending the emails, the events are queued and grouped together when possible. Thus when the email comes out, it comes like a digest with all events that happened since the last email was sent. Alarm emails are sent within approximately one minute when the event happens. Since these are high importance events, they will take precedence over the Notification emails (when sending). If multiple events happen, they are sent in the order they happened and they are not grouped, unless the event itself carries multiple events at the same time. The user can select extra information to be sent in the email message, either Notification or Alarm. This data is the data captured from the meter around one second when the event happened.

In one aspect of the present disclosure, an IED is provided including at least one sensor coupled to an electrical distribution system, the at least one sensor configured to measure at least one parameter of the electrical distribution system and generate at least one analog signal indicative of the at least one parameter; at least one analog-to-digital (A/D) converter configured to receive the at least one analog signal and convert the at least one analog signal to at least one digital signal; at least one processor configured to receive the at least one digital signal and calculate at least one power parameter of the electrical distribution system; and a network communication card configured for Internet of Things (IoT) communication and coupled to a network, wherein the network communication card receives at least one first request from at least one first device coupled to the network requesting a list of all available resources of the IED, wherein the at least one processor generates at least one first response including a list of all available resources of the IED to the at least one first request and the network communication card sends the at least one first response to the at least one first device.

In another aspect of the present disclosure, a method is provided including: connecting, by a network communication card, to a network, the network communication card configured for IoT communication; receiving, by the network communication card, at least one first request from at least one first device connected to the network requesting a list of all available resources of an IED, the at least one first device also configured for IoT communication; generating, by at least one processor, at least one first response including a list of all available resources of the IED to the at least one first request; and sending, by the network communication card, the at least one first response to the at least one first device.

In yet another aspect of the present disclosure, a system is provided including: a network; at least one first device coupled to the network and configured for IoT communication, wherein the at least one first device is configured to send at least one first request to at least one IED requesting a list of all available resource of the IED; the least one IED including: at least one sensor coupled to an electrical distribution system, the at least one sensor configured to measure at least one parameter of the electrical distribution system and generate at least one analog signal indicative of the at least one parameter; and at least one A/D converter configured to receive the at least one analog signal and convert the at least one analog signal to at least one digital signal; at least one processor configured to receive the at least one digital signal and calculate at least one power parameter of the electrical distribution system; and a network communication card configured for IoT communication, the network communication card coupled to the network, wherein the network communication card receives the at least one first request from the at least one first device and the at least one processor generates at least one first response to the at least one first request and the network communication card sends the at least one first response to the at least one first device, the at least one first response including a list of all available resources of the at least one IED, and wherein the at least one first device receives the at least one first response.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

Figure 1:
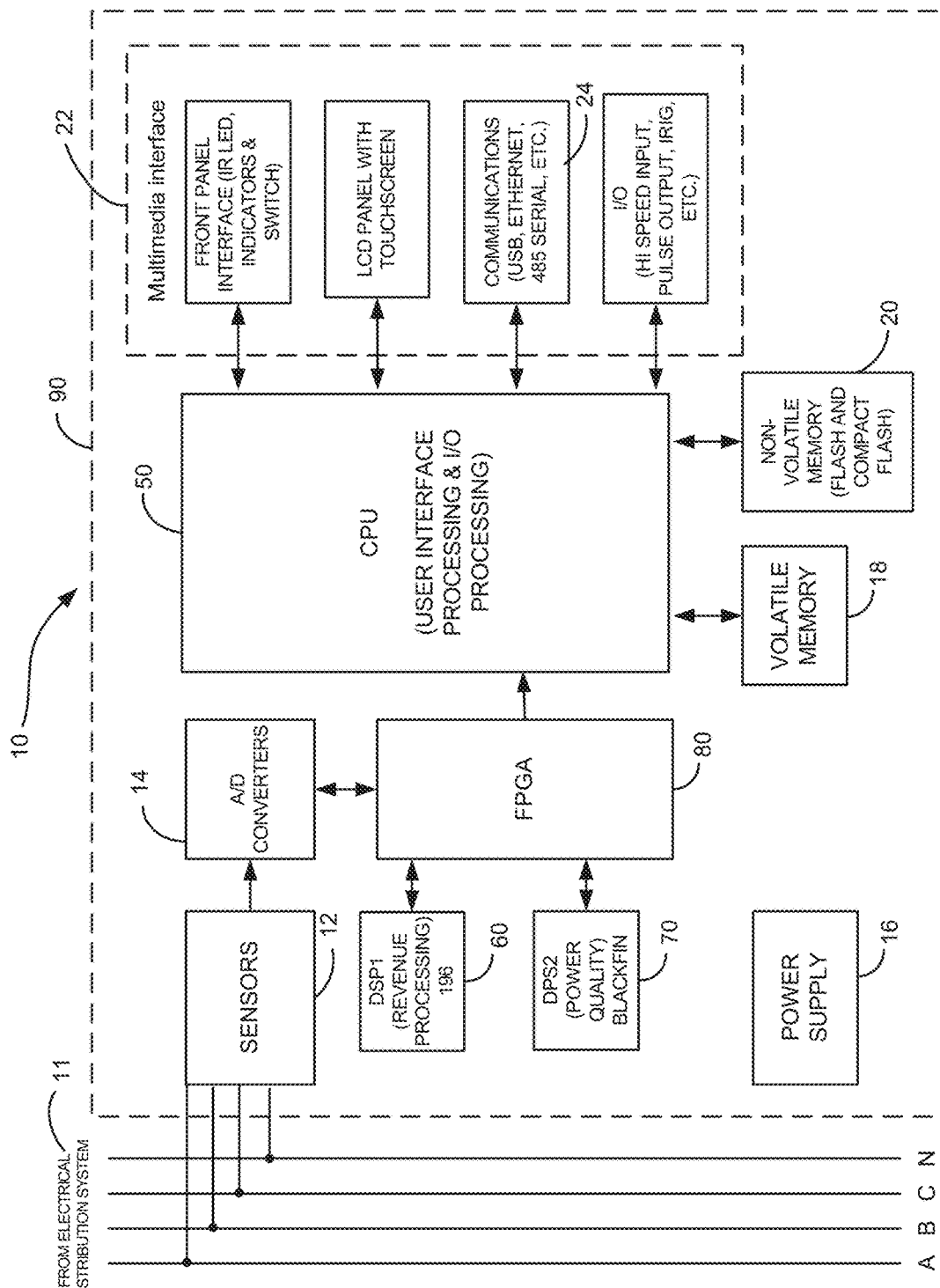
FIG. 1 is a block diagram of an intelligent electronic device (IED), according to an embodiment of the present disclosure.

FIG. 1 is a block diagram of an intelligent electronic device (IED) 10 for monitoring and determining power usage and power quality for any metered point within a power distribution system and for providing a data transfer system for faster and more accurate processing of revenue and waveform analysis.

The IED 10 of FIG. 1 includes a plurality of sensors 12 coupled to various phases A, B, C and neutral N of an electrical distribution system 11, a plurality of analog-to-digital (A/D) converters 14, including inputs coupled to the sensor 12 outputs, a power supply 16, a volatile memory 18, an non-volatile memory 20, a multimedia user interface 20, and a processing system that includes at least one central processing unit (CPU) 50 (or host processor) and one or more digital signal processors, two of which are shown, i.e., DSP1 60 and DSP2 70. The IED 10 also includes a Field Programmable Gate Array 80 which performs a number of functions, including, but not limited to, acting as a communications gateway for routing data between the various processors 50, 60, 70, receiving data from the A/D converters 14 performing transient detection and capture and performing memory decoding for CPU 50 and the DSP processor 60. In one embodiment, the filed-programmable gate array (FPGA) 80 is internally comprised of two dual port memories to facilitate the various functions. It is to be appreciated that the various components shown in FIG. 1 are contained within housing 90. Exemplary housings will be described below in relation to FIGS. 2A-2H.

The plurality of sensors 12 sense electrical parameters, e.g., voltage and current, on incoming lines, (i.e., phase A, phase B, phase C, neutral N), from an electrical power distribution system 11 e.g., an electrical circuit. In one embodiment, the sensors 12 will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 50, DSP1 60, DSP2 70, FPGA 80 or any combination thereof.

A/D converters 14 are respectively configured to convert an analog voltage output to a digital signal that is transmitted to a gate array, such as FPGA 80. Additional circuitry may be provided to scale down magnitudes and correct offset values in original signals, to make them compatible with acquisition devices. The digital signal is then transmitted from the FPGA 80 to the CPU 50 and/or one or more DSP processors 60, 70 to be processed in a manner to be described below.

The CPU 50 or DSP processors 60, 70 are configured to operatively receive digital signals from the A/D converters 14 (see FIG. 1) to perform calculations necessary to determine power usage and to control the overall operations of the IED 10. In some embodiments, CPU 50, DSP1 60 and DSP2 70 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 80. In some embodiments, the digital samples, which are output from the A/D converters 14 are sent directly to the CPU 50 or DSP processors 60, 70, effectively bypassing the FPGA 80 as a communications gateway.

The power supply 16 provides power to each component of the IED 10. In one embodiment, the power supply 16 is a transformer with its primary windings coupled to the incoming power distribution lines and having windings to provide a nominal voltage, e.g., 5 VDC, +12 VDC and −12 VDC, at its secondary windings. In other embodiments, power may be supplied from an independent power source to the power supply 16. For example, power may be supplied from a different electrical circuit or an uninterruptible power supply (UPS). In one embodiment, the power supply 16 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor dividing power supplies are also contemplated.

The multimedia user interface 22 is shown coupled to the CPU 50 in FIG. 1 for interacting with a user and for communicating events, such as alarms and instructions to the user. The multimedia user interface 22 may include a display for providing visual indications to the user. The display may be embodied as a touch screen, a liquid crystal display (LCD), a plurality of LED number segments, individual light bulbs or any combination. The display may provide information to the user in the form of alpha-numeric lines, computer-generated graphics, videos, animations, etc. The multimedia user interface 22 further includes a speaker or audible output means for audibly producing instructions, alarms, data, etc. The speaker is coupled to the CPU 50 via a digital-to-analog converter (D/A) for converting digital audio files stored in a memory 18 or non-volatile memory 20 to analog signals playable by the speaker. An exemplary interface is disclosed and described in commonly owned pending U.S. application Ser. No. 11/589,381, entitled "POWER METER HAVING AUDIBLE AND VISUAL INTERFACE", which claims priority to expired U.S. Provisional Patent Appl. No. 60/731,006, filed Oct. 28, 2005, the contents of which are hereby incorporated by reference in their entireties.

The IED 10 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The IED 10 further comprises a volatile memory 18 and a non-volatile memory 20. In addition to storing audio and/or video files, volatile memory 18 will store the sensed and generated data for further processing and for retrieval when called upon to be displayed at the IED 10 or from a remote location. The volatile memory 18 includes internal storage memory, e.g., random access memory (RAM), and the non-volatile memory 20 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory will be used for storing historical trends, waveform captures, event logs including timestamps and stored digital samples for later downloading to a client application, web-server or PC application.

In a further embodiment, the IED 10 will include a communication device 24, also known as a network interface, for enabling communications between the IED or meter, and a remote terminal unit, programmable logic controller and other computing devices, microprocessors, a desktop computer, laptop computer, other meter modules, etc. The communication device 24 may be a modem, network interface card (NIC), wireless transceiver, etc. The communication device 24 will perform its functionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection will operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 10 may communicate to a server or other computing device via the communication device 24. The IED 10 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. The server will further include a storage medium for storing a database of instructional videos, operating manuals, etc., the details of which will be described in detail below.

In an additional embodiment, the IED 10 will also have the capability of not only digitizing waveforms, but storing the waveform and transferring that data upstream to a central computer, e.g., a remote server, when an event occurs such as a voltage surge or sag or a current short circuit. This data will be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform will also allow the CPU 50 to compute other electrical parameters such as harmonics, magnitudes, symmetrical components and phasor analysis. Using the harmonics, the IED 10 will also calculate dangerous heating conditions and can provide harmonic transformer derating based on harmonics found in the current waveform.

In a further embodiment, the IED 10 will execute an e-mail client and will send e-mails to the utility or to the customer direct on an occasion that a power quality event occurs. This allows utility companies to dispatch crews to repair the condition. The data generated by the meters is used to diagnose the cause of the condition. The data is transferred through the infrastructure created by the electrical power distribution system. The email client will utilize a POP3 or other standard mail protocol. A user will program the outgoing mail server and email address into the meter. An exemplary embodiment of said metering is available in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 10 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 2A:
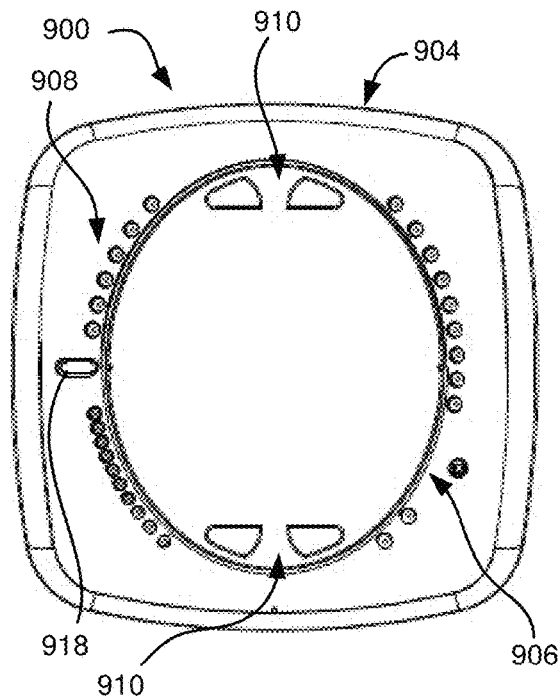
FIGS. 2A-2H illustrate exemplary form factors for an intelligent electronic device (IED) in accordance with an embodiment of the present disclosure.
Figure 2B:
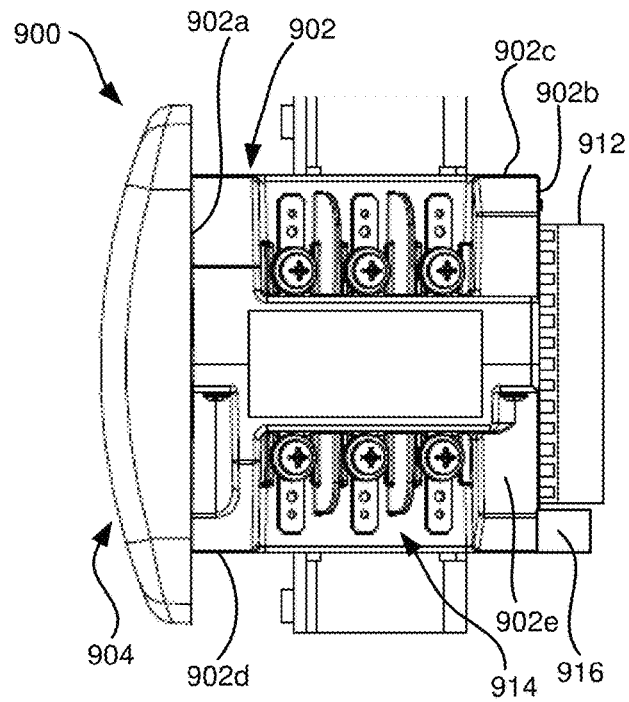

Furthermore, it is to be appreciated that the components and devices of the IED 10 of FIG. 1 may be disposed in various housings depending on the application or environment. For example, the IED 10 may be configured as a panel meter 900 as shown in FIGS. 2A and 2B. The panel meter 900 of FIGS. 2A and 2B is described in more detail in commonly owned U.S. Pat. No. 7,271,996, the contents of which are hereby incorporated by reference. As seen in FIGS. 2A and 2B, the IED 900 includes a housing 902 defining a front surface 902*a*, a rear surface 902*b*, a top surface 902*c*, a bottom surface 902*d*, a right side surface 902*e*, and a left side surface (not shown). Electrical device 900 includes a face plate 904 operatively connected to front surface 902*a* of housing 902. Face plate 904 includes displays 906, indicators 908 (e.g., LEDs and the like), buttons 910, and the like providing a user with an interface for visualization and operation of electrical device 100. For example, as seen in FIG. 2A, face plate 904 of electrical device 900 includes analog and/or digital displays 906 capable of producing alphanumeric characters. Face plate 904 includes a plurality of indicators 908 which, when illuminated, indicate to the user the "type of reading", the "% of load bar", the "parameter designation" which indicates the reading which is being displayed on displays 906, a "scale selector" (e.g., Kilo or Mega multiplier of Displayed Readings), etc. Face plate 904 includes a plurality of buttons 910 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 902 includes voltage connections or inputs 912 provided on rear surface 902*b* thereof, and current inputs 914 provided along right side surface 902*e* thereof. The IED 900 may include a first interface or communication port 916 for connection to a master and/or slave device. Desirably, first communication port 916 is situated in rear surface 902*b* of housing 902 IED 900 may also include a second interface or communication port 918 situated on face plate 904.

Figure 2C:
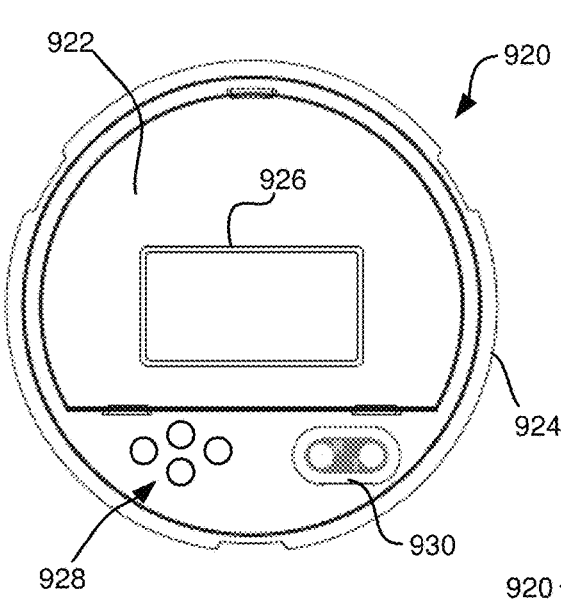
Figure 2D:
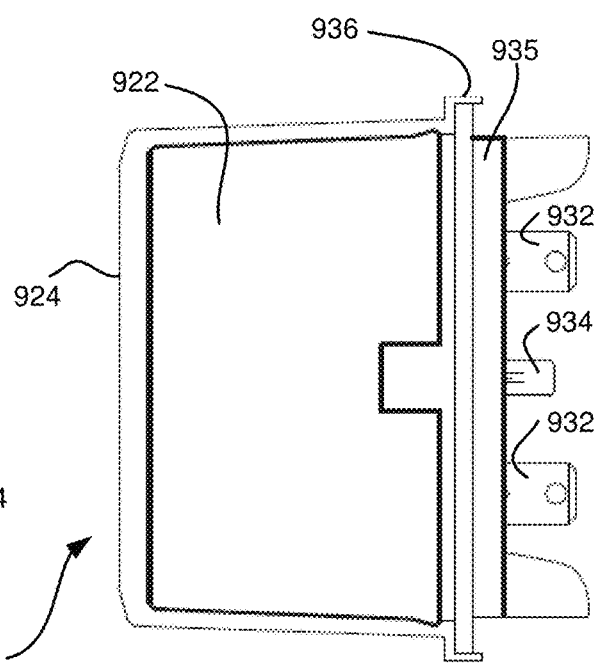

In other embodiment, the IED 10 may be configured as a socket meter 920, also known as a S-base type meter or type S meter, as shown in FIG. 2C an 2D. The socket meter 920 of FIGS. 2C and 2D is described in more detail in commonly owned application Ser. No. 12/578,062 (U.S. Publication No. 2010/0090680), the contents of which are hereby incorporated by reference. Referring to FIGS. 2C and 2D, the meter 920 includes a main housing 922 surrounded by a cover 924. The cover 924 is preferably made of a clear material to expose a display 926 disposed on the main body 922. An interface 928 to access the display and a communication port 930 is also provided and accessible through the cover 924. The meter 920 further includes a plurality of current terminals 932 and voltage terminals 934 disposed on backside of the meter extending through a base 935. The terminals 932, 934 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 936 is used as a seal between the meter 920 and/or cover 924 and the meter socket to prevent removal of the meter and to indicate tampering with the meter.

Figure 2E:
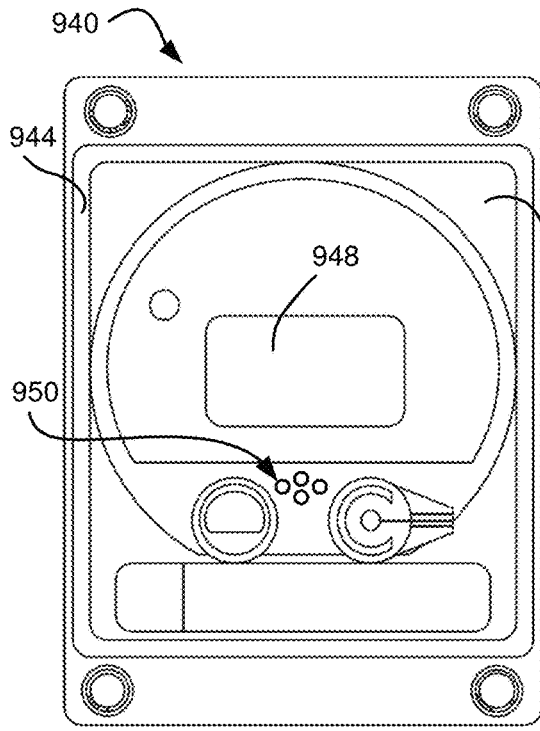
Figure 2F:
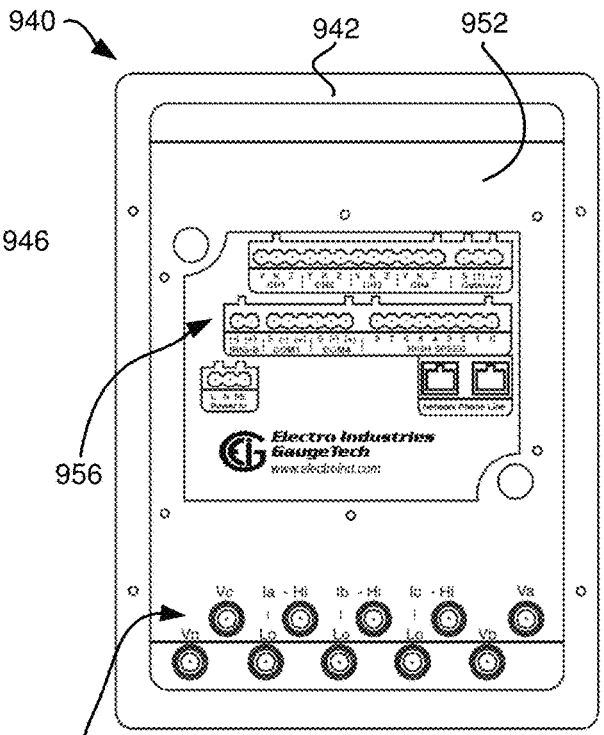

In a further embodiment, the IED 10 of FIG. 1 may be disposed in a switchboard or draw-out type housing 940 as shown in FIGS. 2E and 2F, where FIG. 2E is a front view and FIG. 2F is a rear view. The switchboard enclosure 942 usually features a cover 944 with a transparent face 946 to allow the meter display 948 to be read and the user interface 950 to be interacted with by the user. The cover 944 also has a sealing mechanism (not shown) to prevent unauthorized access to the meter. A rear surface 952 of the switchboard enclosure 942 provides connections for voltage and current inputs 954 and for various communication interfaces 956. Although not shown, the meter disposed in the switchboard enclosure 942 may be mounted on a draw-out chassis which is removable from the switchboard enclosure 942. The draw-out chassis interconnects the meter electronics with the electrical circuit. The draw-out chassis contains electrical connections which mate with matching connectors 954, 956 disposed on the rear surface 952 of the enclosure 942 when the chassis is slid into place.

Figure 2G:
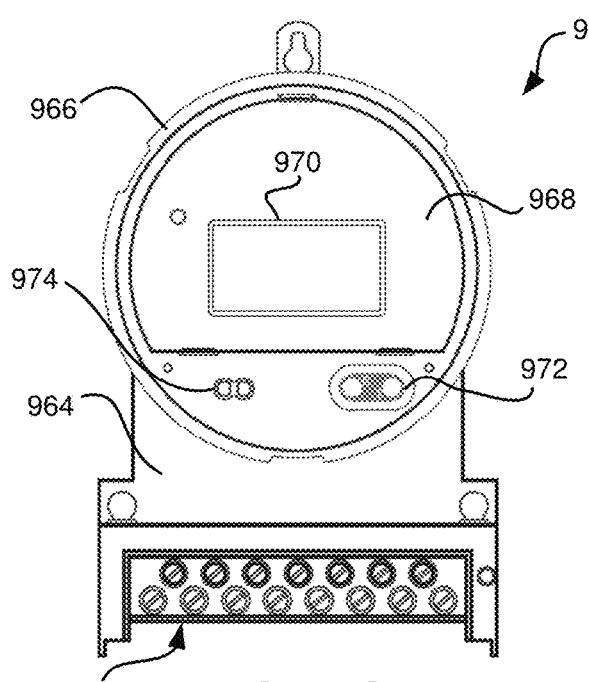
Figure 2H:
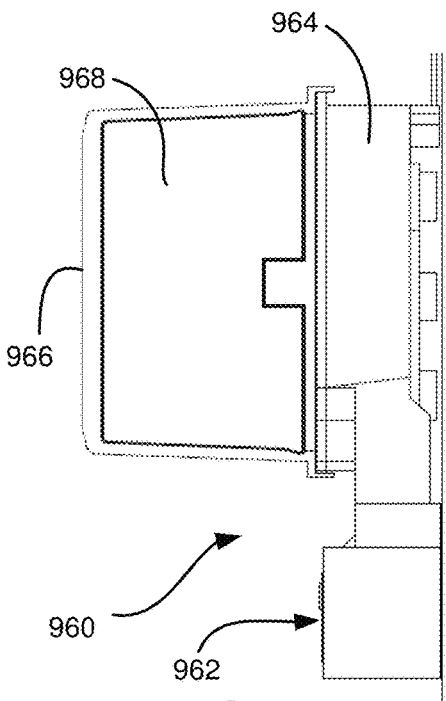

In yet another embodiment, the IED 10 of FIG. 1 may be disposed in an A-base or type A housing as shown in FIGS. 2G and 2H. A-base meters 960 feature bottom connected terminals 962 on the bottom side of the meter housing 964. These terminals 962 are typically screw terminals for receiving the conductors of the electric circuit (not shown). A-base meters 960 further include a meter cover 966, meter body 968, a display 970 and input/output means 972. Further, the meter cover 966 includes an input/output interface 974. The cover 966 encloses the meter electronics 968 and the display 970. The cover 966 has a sealing mechanism (not shown) which prevents unauthorized tampering with the meter electronics.

It is to be appreciated that other housings and mounting schemes, e.g., circuit breaker mounted, are contemplated to be within the scope of the present disclosure.

Figure 3:
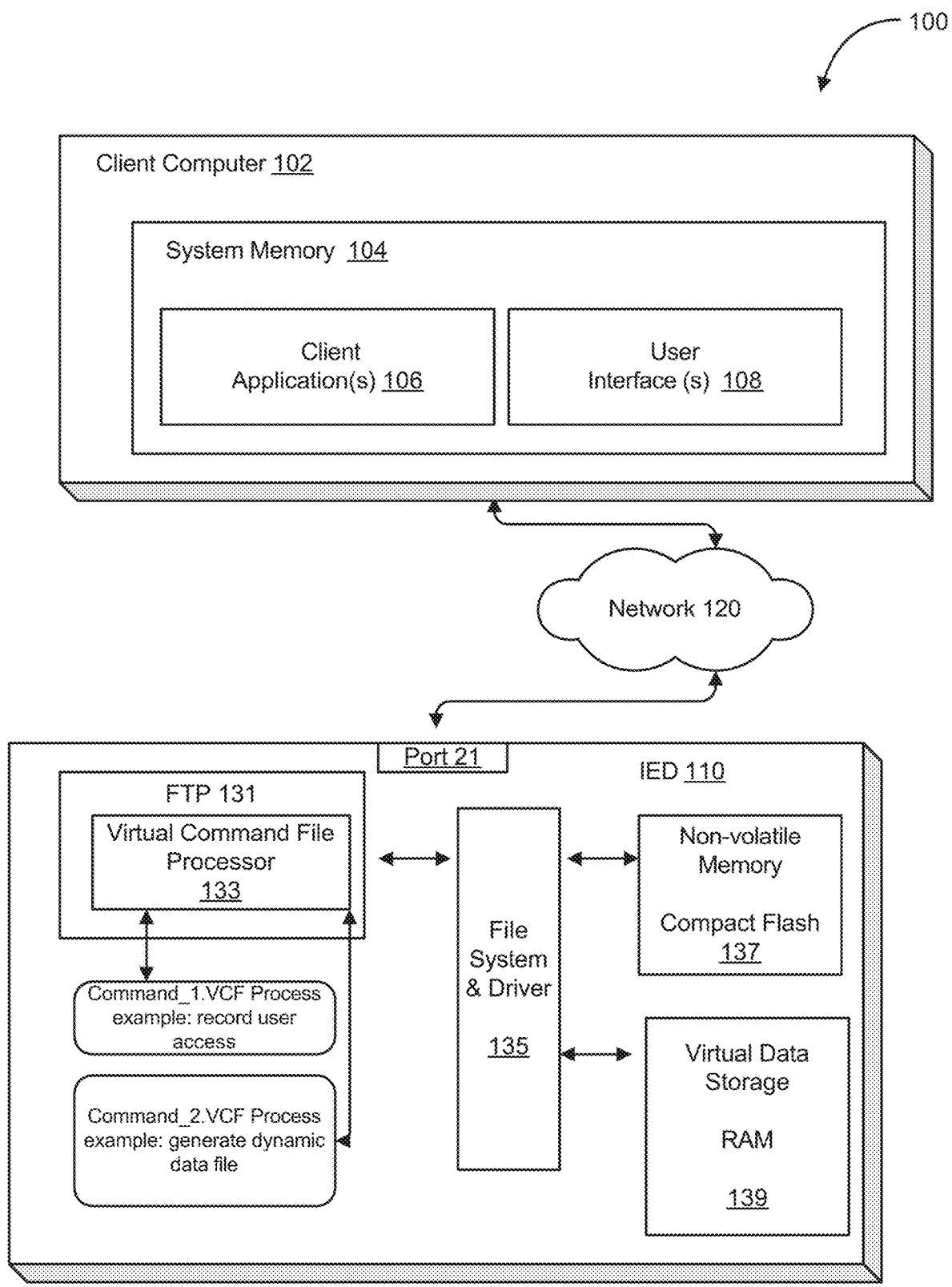
FIG. 3 illustrates an environment in which the present disclosure may be utilized.

FIG. 3 illustrates an exemplary environment 100 in which the present disclosure may be practiced. The network 120 may be the Internet, a public or private intranet, an extranet, wide area network (WAN), local area network (LAN) or any other network configuration to enable transfer of data and commands. An example network configuration uses the Transport Control Protocol/Internet Protocol ("TCP/IP") network protocol suite, however, other Internet Protocol based networks are contemplated by the present disclosure. Communications may also include IP tunneling protocols such as those that allow virtual private networks coupling multiple intranets or extranets together via the Internet. The network 120 may support existing or envisioned application protocols, such as, for example, telnet, POP3, Mime, HTTP, HTTPS, PPP, TCP/IP, SMTP, proprietary protocols, or any other network protocols. During operation, the IED 110 may communicate using the network 120 as will be hereinafter discussed.

It is to be appreciated that are at least two basic types of networks, based on the communication patterns between the machines: client/server networks and peer-to-peer networks. On a client/server network, every computer, device or IED has a distinct role: that of either a client or a server. A server is designed to share its resources among the client computers on the network. A dedicated server computer often has faster processors, more memory, and more storage space than a client because it might have to service dozens or even hundreds of users at the same time. High-performance servers typically use from two to eight processors (and that's not counting multi-core CPUs), have many gigabytes of memory installed, and have one or more server-optimized network interface cards (NICs), RAID (Redundant Array of Independent Drives) storage consisting of multiple drives, and redundant power supplies. Servers often run a special network OS—such as Windows Server, Linux, or UNIX—that is designed solely to facilitate the sharing of its resources. These resources can reside on a single server or on a group of servers. When more than one server is used, each server can "specialize" in a particular task (file server, print server, fax server, email server, and so on) or provide redundancy (duplicate servers) in case of server failure. For demanding computing tasks, several servers can act as a single unit through the use of parallel processing. A client device typically communicates only with servers, not with other clients. A client system is a standard PC that is running an OS such as Windows. Current OSes contain client software that enables the client computers to access the resources that servers share. Older OSes, such as Windows 3.x and DOS, required add-on network client software to join a network. By contrast, on a peer-to-peer network, every computer or device is equal and can communicate with any other computer or device on the network to which it has been granted access rights. Essentially, every computer or device on a peer-to-peer network can function as both a server and a client; any computer or device on a peer-to-peer network is considered a server if it shares a printer, a folder, a drive, or some other resource with the rest of the network. Note that the actual networking hardware (interface cards, cables, and so on) is the same in client/server versus peer-to-peer networks, it is only the logical organization, management and control of the network that varies.

The client 102 may comprise any computing device, such as a server, mainframe, workstation, personal computer, hand held computer, laptop telephony device, network appliance, other IED, Programmable Logic Controller, Power Meter, Protective Relay etc. The client 102 includes system memory 104, which may be implemented in volatile and/or non-volatile devices. One or more client applications 106 which may execute in the system memory 104 is provided. Such client applications may include, for example, FTP client applications. File Transfer Protocol (FTP) is an application for transfer of files between computers attached to Transmission Control Protocol/Internet Protocol (TCP/IP) networks, including the Internet. FTP is a "client/server" application, such that a user runs a program on one computer system, the "client", which communicates with a program running on another computer system, the "server". Additionally, user interfaces 108 may be included for displaying system configuration, retrieved data and diagnostics associated with the IED 110.

The intelligent electronic device (IED) 110, in one embodiment, is comprised of at least an FTP Server 131 including a Virtual Command File Processor 133, a File System and Driver 135, a non-volatile memory 137 and a virtual data store 139. Of course, the IED 110 may contain other hardware/software for performing functions associated with the IED, however, these functions are not relevant to the present application and will therefore not be further discussed.

IED 110 runs the FTP Server 131 as an independent process in the operating system, allowing it to function independently of the other running processes. Additionally, it allows for multiple connections, using the port/socket architecture of TCP/IP.

By running the FTP Server 131 as an independent process, this means that other systems, such as a Modbus TCP handler, can run on IED 110 concurrently with the FTP Server 131. This also means that multiple FTP connections can be made with the only limitation being the system's available resources.

The FTP Server 131 provides access to the file system 135 of the IED 110 on the standard FTP port (port 21). When a connection is made, client 102 sends a FTP logon sequence, which includes a USER command and a PASS command. The client 102 then interacts with the IED 110, requesting information and writing files, ending in a logout.

The FTP Server 131 uses two ports for all actions. The first port 21, is a clear American Standard Code for Information Technology (ASCII) telnet channel, and is called the command channel. The second port, which can have a different port number in different applications, is initiated whenever it is necessary to transfer data in clear binary, and is called the data channel.

The virtual data store 139 is an ideal storage medium for files that are written to very frequently, such as, for example, status information, diagnostics, and virtual command files. In contrast to these types of files are files which require more long term storage, such as, for example, Logs, settings, and configuration, a more suitable to be stored using a compact flash drive.

The File Transfer Protocol (FTP) (Port 21) is a network protocol used to transfer data from one computer to another through a network, such as over the Internet. FTP is a commonly used protocol for exchanging files over any TCP/IP based network to manipulate files on another computer on that network regardless of which operating systems are involved (if the computers permit FTP access). There are many existing FTP client and server programs. FTP servers can be set up anywhere between game servers, voice servers, internet hosts, and other physical servers.

FTP runs exclusively over TCP. FTP servers by default listen on port 21 for incoming connections from FTP clients. A connection to this port from the FTP Client forms the control stream on which commands are passed to the FTP server from the FTP client and on occasion from the FTP server to the FTP client. FTP uses out-of-band control, which means it uses a separate connection for control and data. Thus, for the actual file transfer to take place, a different connection is required which is called the data stream. Depending on the transfer mode, the process of setting up the data stream is different.

In active mode, the FTP client opens a dynamic port (49152-65535), sends the FTP server the dynamic port number on which it is listening over the control stream and waits for a connection from the FTP server. When the FTP server initiates the data connection to the FTP client it binds the source port to port 20 on the FTP server.

To use active mode, the client sends a PORT command, with the IP and port as argument. The format for the IP and port is "h1,h2,h3,h4,p1,p2". Each field is a decimal representation of 8 bits of the host IP, followed by the chosen data port. For example, a client with an IP of 192.168.0.1, listening on port 49154 for the data connection will send the command "PORT 192,168,0,1,192,2". The port fields should be interpreted as p1×256+p2=port, or, in this example, 192×256+2=49154.

In passive mode, the FTP server opens a dynamic port (49152-65535), sends the FTP client the server's IP address to connect to and the port on which it is listening (a 16 bit value broken into a high and low byte, like explained before) over the control stream and waits for a connection from the FTP client. In this case the FTP client binds the source port of the connection to a dynamic port between 49152 and 65535.

To use passive mode, the client sends the PASV command to which the server would reply with something similar to "227 Entering Passive Mode (127,0,0,1,192,52)". The syntax of the IP address and port are the same as for the argument to the PORT command.

In extended passive mode, the FTP server operates exactly the same as passive mode, however it only transmits the port number (not broken into high and low bytes) and the client is to assume that it connects to the same IP address that was originally connected to.

The objectives of FTP are to promote sharing of files (computer programs and/or data), to encourage indirect or implicit use of remote computers, to shield a user from variations in file storage systems among different hosts and to transfer data reliably, and efficiently.

In one embodiment of the present disclosure, the IED 110 has the ability to provide an external client 102 with an improved data transfer rate when making data download requests of data stored within an IED This is achieved by configuring the IED 110 to include an FTP server 131 including a Virtual Command File Processor 133. An improved data transfer rate from the IED 110 may be realized by the external client 102 issuing virtual commands to the IED 110. In response, the IED 110 processes the received virtual commands in the Virtual Command File processor 133 to construct FTP commands therefrom to be applied to a novel file system 135 of the IED 110, coupled to the FTP server 131, wherein the novel file system 135 is configured as a PC file structure amenable to receiving and responding to the constructed FTP commands. The Virtual command files and the novel file system 135 are discussed in greater detail in co-pending application Ser. No. 12/061,979.

While FTP file transfer comprises one embodiment for encapsulating files to improve a data transfer rate from an IED to external clients, the present disclosure contemplates the use of other file transfer protocols, such as the Ethernet protocol such as HTTP or TCP/IP for example. Of course, other Ethernet protocols are contemplated for use by the present disclosure. For example, for the purpose of security and firewall access, it may be preferable to utilize HTTP file encapsulation as opposed to sending the data via FTP. In other embodiments, data can be attached as an email and sent via SMTP, for example. Such a system is described in a co-owned U.S. Pat. No. 6,751,563, titled "Electronic Energy meter", the contents of which are incorporated herein by reference. In the U.S. Pat. No. 6,751,563, at least one processor of the IED or meter is configured to collect the at least one parameter and generate data from the sampled at least one parameter, wherein the at least one processor is configured to act as a server for the IED or meter and is further configured for presenting the collected and generated data in the form of web pages.

Figure 4:
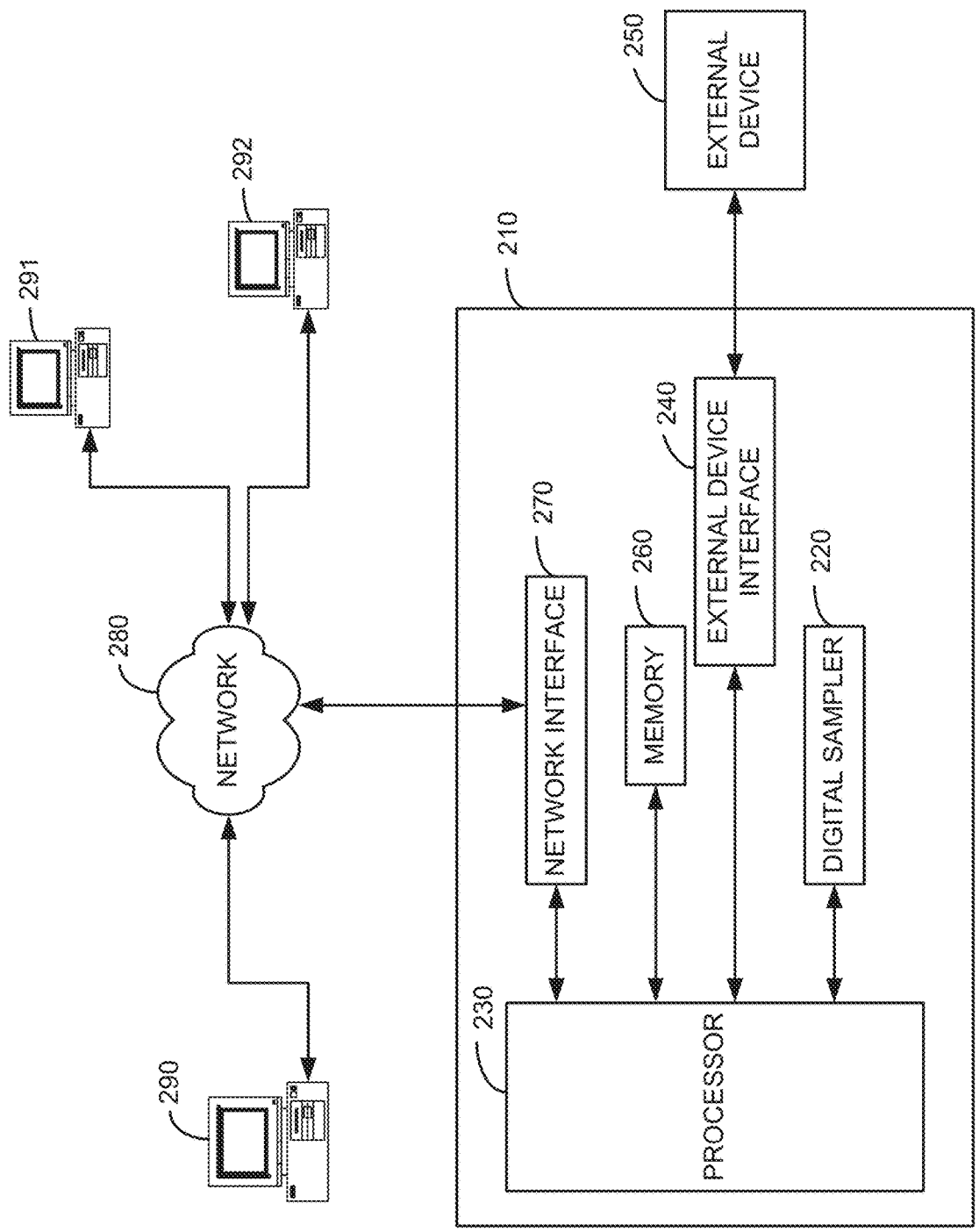
FIG. 4 is a block diagram of a web server power quality and revenue meter, according to an embodiment of the present disclosure.

Portions of U.S. Pat. No. 6,751,563 will be reproduced here. FIG. 4 is a block diagram of a web server power quality and revenue meter 210. The meter is connected to monitor electric distribution power lines (not shown), to monitor voltage and current at the point of connection. Included therein is digital sampler 220 for digitally sampling the voltage and current of the power being supplied to a customer or monitored at the point of the series connection in the power grid. Digital sampler 220 digitally samples the voltage and current and performs substantially similar to the A/D converters 14 described above in relation to FIG. 1. The digital samples are then forwarded to processor 230 for processing. It is to be appreciated that the processor may be a single processing unit or a processing assembly including at least one CPU 50, DSP1 60, DSP2 70 and FPGA 80, or any combination thereof. Also connected to processor 230 is external device interface 240 for providing an interface for external devices 250 to connect to meter 210. These external devices might include other power meters, sub-station control circuitry, on/off switches, etc. Processor 230 receives data packets from digital sampler 220 and external devices 250, and processes the data packets according to user defined or predefined requirements. A memory 260 is connected to processor 230 for storing data packets and program algorithms, and to assist in processing functions of processor 230. These processing functions include the power quality data and revenue calculations, as well as formatting data into different protocols which will be described later in detail. Processor 130 provides processed data to network 280 through network interface 270. Network 280 can be the Internet, the World Wide Web (WWW), an intranet, a wide area network (WAN), or local area network (LAN), among others. In one embodiment, the network interface converts the data to an Ethernet TCP/IP format. The use of the Ethernet TCP/IP format allows multiple users to access the power meter simultaneously. In a like fashion, network interface 270 might be comprised of a modem, cable connection, or other devices that provide formatting functions. Computers 290-292 are shown connected to network 280.

A web server program (web server) is contained in memory 260, and accessed through network interface 270. The web server provides real time data through any known web server interface format. For example, popular web server interface formats consist of HTML and XML formats. The actual format of the programming language used is not essential to the present disclosure, in that any web server format can be incorporated herein. The web server provides a user friendly interface for the user to interact with the meter 210. The user can have various access levels to enter limits for e-mail alarms. Additionally, the user can be provided the data in a multiple of formats including raw data, bar graph, charts, etc. The currently used HTML or XML programming languages provide for easy programming and user friendly user interfaces.

The processor 230 formats the processed data into various network protocols and formats. The protocols and formats can, for example, consist of the web server HTML or XML formats, Modbus TCP, RS-485, FTP or e-mail. Dynamic Host Configuration Protocol (DHCP) can also be used to assign IP addresses. The network formatted data is now available to users at computers 290-292 through network 280, that connects to meter 210 at the network interface 270. In one embodiment, network interface 270 is an Ethernet interface that supports, for example, 100 base-T or 10 base-T communications. This type of network interface can send and receive data packets between WAN connections and/or LAN connections and the meter 210. This type of network interface allows for situations, for example, where the web server may be accessed by one user while another user is communicating via the Modbus TCP, and a third user may be downloading a stored data file via FTP. The ability to provide access to the meter by multiple users, simultaneously, is a great advantage over the prior art. This can allow for a utility company's customer service personnel, a customer and maintenance personnel to simultaneously and interactively monitor and diagnose possible problems with the power service.

Figure 5:
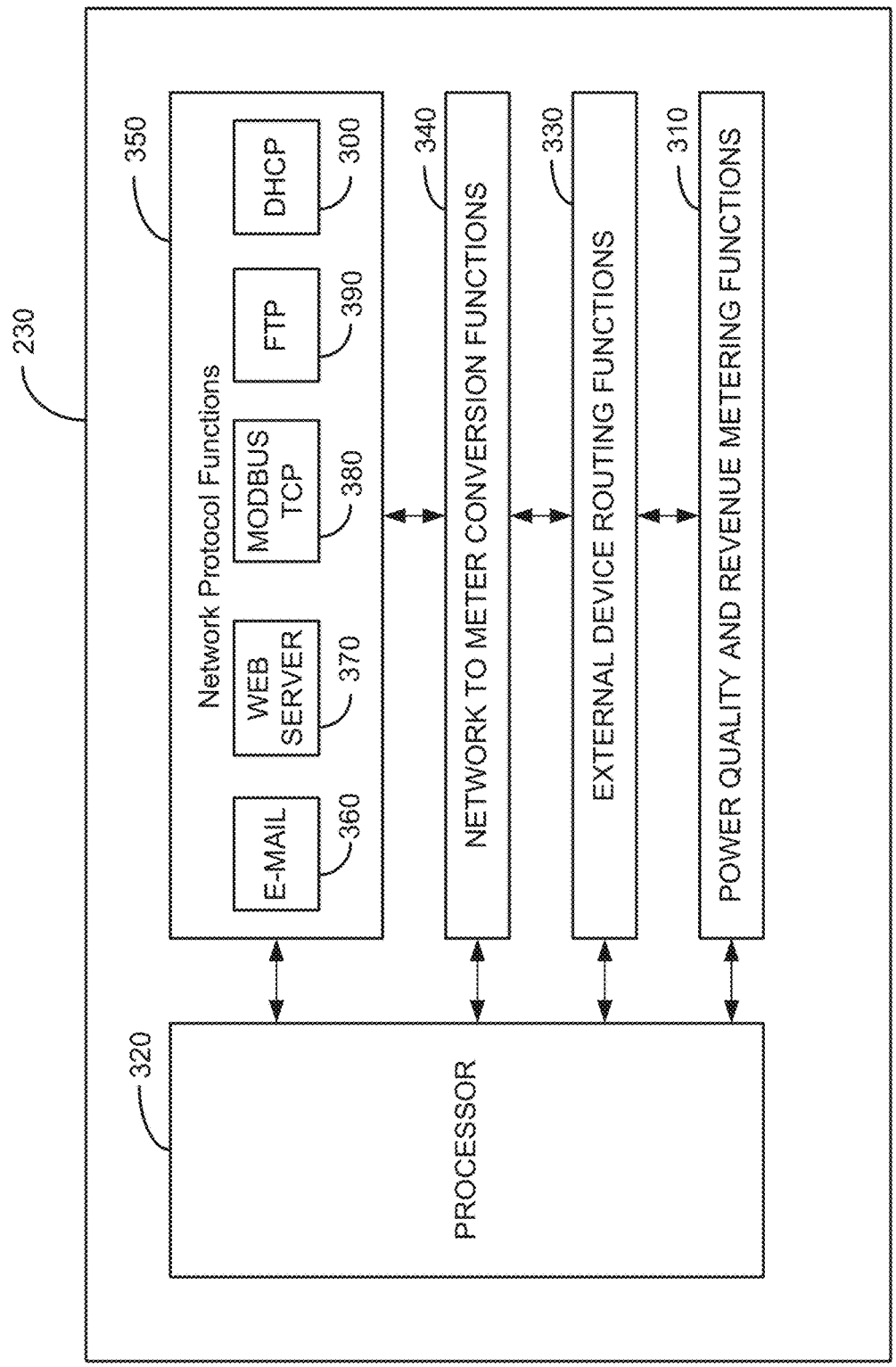
FIG. 5 is a functional block diagram of the processor of the web server power quality and revenue meter system shown in FIG. 4, according to the embodiment of the present invention.

FIG. 5 is a functional block diagram of processor 230 of the web server power quality and revenue meter system according to the embodiment of the present invention. Processor 230 is shown containing four main processing functions. The functions shown are illustrative and not meant to be inclusive of all possible functions performed by processor 230. Power Quality and Revenue Metering functions (metering functions) 310 consists of a complete set of functions which are needed for power quality and revenue metering. Packet data collected by digital sampler 220 is transmitted to processor 230. Processor 230 calculates, for example, power reactive power, apparent power, and power factor. The metering function 310 responds to commands via the network or other interfaces supported by the meter. External Device Routing Functions 330 handle the interfacing between the external device 250 and meter 210. Raw data from external device 250 is fed into meter 210. The external device 250 is assigned a particular address. If more than one external device is connected to meter 210, each device will be assigned a unique particular address. The Network Protocol Functions 350 of meter 210 are executed by processor 230 which executes multiple networking tasks that are running concurrently. As shown in FIG. 5, these include, but are not limited to, the following network tasks included in network protocol functions 350: e-mail 360, web server 370, Modbus TCP 380, FTP 390, and DHCP 300. The e-mail 360 network protocol function can be utilized to send e-mail messages via the network 280 to a user to, for example, notify the user of an emergency situation or if the power consumption reaches a user-set or pre-set high level threshold. As the processor receives packets of data it identifies the network processing necessary for the packet by the port number associated with the packet. The processor allocates the packet to a task as a function of the port number. Since each task is running independently the meter 210 can accept different types of requests concurrently and process them transparently from each other. For example, the web server may be accessed by one user while another user is communicating via Modbus TCP and at the same time a third user may download a log file via FTP. The Network to Meter Protocol Conversion Function 340 is used to format and protocol convert the different network protocol messages to a common format understood by the other functional sections of meter 210. After the basic network processing of the packet of data, any "commands" or data which are to be passed to other functional sections of meter 210 are formatted and protocol converted to a common format for processing by the Network to Meter Protocol Conversion Function 340. Similarly, commands or data coming from the meter for transfer over the network are pre-processed by this function into the proper format before being sent to the appropriate network task for transmission over the network. In addition this function first protocol converts and then routes data and commands between the meter and external devices.

Although the above described embodiments enable users outside of the network the IED or meter is residing on to access the internal memory or server of the IED or meter, IT departments commonly block this access through a firewall to avoid access by dangerous threats into corporate networks. A firewall is a system designed to prevent unauthorized access to or from a private network, e.g., an internal network of a building, a corporate network, etc. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. A firewall may employ one or more of the following techniques to control the flow of traffic in and of the network it is protecting: 1) packet filtering: looks at each packet entering or leaving the network and accepts or rejects it based on user-defined rules; 2) Application gateway: applies security mechanisms to specific applications, such as FTP and Telnet servers; 3) Circuit-level gateway: applies security mechanisms when a TCP or UDP connection is established, once the connection has been made, packets can flow between the hosts without further checking; 4) Proxy server: intercepts all messages entering and leaving the network, effectively hides the true network addresses; and 5) Stateful inspection: doesn't examine the contents of each packet but instead compares certain key parts of the packet to a database of trusted information, if the comparison yields a reasonable match, the information is allowed through, otherwise it is discarded. Other techniques and to be developed techniques are contemplated to be within the scope of the present disclosure.

In one embodiment, the present disclosure provides for overcoming the problem of not being allowed firewall access to an IED or meter installed within a facility, i.e., the meter is residing on a private network, by enabling an IED to initiate one way communication through the firewall. In this embodiment, the IED or meter posts the monitored and generated data on an Internet site external to the corporate or private network, i.e., on the other side of a firewall. The benefit is that any user would be able to view the data on any computer or web enabled smart device without having to pierce or bypass the firewall. Additionally, there is a business opportunity to host this data on a web server and charge a user a monthly fee for hosting the data. The features of this embodiment can be incorporated into any telemetry application including vending, energy metering, telephone systems, medical devices and any application that requires remotely collecting data and posting it on to a public Internet web site.

Figure 6:
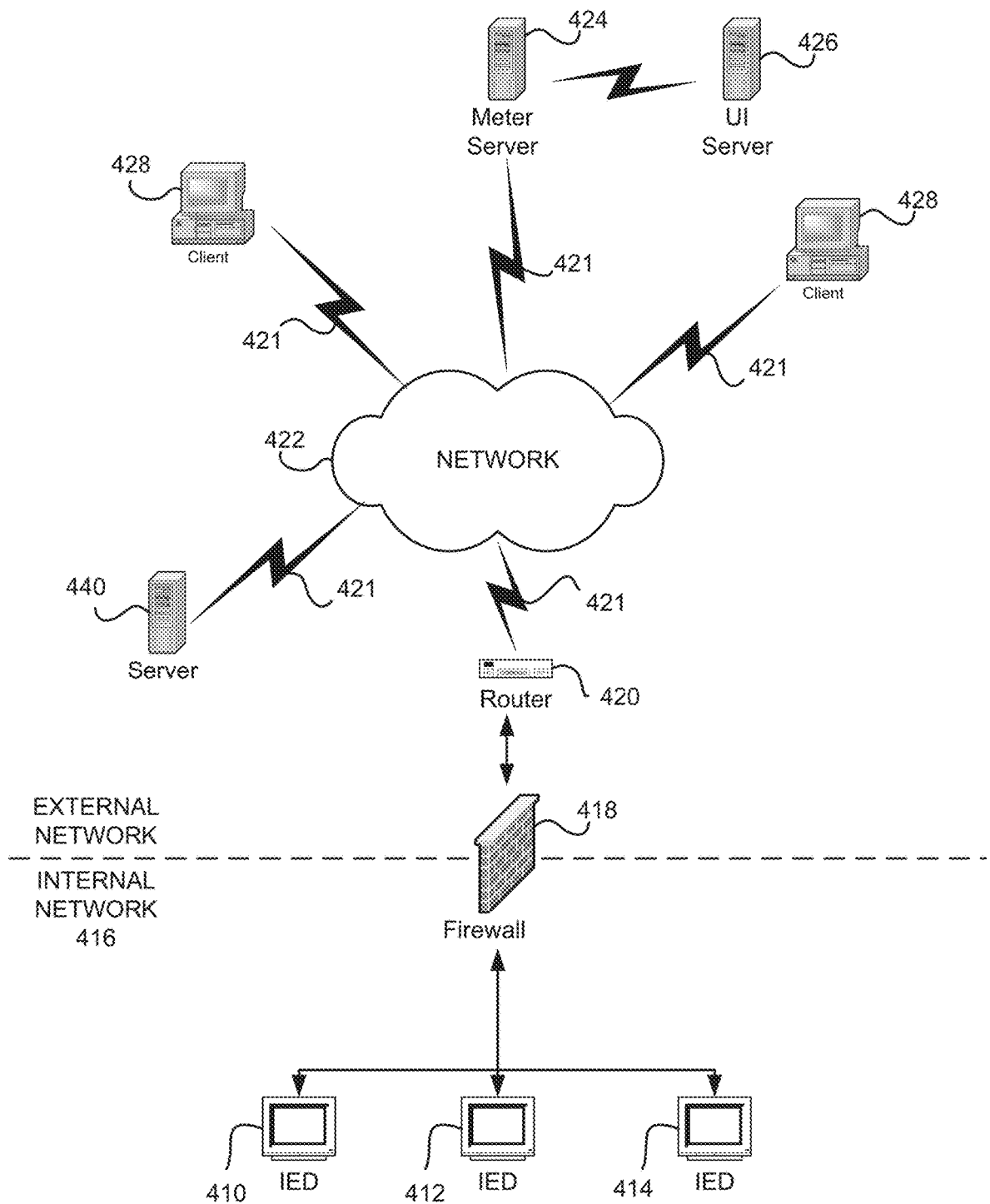
FIG. 6 illustrates another environment in which the present disclosure may be utilized.

In one embodiment, the IED or metering device will communicate through the firewall using a protocol such as HTTP via a port that is open through the firewall. Referring to FIG. 6, IEDs or meters 410, 412 414 reside on an internal network 416, e.g., an intranet, private network, corporate network, etc. The internal network 416 is coupled to an external network 422, e.g., the Internet, via a router 420 or similar device over any known hardwire or wireless connection 421. A firewall 418 is disposed between the internal network 416 and external network 422 to prevent unauthorized access from outside the internal network 416 to the IEDs or meters 410, 412, 414. Although the firewall 418 is shown between the internal network 416 and the router 420 it is to be appreciated that other configurations are possible, for example, the firewall 418 being disposed between the router 420 and external network 422. In other embodiments, the firewall 418 and router 420 may be configured as a single device. It is further to be appreciated that firewall 418 can be implemented in both hardware and software, or a combination of both.

The communication device or network interface of the meter (as described above in relation to FIG. 1) will communicate through the firewall 418 and read a web site server 424. It is to be appreciated that the one way communication from the IED through the firewall may be enabled by various techniques, for example, by enabling outbound traffic to the IP address or domain name of the server 424 or by using a protocol that has been configured, via the firewall settings, to pass through the firewall such as HTTP (Hyper Text Transfer Protocol), IP (Internet Protocol), TCP (Transmission Control Protocol), FTP (File Transfer Protocol), UDP (User Datagram Protocol), ICMP (Internet Control Message Protocol), SMTP (Simple Mail Transport Protocol), SNMP (Simple Network Management Protocol), Telnet, etc. Alternatively, the IED may have exclusive access to a particular port on the firewall, which is unknown to other users on either the internal or external network. Other methods or techniques are contemplated, for example, e-mail, HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc.

The server 424 will provide instructions in computer and/or human readable format to the IED or meter. For instance, the web server 424 might have XML tags that state in computer readable format to provide data for the last hour on energy consumption by 15 minute intervals. The meter 410, 412, 414 will then read those instructions on that web server 424 and then post that data up on the server 424. In this manner, the IED or meter initiates communication in one direction, e.g., an outbound direction, to the server 424.

Another server (or can be in one server) will read the data that the meter 410, 412, 414 posts and will format the meter data into data that can be viewed for humans on a web site or a software application, i.e., UI Server 426. Servers 424, 426 can also store the data in a database or perform or execute various control commands on the data. Clients 428 may access the IED data stored or posted on servers 424, 426 via a connection to the network 422.

Since the meters are only communicating in an outbound direction only, the meters 410, 412, 414 can read data or instructions from an external network application (e.g., server 424), the external network application cannot request information directly from the meter. The server 424 posts the data or instructions on the web site and waits for the meter to check the site to see if there has been a new post, i.e., new instructions for the meter. The meter can be programmed at the user's discretion as to frequency for which the meter 410, 412, 414 exits out to the external network to view the postings.

The meter instruction server 424 will post instructions in a directory programmed/located on the server or into XML or in any fashion that the meter is configured to understand and then the meter will post whatever data it is instructed to do. The meter can also be configured to accomplish control commands. In addition to the meter instruction server 424, a user interface (UI) server 426 is provided that can be used to enable a user interface to the user. The user can provide input on the UI server 426 that might trigger the meter instruction server 424 to produce a message to control the energy next time the meter reads that server.

Figure 7:
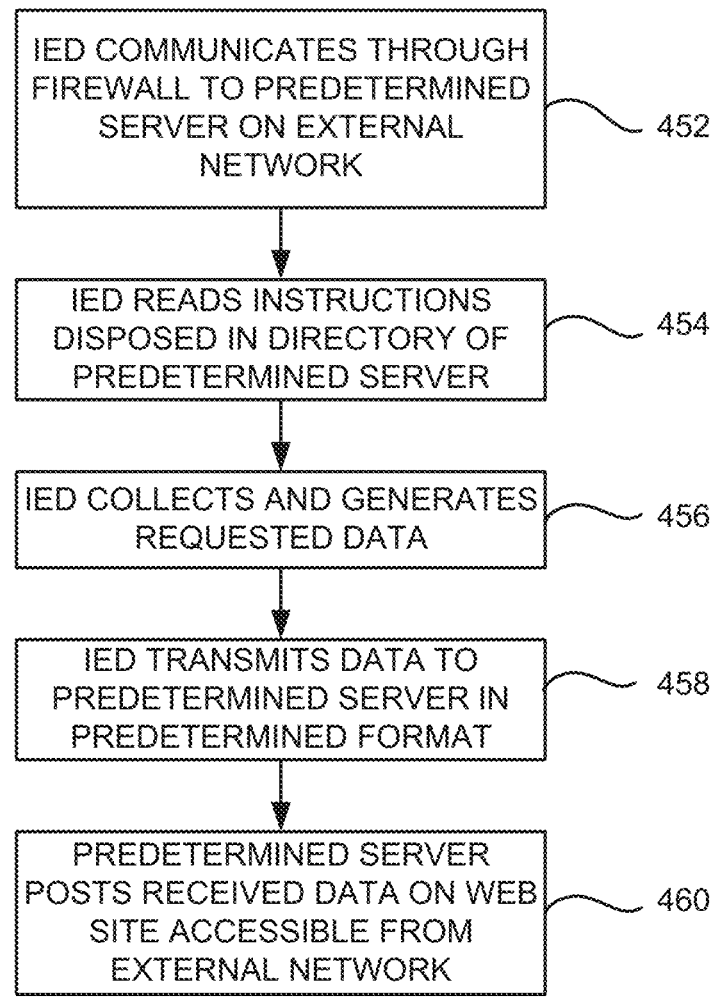
FIG. 7 is a flow chart illustrating a method for communicating data from an IED on an internal network to a server on an external network through a firewall.

Referring to FIG. 7, a method for communicating data from an IED on an internal network to a server on an external network through a firewall is illustrated. In step 452, the IED 410 communicates through the firewall 418 to a predetermined server 424 on an external network 422. The IED 410 may be programmed to periodically communicate to the server at predefined intervals. During this communication session, the IED 410 reads instructions disposed in a directory or folder on the predetermined server 424, step 454. Next, in step 456, the IED 410 collects data from its internal memory or generates data based on the read instructions. The IED 410 then transmits the data to the server 424 in a predetermined format, e.g., XML, CSV, etc., step 458. In step 460, the predetermined server 424 posts the received data on a web site accessible from the external network 422. The data may be posted on the server 424 or a UI (user interface) server 426 configured to provide data for end users, e.g., clients 428. It is to be appreciated that the UI server 426 may be configured to post data from several locations in one convenient interface for, for example, an organization managing the several locations. A provider of the servers 424, 426 may charge a fee to the end user for the hosting of the web site and providing the data in a convenient and accessible format.

Figure 8:
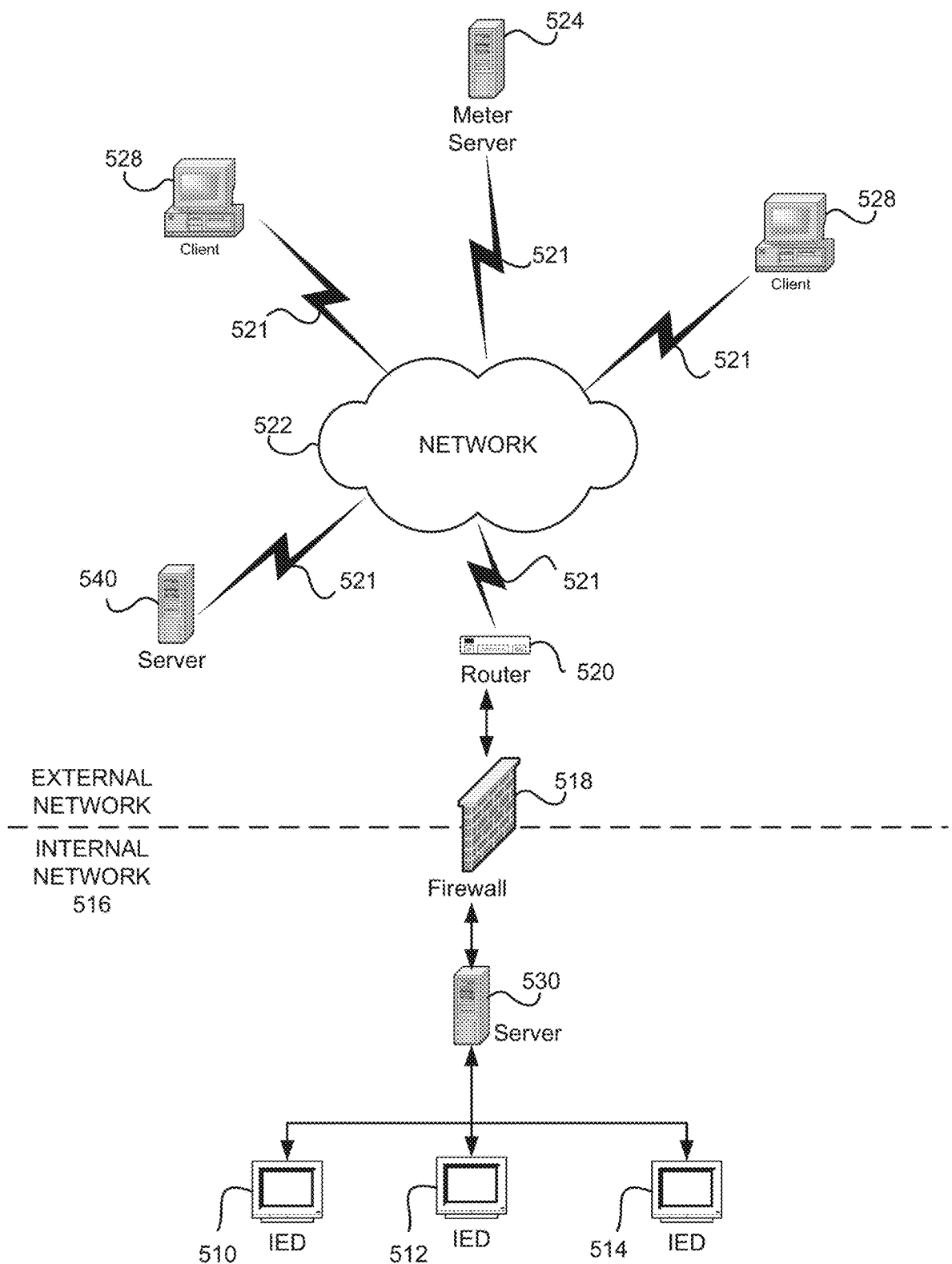
FIG. 8 illustrates yet another environment in which the present disclosure may be utilized.

In another embodiment, the IED or metering device will communicate through the firewall using a server 530 disposed on an internal network protected by a firewall. Referring to FIG. 8, IEDs or meters 510, 512 514 reside on an internal network 516, e.g., an intranet, private network, corporate network, etc. The internal network 516 is coupled to an external network 522, e.g., the Internet, via a router 520 or similar device over any known hardwire or wireless connection 521. A firewall 518 is disposed between the internal network 516 and external network 522 to prevent unauthorized access from outside the internal network 516 to the IEDs or meters 510, 512, 514. Although the firewall 518 is shown between the internal network 516 and the router 520 it is to be appreciated that other configurations are possible, for example, the firewall 518 being disposed between the router 520 and external network 522. In other embodiments, the firewall 518 and router 520 may be configured as a single device. It is further to be appreciated that firewall 518 can be implemented in both hardware and software, or a combination of both.

In this embodiment, server 530 aggregates data from the various IEDs 510, 512, 514 coupled to the internal or private network 516. Since the server 530 and the IEDs 510, 512, 514 are all on the same side of the firewall 518, generally communications and data transfers among the server 530 and the IEDs 510, 512, 514 is unrestricted. Server 530 then communicates or transfers the data from the IEDs to server 524 on the external network on the other side of the firewall 518. The communication between server 530 and 524 may be accomplished by any one of the communication means or protocols described in the present disclosure. The server 524 then posts the data from the IEDs 510, 512, 514 making the data accessible to clients 528 on external networks, as described above.

Figure 9:
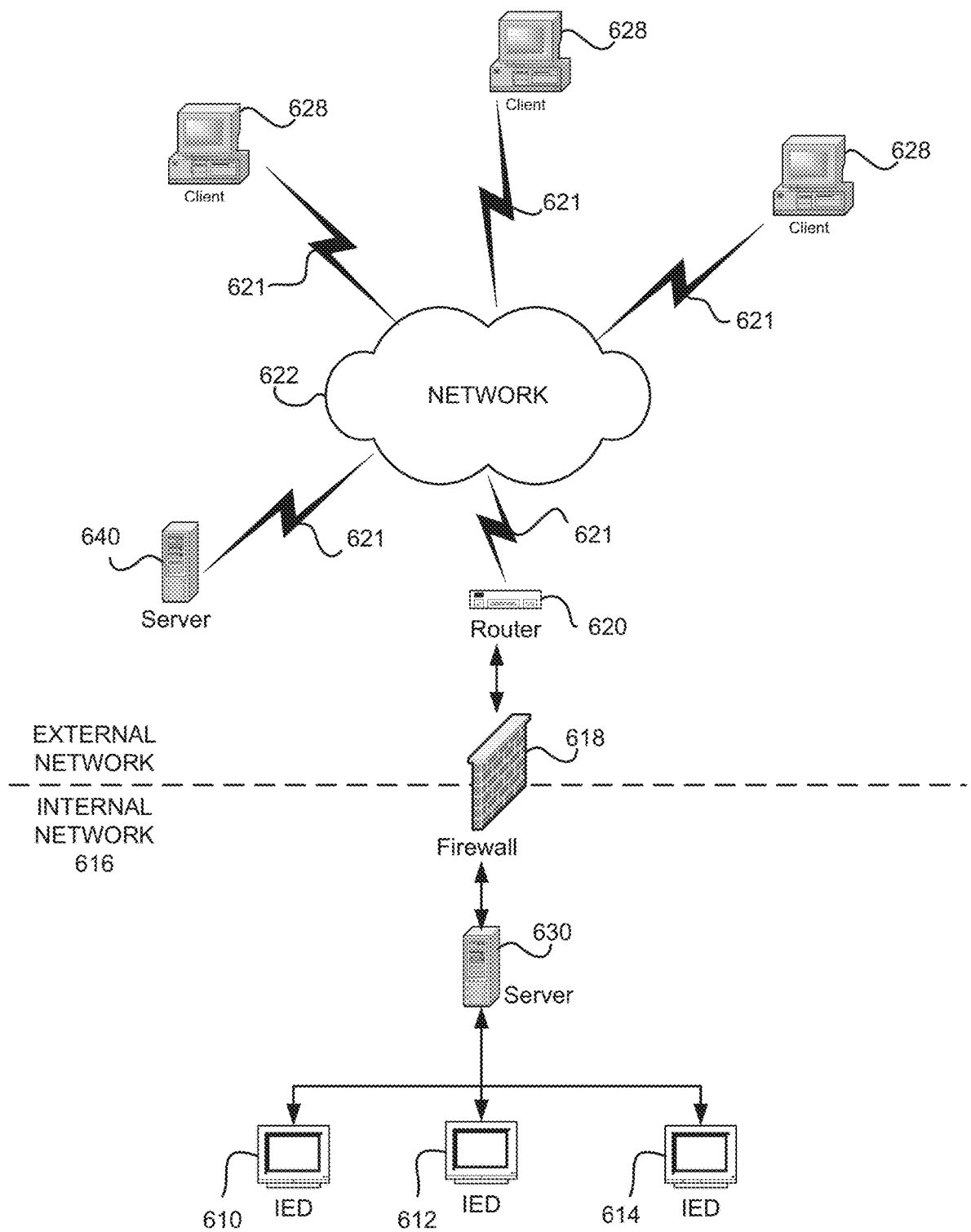
FIG. 9 illustrates a further environment in which the present disclosure may be utilized.

In a further embodiment, the IED or metering device will communicate through the firewall using a server 630 disposed on an internal network protected by a firewall. Referring to FIG. 9, IEDs or meters 610, 612 614 reside on an internal network 616, e.g., an intranet, private network, corporate network, etc. The internal network 616 is coupled to an external network 622, e.g., the Internet, via a router 620 or similar device over any known hardwire or wireless connection 621. A firewall 618 is disposed between the internal network 516 and external network 622 to prevent unauthorized access from outside the internal network 616 to the IEDs or meters 610, 612, 614. Although the firewall 618 is shown between the internal network 616 and the router 620 it is to be appreciated that other configurations are possible, for example, the firewall 618 being disposed between the router 620 and external network 622. In other embodiments, the firewall 618 and router 620 may be configured as a single device. It is further to be appreciated that firewall 618 can be implemented in both hardware and software, or a combination of both.

In this embodiment, server 630 aggregates data from the various IEDs 610, 612, 614 coupled to the internal or private network 616. Since the server 630 and the IEDs 610, 612, 614 are all on the same side of the firewall 618, generally communications and data transfers among the server 630 and the IEDs 610, 612, 614 is unrestricted. Server 630 then communicates or transfers the data from the IEDs to clients 628 on the external network on the other side of the firewall 618. The communication between server 630 and clients 628 may be accomplished by any one of the communication means or protocols described in the present disclosure.

In another embodiment, each IED 610, 612, 614 may be configured to act as a server to perform the functionality described above obviating the need for server 630.

Furthermore in another embodiment, each IED 610, 612, 614 and each client device 628 may be configured as a server to create a peer-to-peer network, token ring or a combination of any such topology.

The systems and methods of the present disclosure may utilize one or more protocols and/or communication techniques including, but not limited to, e-mail (SMTP), FTP, HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc.

In one non-limiting embodiment, each IED sends data to a recipient via electronic mail, also known as email or e-mail. An Internet email message consists of three components, the message envelope, the message header, and the message body. The message header contains control information, including, minimally, an originator's email address and one or more recipient addresses. Usually descriptive information is also added, such as a subject header field and a message submission date/time stamp. Network-based email was initially exchanged on the ARPANET in extensions to the FTP, but is now carried by SMTP, first published as Internet standard 10 (RFC 821) in 1982. In the process of transporting email messages between systems, SMTP communicates delivery parameters using a message envelope separate from the message (header and body) itself. Messages are exchanged between hosts using the Simple Mail Transfer Protocol with software programs called mail transfer agents (MTAs); and delivered to a mail store by programs called mail delivery agents (MDAs, also sometimes called local delivery agents, LDAs). Users can retrieve their messages from servers using standard protocols such as POP or IMAP, or, as is more likely in a large corporate environment, with a proprietary protocol specific to Novell Groupwise, Lotus Notes or Microsoft Exchange Servers. Webmail interfaces allow users to access their mail with any standard web browser, from any computer, rather than relying on an email client. Programs used by users for retrieving, reading, and managing email are called mail user agents (MUAs). Mail can be stored on the client, on the server side, or in both places. Standard formats for mailboxes include Maildir and mbox. Several prominent email clients use their own proprietary format and require conversion software to transfer email between them. Server-side storage is often in a proprietary format but since access is through a standard protocol such as IMAP, moving email from one server to another can be done with any MUA supporting the protocol.

In one embodiment, the IED composes a message using a mail user agent (MUA). The IED enters the email address of a recipient and sends the message. The MUA formats the message in email format and uses the Submission Protocol (a profile of SMTP, see RFC 6409) to send the message to the local mail submission agent (MSA), for example, run by the IED's internet service provider (ISP). The MSA looks at the destination address provided in the SMTP protocol (not from the message header). An Internet email address is a string of the form recipient@meter. The part before the @ sign is the local part of the address, often the username of the recipient, and the part after the @ sign is a domain name or a fully qualified domain name. The MSA resolves a domain name to determine the fully qualified domain name of the mail exchange server in the Domain Name System (DNS). The DNS server for the domain responds with any MX records listing the mail exchange servers for that domain, for example, a message transfer agent (MTA) server run by the recipient's ISP. The MSA sends the message to MTA using SMTP. This server may need to forward the message to other MTAs before the message reaches the final message delivery agent (MDA). The MDA delivers it to the mailbox of the recipient. The recipient retrieves the message using either the Post Office Protocol (POP3) or the Internet Message Access Protocol (IMAP4).

Other types of e-mail systems may also be employed, for example, web-based email, POP3 (Post Office Protocol 3) email services, IMAP (Internet Message Protocol) e-mail servers, and MAPI (Messaging Application Programming Interface) email servers to name a few.

In a further embodiment, FTP may be employed. Techniques for transferring data from an IED to a device is described in commonly owned pending U.S. patent application Ser. No. 12/061,979, the contents of which are incorporated by reference.

In one embodiment, IEDs employ Universal Plug and Play (UPnP) protocol, which is a set of networking protocols that permits networked devices to discover each other's presence, and notify clients of services available on these devices. UPnP takes the form of UDP broadcast messages, which are sent across a local network, to notify other devices of available services, and http requests to query the details of those devices and services.

In one embodiment, UPnP is employed to allow the network addresses of devices, such as meters, to automatically be discovered by a client. This enables the client software to display a list of all devices which are available. In addition, this could also allow the client software to enable the user to connect to these devices, without having to configure the network address of that device. In addition, the UPnP notify may be used to indicate the health status of the device, including starting up, running, errors in configuration, and resetting.

In another embodiment, UPnP is employed to allow devices, such as meters, to notify the clients of what services they support, such as modbus, dnp, web, ftp, log download, and data streaming. This could be extended by including information particular to that service or protocol, such as to allow the client to interface with that service with no user input. This could enable the client software to display the device such that the user can focus on the details of the device, rather then worrying about the minutiae of connection information.

In another embodiment, an automated server is configured to perform actions related to these automatically discovered services, such as retrieving real time information, downloading logs, or registering for notification of events. For example, as shown in FIG. 8, a server 530 could be on a network 516 to collect log information from meters 510, 512, 514, and whenever a meter broadcast that it provided log data, the server 530 could automatically collect that data from the meter. As another example, the server 530 could automatically poll and log the realtime readings of all meters on the network, automatically including them as the become available on the network. As described above, the server 530 may then post the data to server 524.

In one embodiment, HTTP tunneling is employed to send a message (including the IED's or meter's data) to a server, which listens for such messages, and parses out the IED's or meter's data. This could be performed by embedding the meter's data in a HTTP message, which could be sent to the server, for example, server 424 as shown in FIG. 6. The HTTP wrapper would allow this data to pass through firewalls which only allow web traffic. For example, in the architecture of FIG. 6, IED 410 may send a HTTP message containing measured or calculated data through firewall 418 to server 424 or server 430. In another example as shown in FIG. 8, server 530 may collect data from the various IEDs 510, 512, 514 and forward the collected data in a HTTP message through firewall 518 to server 524.

It is to be appreciated that HTTP tunneling applies to system architectures where a server is provided as the receiver of the IED or meter data, as the clients would be unable to process such information. Referring to FIG. 9, server 630 is the destination (and collects) the messages generated from the various IEDs 610, 612, 614, but device 628 is a client, and without server software, would be unable to receive the messages. However, by programming device 628 with server software, the client device 628 becomes a server and can receive the messages.

It is further to be appreciated that the HTTP message can be sent based on various triggers including, but not limited to, time-based trigger, event-based trigger, storage capacity based trigger, etc.

In another embodiment, the IEDs can communicate through to devices using a Simple Network Management Protocol (SNMP) trap. SNMP traps enable an agent, e.g., an agent running on an IED, to notify a management station, e.g., a server, of significant events by way of an unsolicited SNMP message. Upon occurrence of an event, an agent that sends an unsolicited or asynchronous trap to the network management system (NMS), also known as a manager. After the manager receives the event, the manager displays it and can choose to take an action based on the event. For instance, the manager can poll the agent or IED directly, or poll other associated device agents to get a better understanding of the event. For the management system to understand a trap sent to it by an agent, the management system must know what the object identifier (OID) of the trap or message defines. Therefore, the management system or server must have the Management Information Base (MIB) for that trap loaded. This provides the correct OID information so that the network management system can understand the traps sent to it. Additionally, a device does not send a trap to a network management system unless it is configured to do so. A device must know that it should send a trap. The trap destination is usually defined by an IP address, but can be a host name, if the device is set up to query a Domain Name System (DNS) server.

Common chat protocols, such as MSN, AIM, IRQ, IRC, and Skype, could be used to send a message, containing the meter's data, to a public chat server, e.g., server 440, 540, 640, which could then route that message to any desired client. Another possible implementation could be to have a special client that listens for these messages, parses the data contents, and presents them an another manner. In one embodiment, the messages are proprietary format Ethernet messages, typically sent over TCP. It is to be appreciated that the actual format depends on the specific chat protocol.

A public social server that supports a common web interface for posting information, such as Twitter™, Facebook™, BBS's, could be used to post a status, containing the meter's data, to a user on the public social server for that service, e.g., server 440, 540, 640. This post could then be viewed by the clients to see the meter's data, or read by another server for further parsing and presentation. The data could be formatted as human readable text (e.g., "The voltage is 120.2v"), as machine parsable text (e.g., "voltage.an=120.2"), hex representing binary data (e.g., "0152BF5E"). The HTTP interface could be used, which would work the same way as a user updating it from their browser (HTTP push). Some of these servers also provide a proprietary format Ethernet message, typically sent over TCP.

In one non-limiting example, a public social server such as the system employed by Facebook may be utilized to post the IEDs data so the data is accessible on the external network outside of the firewall. Facebook uses a variety of services, tools and programming languages to make up its infrastructure which may be employed in the systems and methods of the present disclosure to implement the technique described herein. In the front end, the servers run a LAMP (Linux, Apache, MySQL and PHP) stack with Memcache. Linux is a Unix-like operating system kernel. It is open source, highly customizable, and good for security. Facebook's server runs the Linux operating system Apache HTTP server. For the database, Facebook uses MySQL for its speed and reliability. MySQL is used primarily as a key store of value when the data are randomly distributed among a large number of cases logical. These logical instances extend across physical nodes and load balancing is done at physical node. Facebook uses PHP, since it is a good web programming language and is good for rapid iteration. PHP is a dynamically typed language/interpreter. Memcache is a caching system that is used to accelerate dynamic web sites with databases (like Facebook) by caching data and objects in RAM to reduce reading time. Memcache is the main form of caching on Facebook and helps relieve the burden of database. Having a caching system allows Facebook to be as fast as it is to remember information. Furthermore, Facebook backend services are written in a variety of different programming languages like C++, Java, Python, and Erlang. Additionally, it employs the following services: 1.) Thrift—a lightweight remote procedure call framework for scalable cross-language services development, which supports C++, PHP, Python, Perl, Java, Ruby, Erlang, and others; 2.) Escribano (server logs)—a server for aggregating log data streamed in real time on many other servers, it is a scalable framework useful for recording a wide range of data; 3.) Cassandra (database)—a database designed to handle large amounts of data spread out across many servers; 4.) HipHop for PHP—a transformer of source code for PHP script code and was created to save server resources, HipHop transforms PHP source code in C++ optimized, among others. It is to be appreciated that any of the above systems, devices and/or services may be implemented in the various architectures disclosed in the present disclosure to achieve the teaching and techniques described herein.

A public web site, e.g., hosting on server 440, 540, 640, which allows the posting of information, such as a Forum, could be used to post a message, containing the meter's data, to a group, thread, or other location. This post would take place by a HTTP POST to the web site's server, where by the server would store that information, and present it on the web site. This message could then be viewed by the clients to see the meter's data, or read by another server for further parsing and presentation. The data could be formatted as human readable text (e.g., "The voltage is 120.2v"), as machine parsable text (e.g., "voltage.an=120.2"), hex representing binary data (e.g., "0152BF5E"). The HTTP interface could be used, which would work the same way as a user updating it from their browser (HTTP push).

User Datagram Protocol (UDP) messages could be used to send a message from the IEDs or meters to a server, which listens for such messages, and parses out the meter's data. When employing UDP broadcasts, messages could be sent from the IEDs or meters to a server, e.g., servers 530, 630, since UDP broadcasts do not work across networks. The messages containing the IED's or meter's data can then be sent to external networks via any of the described (or to be developed) communication methods. Alternatively, a UDP unicast could support sending to any server, e.g., server 424, 524.

A Virtual Private Network (VPN) could be created such that each meter on the internal network is part of the same virtual private network as each of the clients. A VPN is a technology for using the Internet or another intermediate network to connect computers to isolated remote computer networks that would otherwise be inaccessible. A VPN provides security so that traffic sent through the VPN connection stays isolated from other computers on the intermediate network. VPNs can connect individual IEDs or meters to a remote network or connect multiple networks together. Through VPNs, users are able to access resources on remote networks, such as files, printers, databases, or internal websites. VPN remote users get the impression of being directly connected to the central network via a point-to-point link. Any of the other described (or to be developed) protocols could then be used to push data to another server or clients on the VPN.

Hosted data services, such as a hosted database, cloud data storage, Drop-Box, or web service hosting, could be used as an external server to store the meter's data, called Hosting. Each of these Hosts, e.g., servers 440, 540, 640, could then be accessed by the clients to query the Hosted Data. Many of these hosted data services support HTTP Push messages to upload the data, or direct SQL messages. As many web service and cloud hosts allow their users to use their own software, a hosted data service could be further extended by placing proprietary software on them, thus allowing them to act as the external meter server for any of the previously mentioned methods (e.g., servers 424, 524).

In another embodiment, the IEDs can communicate to devices using Generic Object Oriented Substation Event (GOOSE) messages, as defined by the IEC-61850 standard, the content of which are herein incorporated by reference. A GOOSE message is a user-defined set of data that is "published" on detection of a change in any of the contained data items sensed or calculated by the IED. Any IED or device on the LAN or network that is interested in the published data can "subscribe" to the publisher's GOOSE message and subsequently use any of the data items in the message as desired. As such, GOOSE is known as a Publish-Subscribe message. With binary values, change detect is a False-to-True or True-to-False transition. With analog measurements, IEC61850 defines a "deadband" whereby if the analog value changes greater than the deadband value, a GOOSE message with the changed analog value is sent. In situation where changes of state are infrequent, a "keep alive" message is periodically sent by the publisher to detect a potential failure. In the keepalive message, there is a data item that indicates "The NEXT GOOSE will be sent in XX Seconds" (where XX is a userdefinable time). If the subscriber fails to receive a message in the specified time frame, it can set an alarm to indicate either a failure of the publisher or the communication network.

The GOOSE message obtains high-performance by creating a mapping of the transmitted information directly onto an Ethernet data frame. There is no Internet Protocol (IP) address and no Transmission Control Protocol (TCP). For delivery of the GOOSE message, an Ethernet address known as a Multicast address is used. A Multicast address is normally delivered to all devices on a Local Area Network (LAN). Many times, the message is only meant for a few devices and doesn't need to be delivered to all devices on the LAN. To minimize Ethernet traffic, the concept of a "Virtual" LAN or VLAN is employed. To meet the reliability criteria of the IEC-61850, the GOOSE protocol automatically repeats messages several times without being asked. As such, if the first GOOSE message gets lost (corrupted), there is a very high probability that the next message or the next or the next will be properly received.

It is to be appreciated that the above-described one-way communication embodiments may apply to systems other than for energy metering. For example, the present disclosure may be applied to a vending machine or system, wherein the vending machine located in a building or structure having a private or corporate network. The vending machine will include, among other data collecting components, at least a communication device or network interface as described above. The communication device or network interface will coupled the vending machine to the internal network which may be further coupled to the Internet via a firewall. The vending machine may vend or dispense a plurality of items, such as soda cans, candy bars, etc., similar to the vending machine described in U.S. Pat. No. 3,178,055, the contents of which are incorporated by reference. In accordance with the present disclosure, the vending machine will monitor and collect data related to the items sold. Such data may include quantities of items sold, a re-stock limit that has been reached, total revenue generated by the vending machine, etc. In one embodiment, the vending machine will post to a web site, residing on a server outside of the internal network such as the Internet, quantities of specific items sold by the vending machine that are required to fill the vending machine. In this manner, an operator that maintains the vending machine can check the web site before going to the location of the vending machine and know exactly how many items are required to fill the vending machine before going to the location to refill the vending machine.

In another embodiment, the teachings of the present disclosure may be applied to a medical device, for example, a medical monitoring device configured to be worn on a patient. In this embodiment, the medical monitoring device will include at least a communication device or network interface as described above and monitor a certain parameter relating to a patient, e.g., a heartbeat. In one embodiment, the at least a communication device or network interface operates on a wireless connection and coupled the medical monitoring device to internal network (e.g., a home network) which may be further coupled to the Internet via a firewall, e.g., a router provided by the Internet Service Provider. At predetermined intervals, the medical monitoring device will communicate to and post the monitored data on a remote website. A user such as a doctor may then view the data of the patient by accessing the web site and not directly connecting to the medical monitoring device.

Other embodiments may include security systems such as fire alarm systems, security alarm systems, etc., which need to report data. Also envisioned are manufacturing sensing equipment, traffic sensing equipment, scientific instrumentation or other types of reporting instrumentation.

Based on the sensitivity of the data being communicated and posted through the firewall to various external networks, various data security techniques are employed by the IEDs (e.g., meters, vending machines, medical monitoring device, etc.) contemplated by the present disclosure, some of which are described below.

The original FTP specification is an inherently insecure method of transferring files because there is no method specified for transferring data in an encrypted fashion. This means that under most network configurations, user names, passwords, FTP commands and transferred files can be "sniffed" or viewed by anyone on the same network using a packet sniffer. This is a problem common to many Internet protocol specifications written prior to the creation of SSL such as HTTP, SMTP and Telnet. The common solution to this problem is to use simple password protection or simple encryption schemes, or more sophisticated approaches using either SFTP (SSH File Transfer Protocol), or FTPS (FTP over SSL), which adds SSL or TLS encryption to FTP as specified in RFC 4217. The inventors have contemplated the use of each of these schemes in the IEDs described above.

In one embodiment, the FTP server 131 in the IED 110 shown in FIG. 3 uses a set of username and passwords which are programmed through Modbus. These username and passwords can only be programmed when a user performs a logon with administrative rights. Each programmed user account can be given differing permissions, which grant or restrict access to different roles within the file system. Each role controls read and write access to specific files and directories within the file system through FTP. These roles can be combined to customize the access a specific user is given. When passwords are disabled by the user, a default user account is used, with full permissions, and a username and password of "anonymous".

Password protection schemes are measured in terms of their password strength which may be defined as the amount of resiliency a password provides against password attacks. Password strength can be measured in bits of entropy. Password strength is an important component of an overall security posture, but as with any component of security, it is not sufficient in itself. Strong passwords can still be exploited by insider attacks, phishing, keystroke login, social engineering, dumpster diving, or systems with vulnerabilities that allow attackers in without passwords. To overcome these drawbacks it is contemplated to use some form of password encryption scheme (e.g., 8-bit, 10-bit, 16-bit) in concert with the password protection system to facilitate secure communication between an external device, such as client 102 and the FTP server 131. However, there are drawbacks associated even with these schemes. For example, a username and password may be encoded as a sequence of base-64 characters. For example, the user name Aladdin and password open sesame would be combined as Aladdin:open sesame which is equivalent to QWxhZGRpbjpvcGVuIHN1c2FtZQ==when encoded in base-64. Little effort is required to translate the encoded string back into the user name and password, and many popular security tools will decode the strings "on the fly", so an encrypted connection should always be used to prevent interception.

In another embodiment, an encrypted connection scheme is used. In particular, the FTP server 131 in the IED 110 uses some form of FTP security encryption, such as, for example, FTPS (FTP over SSL), Secure FTP (sometimes referred to as FTP over SSH, i.e., FTP over Secure Shell encryption (SSH)), Simple File Transfer Protocol (SFTP), or SSH file transfer protocol (SFTP). These FTP security encryption protocols provide a level of security unattainable with the previously described password encryption schemes.

FTP over SSH refers to the practice of tunneling a normal FTP session over an SSH connection. Because FTP uses multiple TCP connections, it is particularly difficult to tunnel over SSH. With many SSH clients, attempting to set up a tunnel for the control channel (the initial client-to-server connection on port 21) will protect only that channel; when data is transferred, the FTP software at either end will set up new TCP connections (data channels) which will bypass the SSH connection, and thus have no confidentiality, integrity protection, etc. If the FTP client, e.g., client 102, is configured to use passive mode and to connect to a SOCKS server interface that many SSH clients can present for tunneling, it is possible to run all the FTP channels over the SSH connection. Otherwise, it is necessary for the SSH client software to have specific knowledge of the FTP protocol, and monitor and rewrite FTP control channel messages and autonomously open new forwardings for FTP data channels.

In further embodiments, the networks may be configured to adhere to various cyber security standards to minimize the number of successful cyber security attacks. The cyber security standards apply to devices, IEDs, computers and computer networks. The objective of cyber security standards includes protection of information and property from theft, corruption, or natural disaster, while allowing the information and property to remain accessible and productive to its intended users. The term cyber security standards means the collective processes and mechanisms by which sensitive and valuable information and services are protected from publication, tampering or collapse by unauthorized activities or untrustworthy individuals and unplanned events respectively. In the various embodiments and implementations of the present disclosure, the systems, devices and methods may be configured to be in accordance with, for example, the Standard of Good Practice (SoGP) as defined by the Information Security Forum, Critical Infrastructure Protection (CIP) standards as defined by the North American Electric Reliability Corporation (NERC), and the ISA-99 standard as defined by the International Society for Automation (ISA), the contents of each being incorporated by reference herein. It is to be appreciated that this lists of cyber security standards is merely an exemplary list and is not meant to be exhaustive.

In one embodiment, the IED 10 implements an email alarm/notification feature to send emails when selected events occur regarding power usage and power quality for any metered point within a power distribution system 11. These events may include Log Reset, Log Retrieve Begins, Clock Settings Changed, Reset Energies, Reset Min/Max values, Reset Pulse Accumulators, Measuring turned Off, Programmable Settings Change, Failed attempt to securely access (e.g., password fail) to unit, V-Switch Change, Log Babbling, Limit Hit and Meter Started Up, among others. A user can program the IED to only include some of the above-identified events, and also what is the urgency of each event. Indeed, the terms Alarm and Notification are used to express an urgent necessity to inform the event (Alarm) or that the event must be reported but it is not that urgent (Notification).

The reporting of these events, be Alarm or Notification, is through email. The Alarm and Notification events have separate configurations to define the email sender addresses (From) for identifying the originator of the Alarm/Notification and the email recipient addresses (To and CC) where the email Alarm/Notification is to be sent to. In addition, the Notification has a periodicity to send the emails, i.e., a user-defined interval of when to send the Notification.

Figure 10:
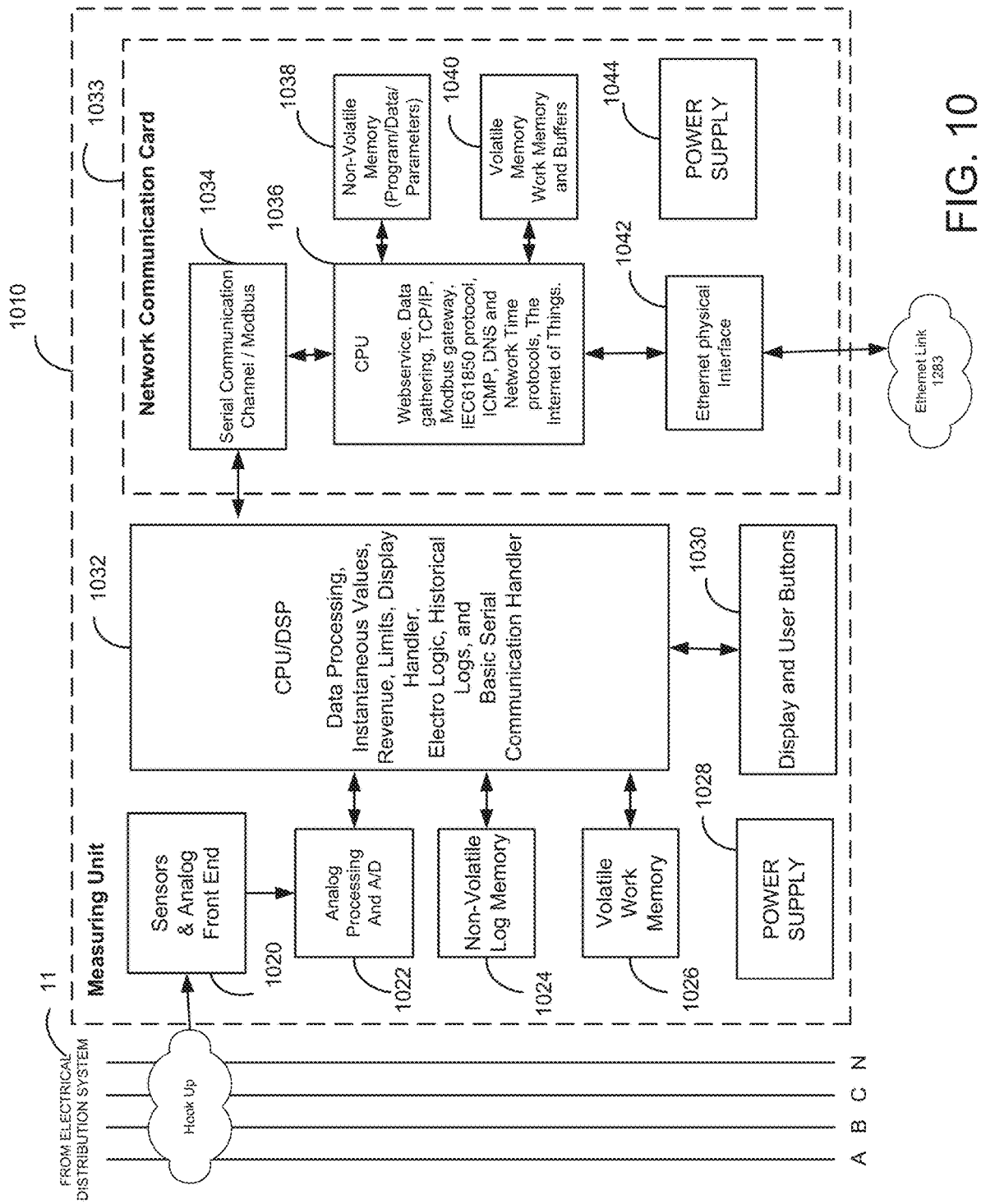
FIG. 10 is a block diagram of an IED, according to another embodiment of the present disclosure.

FIG. 10 is a block diagram of a measuring unit 1010, i.e., an IED, including a network communication network card 1033 for responding to user data and information requests regarding power usage and power quality for any metered point within a power distribution system 11. Furthermore, the communication card 1033 is configured for sending/receiving alarm and/or notification messages.

The measuring unit 1010 includes at least one sensor & analog front end 1020, at least one analog processing and analog-to-digital (A/D) converter 1022, at least one non-volatile log memory 1024, at least one volatile work memory 1026, a power supply 1028, display and user buttons interface 1030, and a central processing unit (CPU) 1032. The CPU 1032 may be a processor, the functions of which may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. The network communication card 1033 may be coupled to or disposed into the measuring unit 1010 to extend communication capabilities of the measuring unit 1010. These capabilities include: a Web Server that allows any Internet browser to connect to the measuring unit 1010, a Modbus Server that allows a Modbus RTU client to connect to the measuring unit 1010 for transferring data and operation parameters; and other supporting services. In one embodiment, the network communication card 1033 implements an email alarm/notification feature to send emails when selected events occur. When an event is retrieved or identified by the network communication card 1033, the event is classified according with user settings (as an Alarm or Notification), and an email body is created and placed into a buffer for later processing. If the event is an Alarm, the email is sent as soon as possible, for example, within a 1-minute window. If the event is a Notification, the email is sent within a user-programmed window, for example, which can range from about 5 minutes to about 24 hours.

The network communication card 1033 is shown to include, in one embodiment, a serial communication interface 1034 to communicate with the measuring unit 1010 unit, a CPU 1036, non-volatile memory 1038, volatile memory 1040, an Ethernet physical interface 1042 and a power supply 1044. The Ethernet physical interface 1042 couples the measuring unit 1010 to at least one network, e.g., the Internet, via an Ethernet link 1283. Also, power supply 1044 in the network card, for example, is a block that represents the conversion of the host provided voltage (5 VDC) from power supply 1028 into a voltage suited for the network card components, and electric isolation between both power rails.

Figure 11:
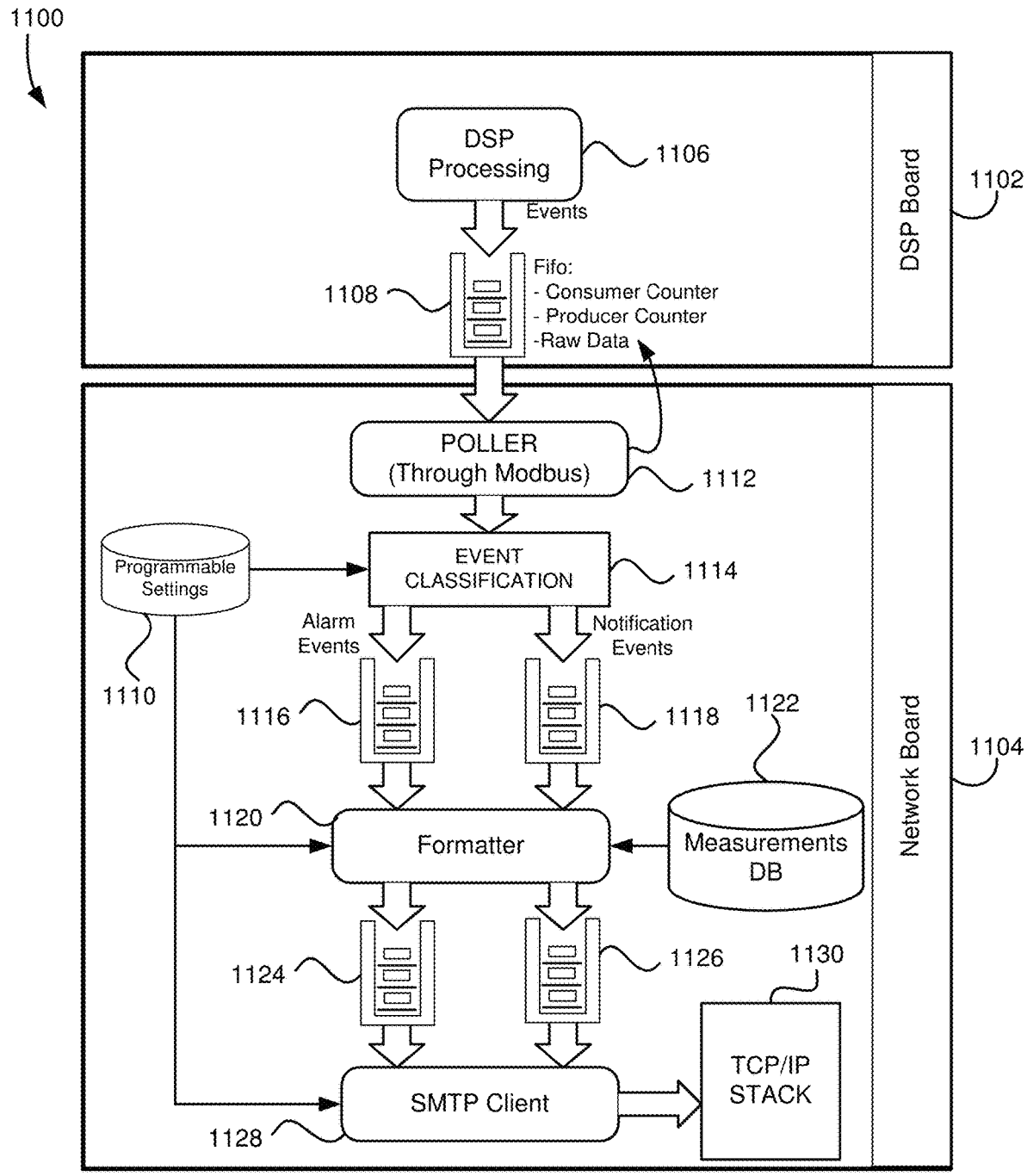
FIG. 11 is a block diagram of an email Alarm/Notification implementation according to an embodiment of the present disclosure.

FIG. 11 is a functional block diagram of a firmware email Alarm/Notification implementation for sending e-mails regarding measured data and others from the measuring unit 1010. The firmware is made of two entities, and implemented in blocks. The first entity is in the DSP board 1102 and the second entity is the network communication card 1104.

The DSP board entity 1102 has basically two blocks: a Hook for the events and a bi-managed FIFO buffer. The first block is a hook within an event handler 1106. The event handler 1106 is a function in the DSP that identifies the event that needs to be written in the Log-Flash memory 1024, as shown in FIG. 10. The hook basically creates a copy of the event to be written, and sends this copy to a bi-managed FIFO buffer 1108.

The second block, the bi-managed FIFO buffer 1108, is a circular buffer that receives event-packets from the hook, and updates a producer counter every time a new packet is buffered. As long as there is space in the circular buffer, the FIFO buffer 1108 can accept event-packets. There is also the consumer counter which takes count for the start of the unconsumed packets in the buffer. Consume in this context, means the second entity—network communication card 1104—has read the packet. The buffer area, the consumer and producer counters are exposed to a poller 1112 in the network communication card 1104, the details of which are described below. The network communication card 1104 can write the consumer counter to make more space in the circular buffer, as it reads the packet.

Figure 12:
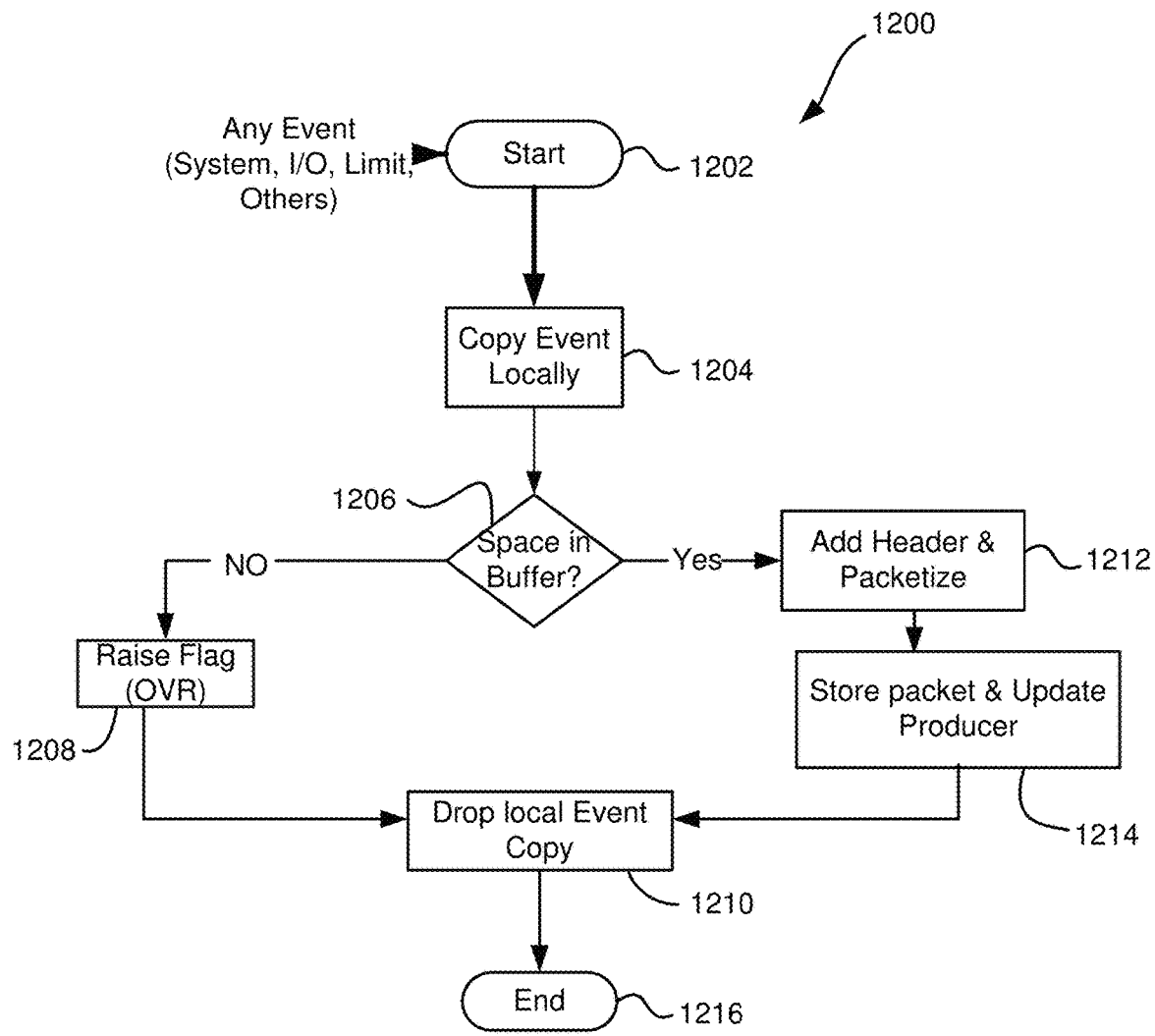
FIG. 12 is an exemplary flowchart illustrating event buffering according to an embodiment of the present disclosure.

FIG. 12 shows a non-limiting and exemplary flowchart 1200 illustrating event buffering implemented in the DSP board 1102. In step 1202, any event that has been previously defined triggers the event buffering. The event is copied locally in the FIFO buffer 1108 from the hook in the event handler 1106, step 1204. In step 1206, the FIFO buffer 1108 is scanned to determine if there is space for the event copy. If there is no space in the FIFO buffer 1108, a flag is raised, in step 1208, and the local event copy is dropped, in step 1210. Otherwise, if it is determined that there is space in the FIFO buffer 1108, a header is added to the event data and the header and event data is packetized, step 1212. In step 1214, the packet is stored and the producer counter is updated by the DSP 1106. The local event copy is dropped, in step 1210, and the process ends, in step 1216.

Basically, the events are sent to network communication card 1104 as they are produced, via the FIFO-buffer 1108, which is managed by the DSP 1106 (producing new event packets) and by the network communication card 1104 (consuming the packets). Since the transfer is done by using Modbus polling, and this means a finite number of registers, the design of the exposed area of the buffer as registers is based in a moving window. This way, the buffer can be big enough to hold several event-packets, and the area (window) to expose as Modbus registers is small enough to be read in a single Modbus transaction.

The network communication card 1104 has several blocks that will be described below. The network communication card 1104 includes a programmable setting database 1110, an event poller 1112, an event classifier 1114, FIFO buffers 1116, 1118, an email formatter 1120, measurements database 1122, FIFO buffers 1124, 1126, a SMTP client 1128, and a TCP/IP stack 1130.

The programmable settings block 1110 is a structure that holds all the user-configuration data for the network communication card 1104. Part of this comes from the DSP configuration registers, but the email Alarm/Notification configuration is stored in the network communication card 1104. It is to be appreciated that the programmable settings may be stored in non-volatile memory 1038, as shown in FIG. 10. The parameters in the programmable settings for the email Alarm/Notification include, which events need to be monitored, which events are classified as Alarm or Notification, email Server address and login info, recipients for the email, metering values to include in the email and periodicity for Notification, among other minor details.

In one embodiment, to configure the programmable settings, the user may access a configuration page of the network communication card 1104 via a web client, and set the parameters as best suits his needs. For example, to access the setup page of the email Alarm/Notification feature, the following address is entered into web browser running on a device coupled to the network communication card 1104, where the xx.xx.xx.xx is the IP address of the network communication card 1104 to be configure:

http://xx.xx.xx.xx/sys/setup_notification_ssi.htm

Figure 17:
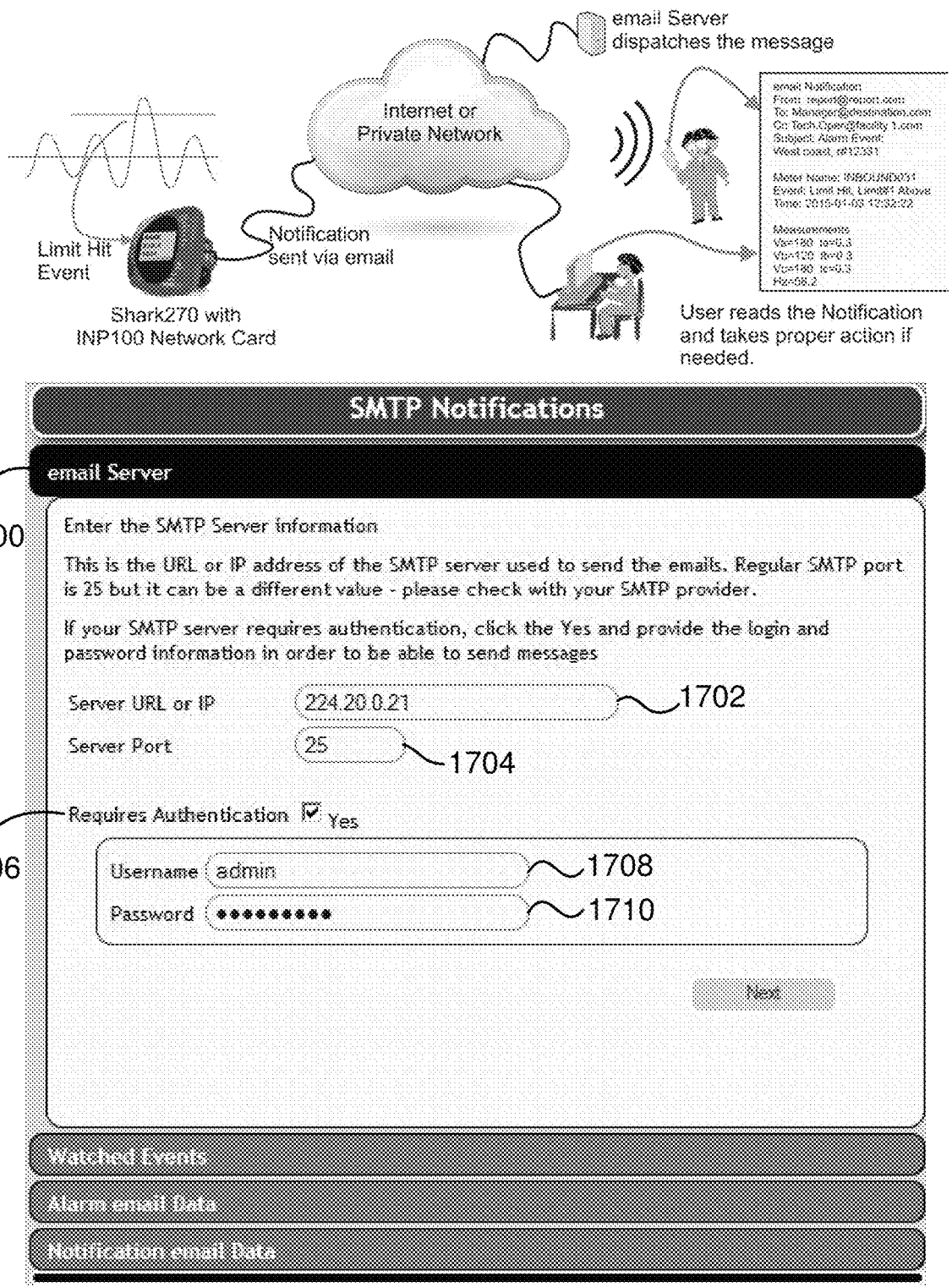
FIG. 17 is an exemplary screen shot of a web page employed to set up an email server according to an embodiment of the present disclosure.

There are four (4) sections in the Notification/Set up page. The first section 1700, email Server, is shown in FIG. 17. The server URL field 1702 can be an IPv4 address or an URL. The server port field 1704 is the TCP/IP Port where the server is listening for SMTP connections. If the server needs authentication, the check box 1706 is checked. The extra fields Username 1708 and Password 1710 will appear, and they must be filled with the proper login information. In certain embodiments, the server must support unauthenticated connection, or plain-text, challenged-digest authentication modes.

Figure 18:
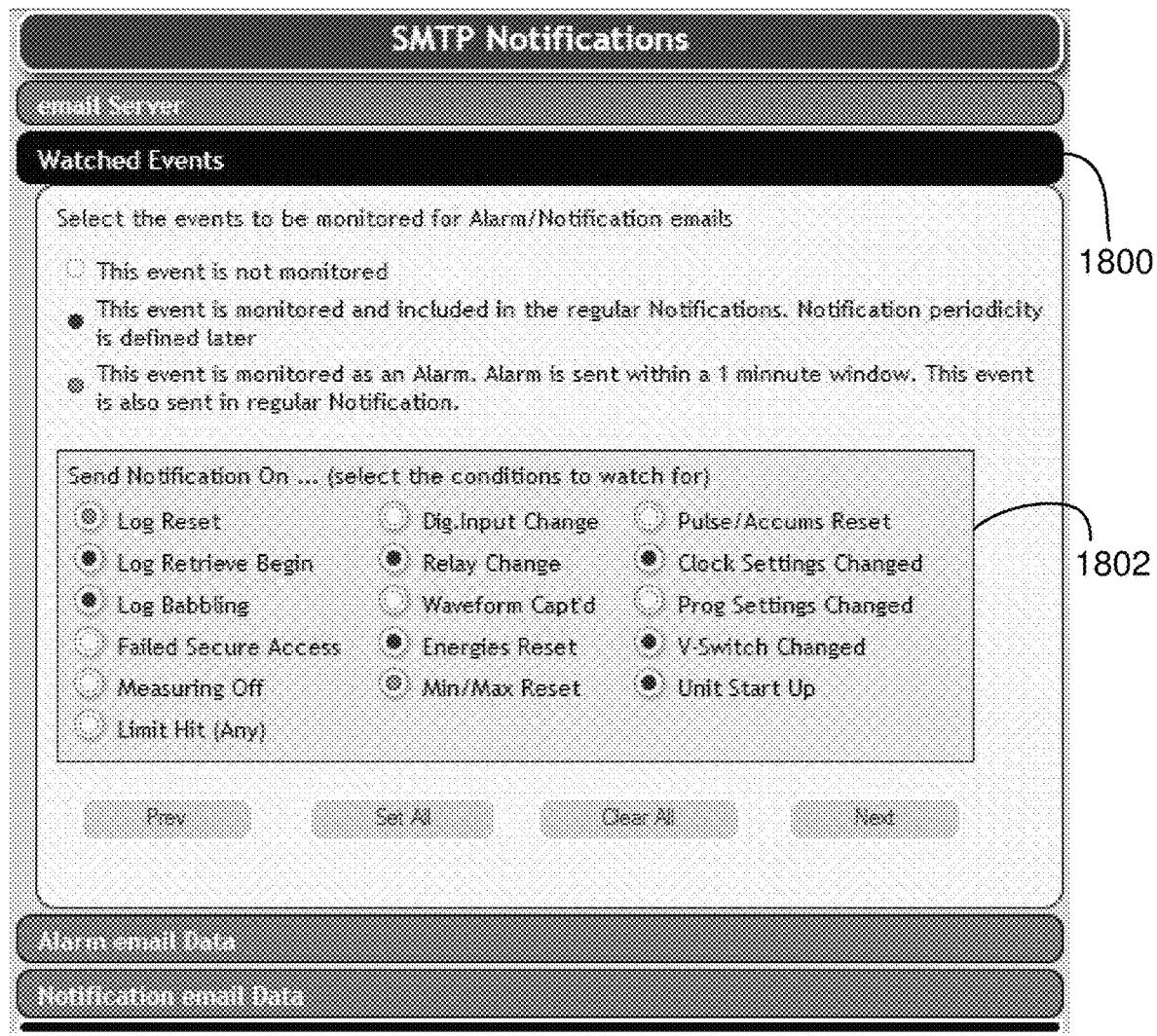
FIG. 18 is an exemplary screen shot of a web page employed to set up monitoring of events according to an embodiment of the present disclosure.

The next section 1800, "Watched Events" as shown in FIG. 18, is where the user configures what events are monitored. The available events are listed in box 1802, and there is a check box to the left of each event. There are three (3) selectable states for the events:

Ignore, the event will be ignored

Notify, the event will be monitored, and if it's detected a Notification email will be created and sent Alarm, the event will be monitored, and if it's detected an Alarm email will be sent as soon as possible. Also the email will create a Notification email but sent only within the periodicity for the Notification emails.

It is to be appreciated that not all the events can be configured for Alarm email. The events: Programmable Settings Change, V-Switch Changed and Unit Start Up can only be configured for Notification email or to be ignored.

Figure 19:
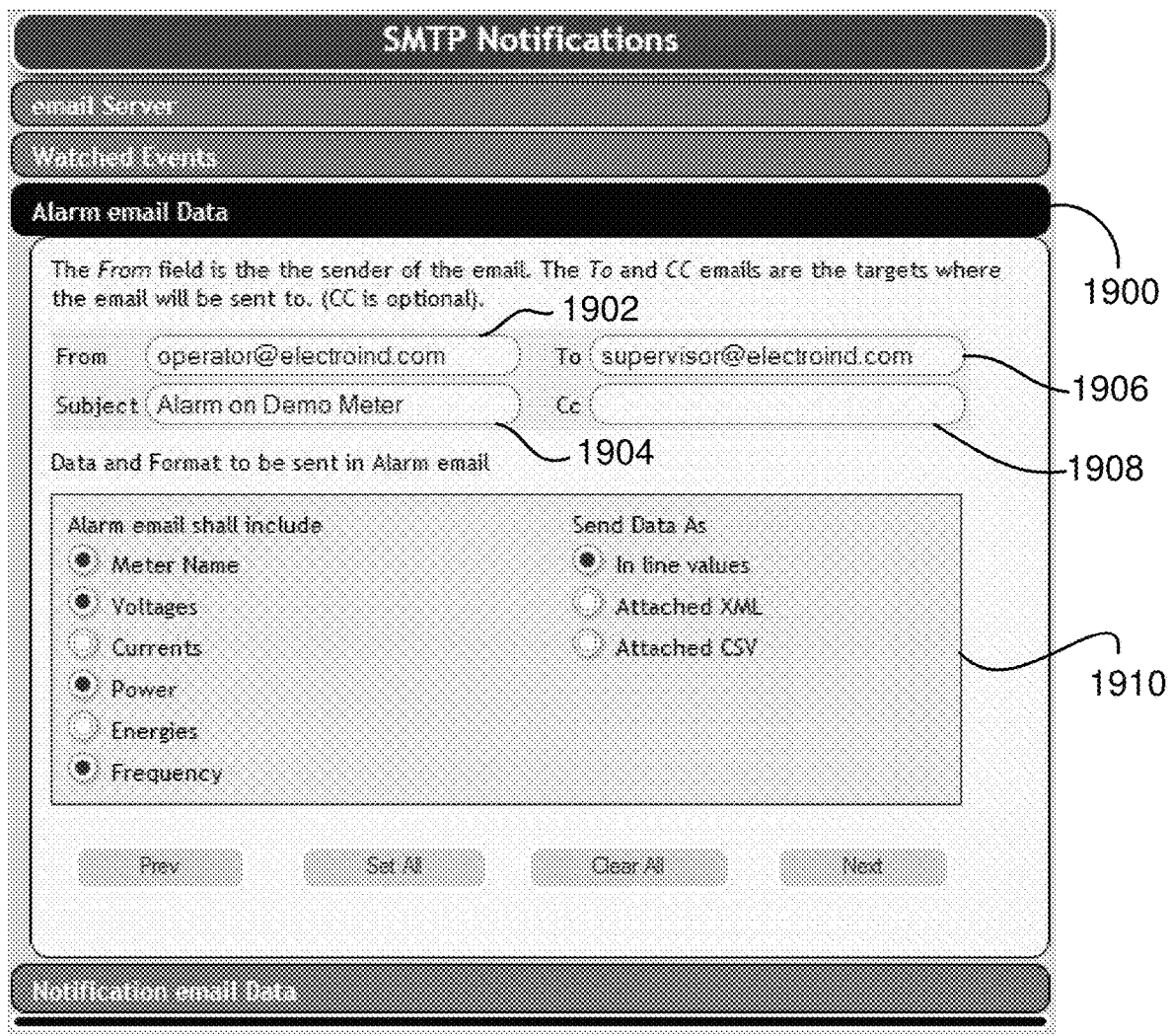
FIG. 19 is an exemplary screen shot of a web page employed to set up a notification email according to an embodiment of the present disclosure.

FIG. 19 shows the page for configuring the Alarm email parameters, "Alarm email Data" 1900. The first field 1902 is the "From" email address. This is the address that will appear as the creator of the email, and it is usually related to the user of the email server. However depending on the server, this can be configured to be any valid email address. The "Subject" field 1904 is the regular subject text included in email messages. Usually this is the 'title' of the email message and can be any text string as long as it fits the field. The "To" and "Cc" fields, 1906 and 1908 respectively, are the recipients email address. The Alarm message will be sent to this email address. At least one of the "To" and "Cc" fields must not be empty.

The lower part of the Alarm email setup section 1910 is used to configure what optional metering variables will be included in the Alarm email. There is no need to include any of these variables, but the user may find useful to include at least the Meter Name. There is also an option to choose how the variables should be included, i.e., "Send Data As". The default method is the "In Line Values", which will place the metering values and their labels in line within the Alarm email message. Certain embodiments will allow to include the variables as a comma separated values file (.csv) or an XML file.

Figure 20:
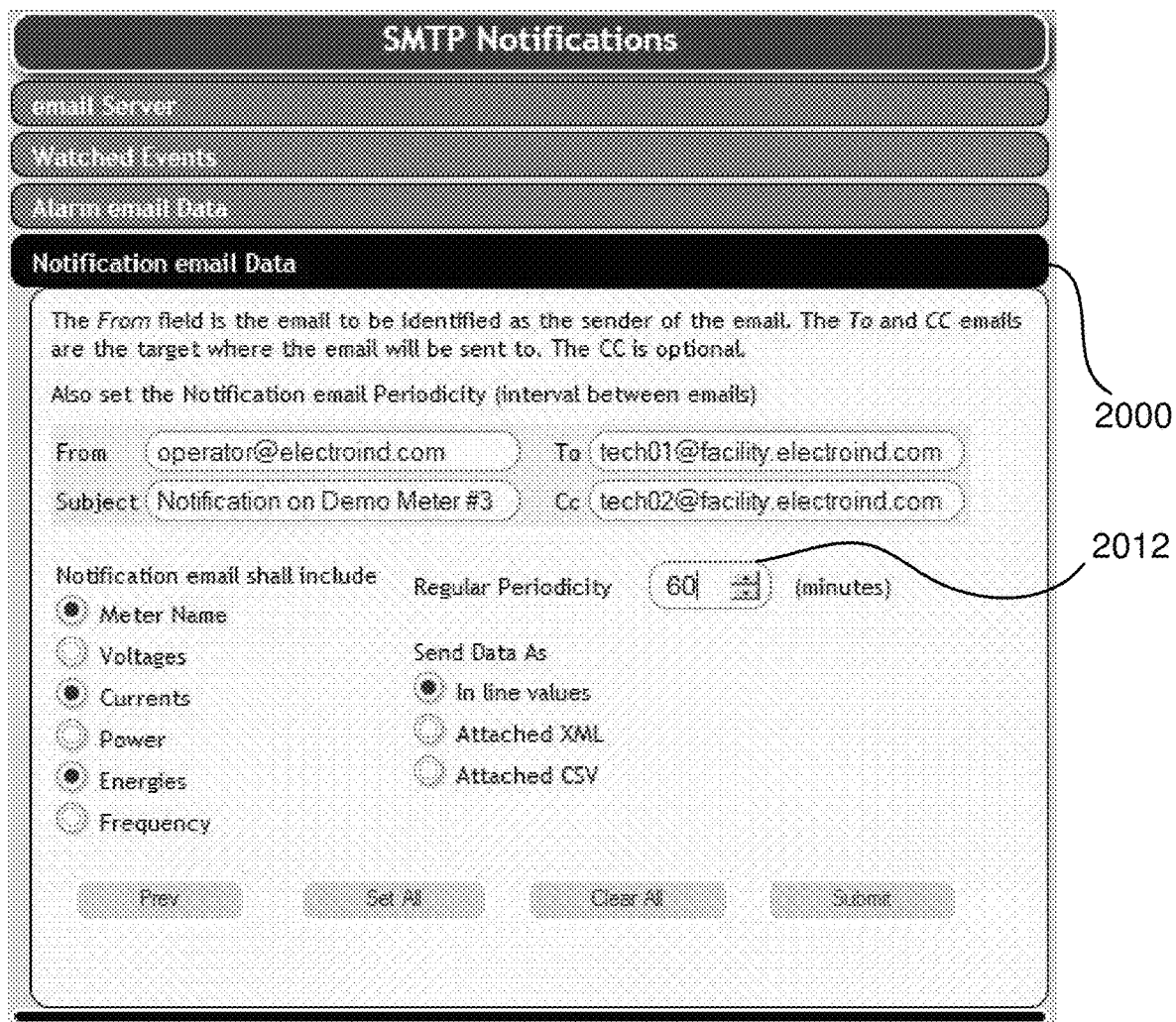
FIG. 20 is an exemplary screen shot of a web page employed to set up a notification email according to an embodiment of the present disclosure.

Referring to FIG. 20, the section 2000 for the Notification email configuration is similar to the Alarm email configuration section, with an extra field. The extra field 2012 is "Regular Periodicity". This field defines how often the Notification email messages should be sent. Valid values are from 15 minutes to 10800 minutes (72 hours). After hitting Submit, the configuration will be saved in the network communication card 1104 and it will be reset. The Alarm/Notification email feature is now active.

Referring back to FIG. 11, the network communication card 1104 polls regularly the DSP unit 1102 via event poller 1112, to try to keep its internal metering values database updated. Every measurement is read at a predetermined interval, e.g., every second. The interval may be larger if the network becomes very busy, like when attending multiple data connections. Also, some registers related to settings, time and status are polled but at little slower rate (approximately 5 seconds). External connections like Modbus TCP/IP, DNP etc., are not preemptive, so they can consume lot of bandwidth also making the regular polling slow. So to not stress the processing too much, the poller block 1112 polls for new event-packets in the event FIFO buffer 1108 of the DSP 1102, every 5 seconds approximately. If there are new packets, the poller 1112 copies each of these packets and passes them to the classification block 1114. Once all the packets have been passed, the consumer register, i.e., consumer counter, in the DSP 1102 is written to reflect the consumed packets.

If the Modbus transaction fails when reading the FIFO buffer 1108, the poller 1112 will try again. If the Modbus transaction fails when writing the consumer counter, it is possible that the next service or pass-through reads more event-packets than originally created. To solve this, the network communication card 1104 keeps a copy of the last producer counter, so it will reveal how many event-packets are really new ones, process them, and a new write will try to update the consumer counter again to its newest value.

Figure 13:
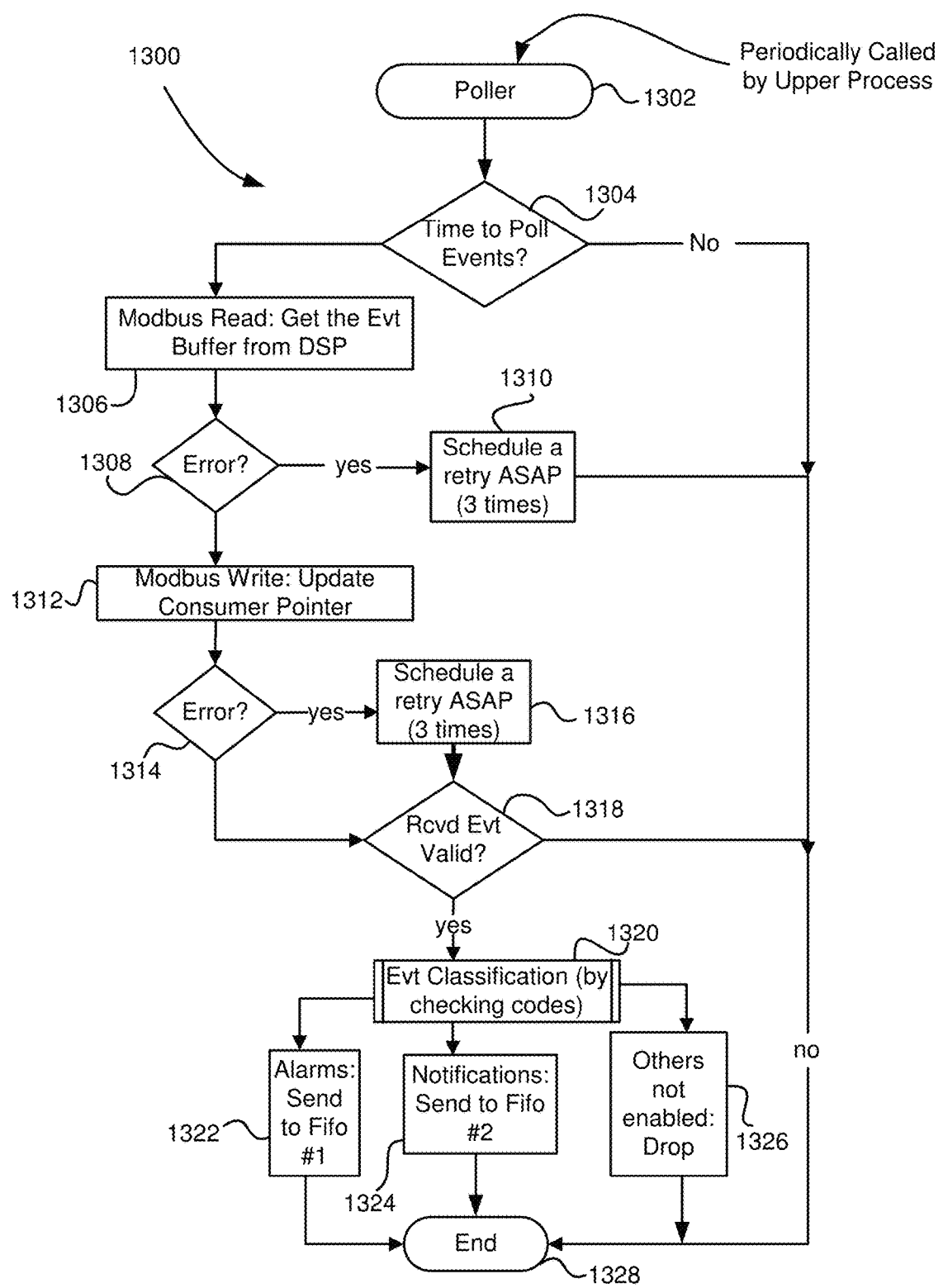
FIG. 13 is an exemplary flowchart illustrating event polling according to an embodiment of the present disclosure.

Referring to FIG. 13, a flowchart 1300 implementing the event poller in the network card side is illustrated. Initially, in step 1302, poller 1112 will periodically poll FIFO buffer 1108 to check for any new events. It is to be appreciated that the periodic intervals that poller 1112 polls FIFO buffer 1108 may be adjusted as necessary. In step 1304, the event poller 1112 will determine if it is time to read the Modbus registers from DSP 1102. If it is determined that it is not time to read the Modbus registers from DSP 1102, in step 1328, the process will end until poller 1112 polls FIFO buffer 1108 again (step 1302). Alternatively, if in step 1304 it is determined that it is time to read the Modbus registers from DSP 1102, in step 1306, network communication card 1104 will read the consumer and producer counters in FIFO buffer 1108 and also any raw data in FIFO buffer 1108.

Then, in step 1308, network communication card 1104 will determine if any of the readings from step 1306 have resulted in an error. If, in step 1308, it is determined that one of the readings from step 1308 has resulted in an error, in step 1310, a new retry (i.e., a new attempt to read new events polled from FIFO buffer 1182) is scheduled as soon as possible for the next execution call of this function. If, in step 1310, after a third retry attempt has been executed, an reading error stills occurs, the process will end in step 1328 and a five second delay will be inserted again (i.e., network communication card 1104, will wait for the next opportunity to poll new events from FIFO buffer 1108). It is to be appreciated that the process 1300 is repeated at an adjustable interval, e.g., every 5 seconds to continuously poll for new events.

Alternatively, if in step 1308, it is determined that no error has occurred during the readings from step 1306, any data from the registers that have been read will be extracted and the consumer pointer/counter is updated, in step 1312. The consumer pointer will be written to DSP 1102 to keep the DSP 1102 updated on how FIFO buffer 1108 is being used, and therefore, avoiding filling up the FIFO buffer 1108 completely. Then, in step 1314, it will be determined if the Modbus write transaction of step 1312 has resulted in error. If, step 1314, it is determined that the Modbus write transaction has resulted in error, there is no quick way to know if the consumer pointer was written to DSP 1102 successfully or not. Therefore, if, in step 1314, it is determined that the Modbus write transaction of step 1312 has resulted in error, in step 1316 a retry is scheduled as soon as possible (i.e., step 1312 will be attempted again). It is to be appreciated, that even if a retry is scheduled for the written consumer pointer update, any raw data extracted during the reading of step 1306 will still be used as necessary by network communication card 1104. If three attempts fail, a new read is attempts after 5 seconds. If the same data is read twice, the data (i.e., the original data) has an ID and timestamp, which can be used to identify it uniquely. So, the worst case scenario would be to fetch the same event twice, and this will be detected by the formatter 1120, which merges messages with same time-stamp.

Alternatively, if, in step 1314, it is determined that the Modbus write transaction has not resulted in error, in step 1318, it will be determined if the received event (i.e., raw data extracted in step 1306) is a valid event. If, in step 1318, it is determined that the received event is not a valid event, in step 1328, the process will end. However, if, in step 1318, it is determined that the received event is a valid event, the event will be classified according to any user setting stored in programmable setting 1110. If the received event is classified as an Alarm, in step 1322, the received event is sent to FIFO buffer 1116. Alternatively, if the received event is classified as a Notification, in step 1324, the received event is sent to FIFO buffer 1118. If the received event is neither an Alarm nor Notification (i.e., an event that is not enabled according to the user settings), in step 1326, the received event will be dropped or ignored. After the received event has been sent to the proper FIFO buffer or dropped in accordance with steps 1322, 1324, or 1326, in step 1328 the process will end. It is to be appreciated that the process 1300 is repeated at an adjustable interval, e.g., every 5 seconds to continuously poll for new events.

As described above in step 1320 of FIG. 13, any event-packet received or identified from the poller 1112 is classified according to the user settings. The packet can be ignored (if not considered by the user) and dropped (step 1326 of FIG. 13), or classified as Alarm or Notification (steps 1322 or 1324 of FIG. 13). Below, step 1320 of FIG. 13 will be described in greater detail.

Figure 14:
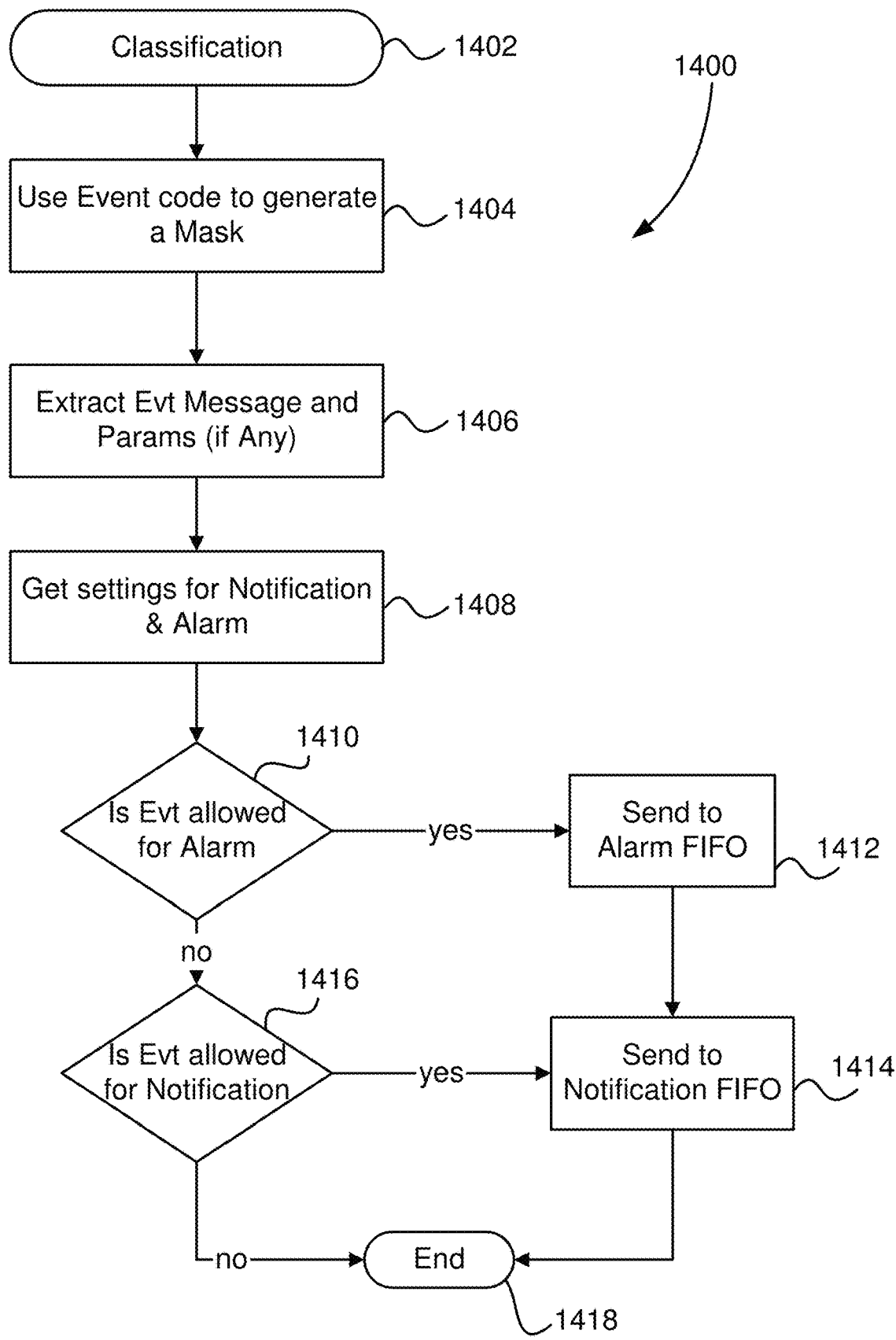
FIG. 14 is an exemplary flowchart illustrating event classification according to an embodiment of the present disclosure.

Turning to FIG. 14, a flow-chart illustration the event classification process 1400 that takes place in step 1320 of FIG. 13 is shown in accordance with the present disclosure. Initially, in step 1402, the event classification begins when an event is received in the event classifier 1114 from the FIFO buffer 1108 in DSP 1102. When the event is received, in step 1404, an even code included in the raw data (the raw data extracted as part of step 1306 in FIG. 13) is read and used to generate a mask, i.e., the mask filters out events the user is not interested in. Then, in step 1406, an event message is extracted from the raw data. Furthermore, if any parameters are included in the raw data, the raw parameters are extracted as well. After the event message and any parameters have been extract from the raw data, any user settings stored in the programmable settings 1110 are retrieved to be used to classify the received event, in step 1408.

After the user settings have been retrieved, it is determined whether, based on the user settings, the event should be classified as an alarm (i.e., the event is urgent based on the user settings), in step 1410. If the event is classified as an alarm, the event is sent to alarm FIFO 1116 in step 1412. After the event has been sent to the alarm FIFO 1116, the event is also sent to the notification FIFO 1118, in step 1414. Alternatively, in step 1410, if it is determined, based on user settings, that the received event should not be classified as an alarm, in step 1416, it is determined whether, again, based on user settings, the received event should be classified as a notification. If it is determined that the received event should be classified as a notification, the event is sent to notification FIFO 1118, in step 1414, and, in step 1418, the process will end. However, if it is determined that the received event should not be classified as a notification, the event will be dropped or ignored and the process will end in step 1418.

It is to be appreciated that in steps 1410 and 1416, whether the received event is classified as an alarm or a notification, the received event is still sent to the notification FIFO 1118 in step 1414. This is advantageous because it allows the Notification messages to have the most recent information including alarms previously (since the last notification) detected.

Turning again to FIG. 11, as described above, FIFO buffers 1116, 1118, 1124, and 1126 are implemented as circular buffers. However, FIFO buffers 1116 and 1118 are different circular buffers than FIFO buffers 1124 and 1126. FIFO buffers 1116 and 1118 are simple Consumer-Producer circular buffers. The progress of received event-packets in FIFO buffers 1116 and 1118 is simple: New packets are inserted at the end, and new packets are taken from the beginning—and removed from the FIFO.

FIFO buffers 1124 and 1126 are Tri-way Consumer, Traveler, Producer circular FIFO buffers, and are meant to hold the email bodies until the email bodies are sent by the STMP Client 1128. The email bodies in FIFO buffers 1124 and 1126 progress in this way: Net email-bodies are inserted at the end, and email-bodies are read from the beginning but not removed. When an email body is read, it is simply tagged as read, and if the email body needs to be discarded, it is tagged as deleted. But the actual deletion does not happen when the email body is read; instead, the email deletion happens later in a garbage collection process. This was designed this way to avoid an email-body from being deleted (or removed from FIFO buffers 1124 and 1126) in case the email-body was read for sending but the sending failed, so the email-body can be retrieved later.

In FIG. 11, email formatter 1120 takes any received event-packets from FIFO buffers 1116 and 1118 and formats the event-packets as an email body, with the From, Cc, To recipients, Subject/Date fields, event description and optionally metering values selected by the user (in the programmable settings 1110). The email body is formatted as a regular text email. It is to be appreciated that in addition to regular text, it is contemplated to be within the scope of the present disclosure to allow attachment of CSV or XML files with the metering values, i.e., the email may include multipart content which includes an HTML version and an attachment. Below the operation of email formatter 1120 is described in greater detail.

Figure 15:
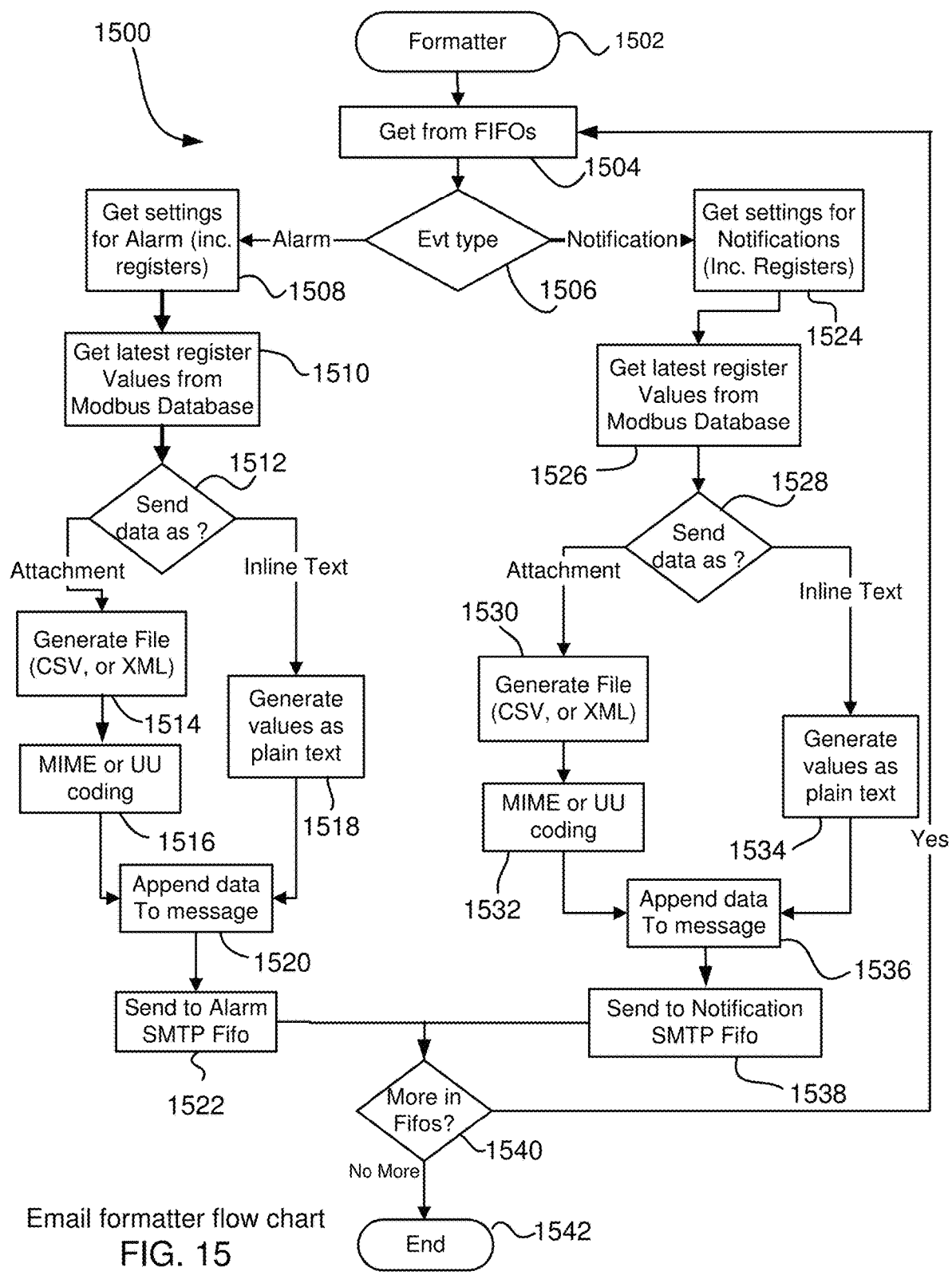
FIG. 15 is an exemplary flowchart illustrating event email formatting according to an embodiment of the present disclosure.

Turning to FIG. 15, a flow chart illustrating the process 1500 of email formatter 1120 is illustrated in accordance with an embodiment of the present disclosure. Initially, in step 1502, email formatter 1120 is initialized. Then, in step 1504, the email formatter 1120 receives event-packets (e.g., alarms or notifications) from FIFO buffers 1116 and 1118. When the event-packets are received, the event itself and any associated data are converted to a human readable string. The converted human readable string comprises the first part of the message. Then, in step 1506, it is determined whether the event type is an alarm or notification.

If in step 1506, it is determined that the event-packet is an alarm, any settings for the alarm are retrieved from programmable settings 1110, in step 1508. The retrieved settings are used to determine what other variables or readings the user wants to be included in the message. Some possible readings are voltage signals, current signals, power signals, energy signals, line frequency, and meter name. It is to be appreciated that there are additional possible readings that may be included in the message and the above list is merely illustrative of a small number of the possible readings.

Figure 21:
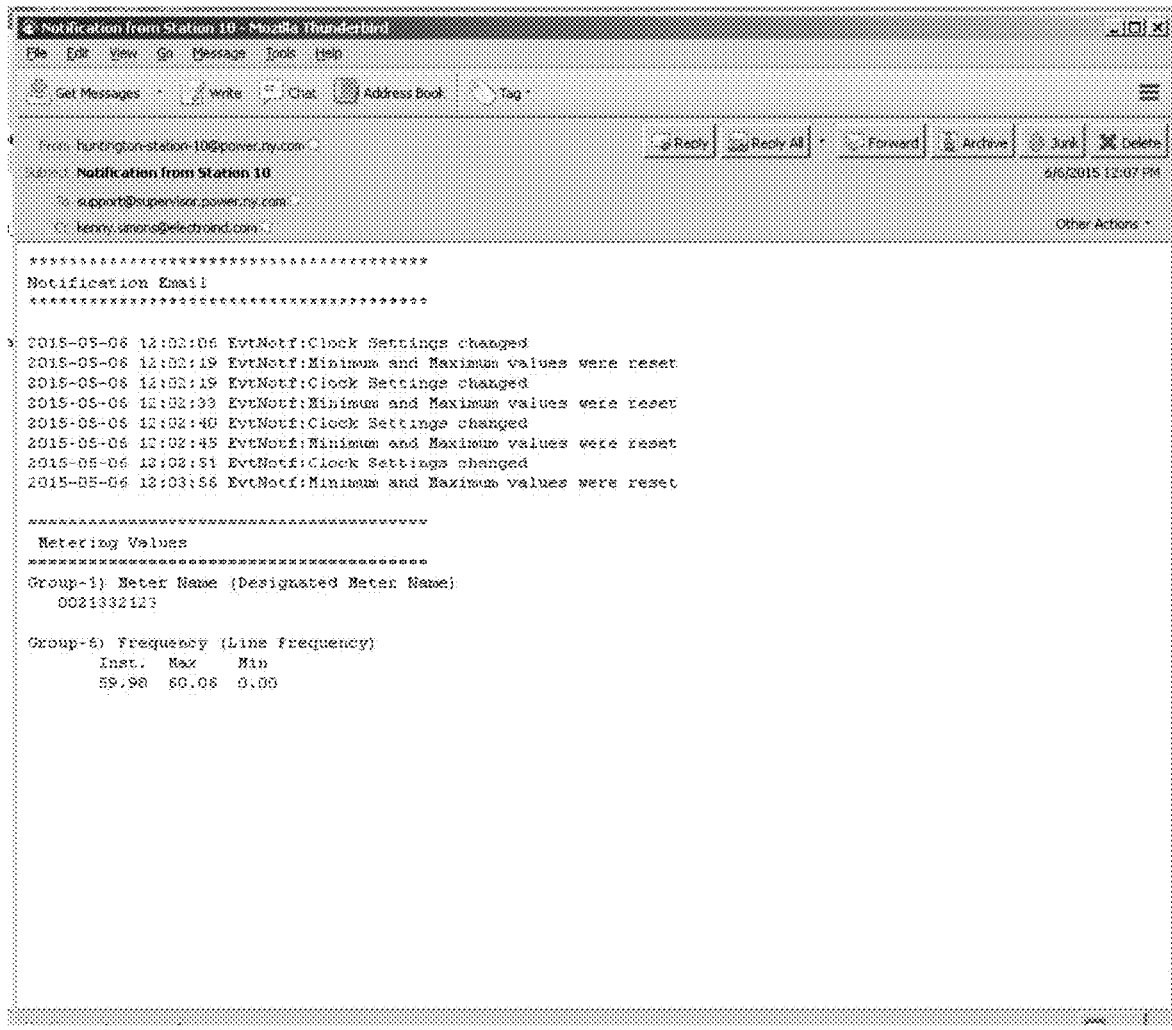
FIG. 21 is an exemplary screen shot of plain text view notification email according to an embodiment of the present disclosure.
Figure 22:
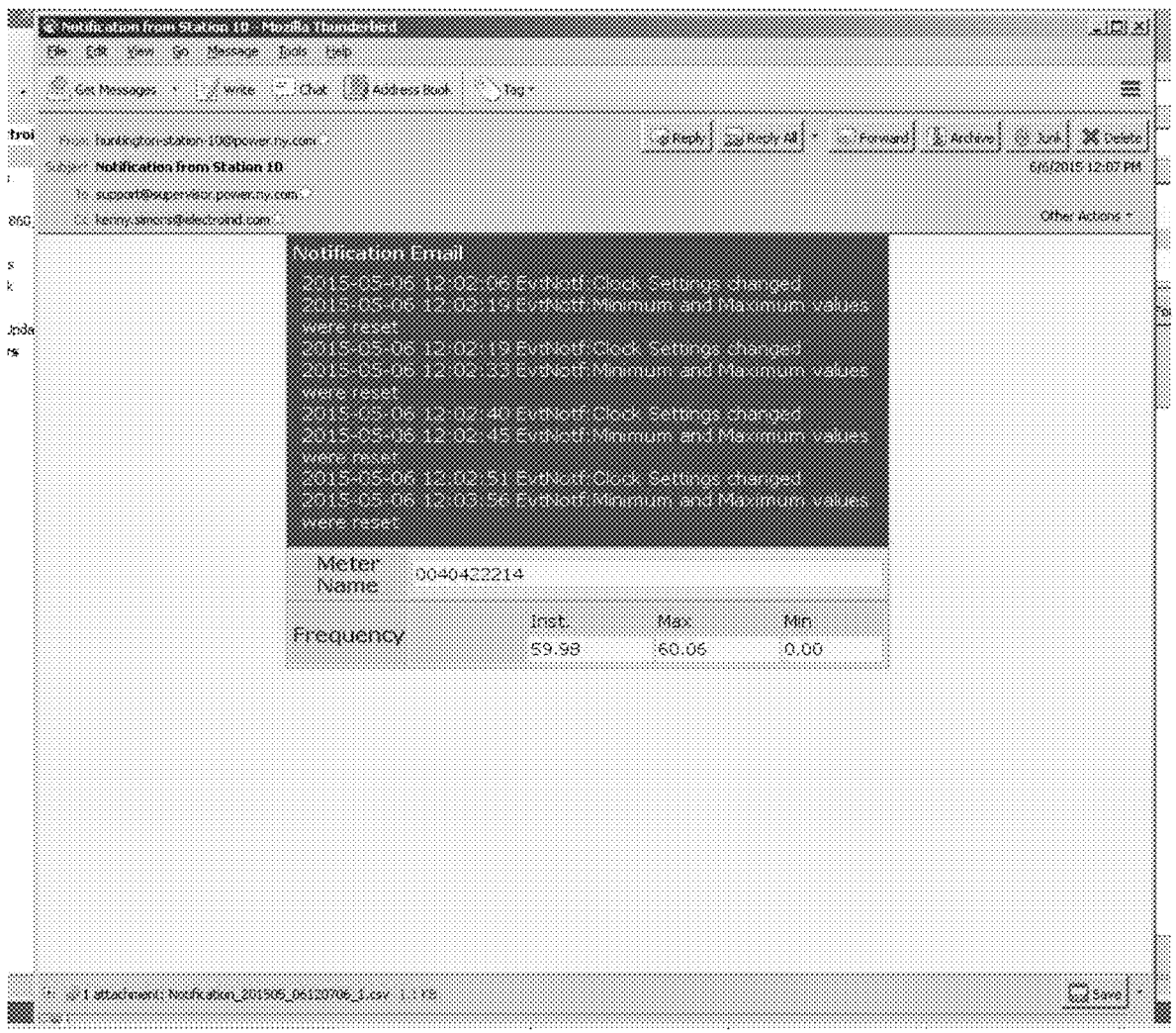
FIG. 22 is an exemplary screen shot of Hyper Text Markup Language (HTML) view notification email according to an embodiment of the present disclosure.

After it is determined what other variables or readings the user wants to be included in the message (based on the user settings), in step 1510, the determined variables or readings are fetched from Modbus measurements DB 1122. When any desired variables are fetched from Modbus measurements DB 1122, in step 1512, it is determined whether the data (variables or readings) should be formatted as a CSV or XML attachment or a line of text in the email. If in step 1512, it is determined that the data should be formatted as a line of text in the email, in step 1518, the values are generates as a plain text. The line of text is created with a user-friendly name (e.g., "Phase-to-Neutral Voltage A") and the value itself for each needed variable. A Multipart HTML/text is also generated and merged with the plain-text. When using an email client to view the message, the user can select with version of the message should be displayed, e.g., a plain text view as shown in FIG. 21 or an HTML view as shown in FIG. 22. The HTML/text has the same information as the plain text version but visually enhanced using several features of the hyper text mark-up language. Optionally, in step 1512, if it is determined that the data should be formatted as a CSV or XML attachment, in step 1514, the CSV or XML attachment is generated. The CSV attachment is a file with the first line being a header, and then name and value separated with a comma, one name-value set per line. The XML attachment is a structured marked-up language file with fields for naming and values of every item. After the CSV or XML file is generated in step 1514, any file generated (CSV or XML) is coded using MIME (Multipurpose Internet Mail Extensions) or MIME64, in step 1516. It is to be appreciated that other email encoding and/or protocols may be used, for example, UUencoding.

After the data has been formatted as a CSV or XML file (step 1514) or as a plain text (step 1518), in step 1520, the formatted data is appended to the first part of the message (the converted human readable string described in step 1504). Once the formatted data is appended to the first part of the message, in step 1522, the full message is sent to SMTP FIFO buffer 1124 to be sent as an email using SMTP client 1128.

Alternatively, if in step 1506, it is determined that the event-packet is a notification, any settings for the notification are retrieved from programmable settings 1110, in step 1524. The retrieved settings are used to determine what other variables or readings the user wants to be included in the message. As described above, some possible readings are voltage signals, current signals, power signals, energy signals, line frequency, and meter name.

After it is determined what other variables or readings the user wants to be included in the message (based on the user settings), in step 1526, the determined variables or readings are fetched from Modbus measurements DB 1122. When any desired variables are fetched from Modbus measurements DB 1122, in step 1528, it is determined whether the data (variables or readings) should be formatted as a CSV or XML attachment or a line of text in the email. If in step 1528, it is determined that the data should be formatted as a line of text in the email, in step 1534, the values are generates as a plain text. The line of text is created with a user-friendly name (e.g., "Phase-to-Neutral Voltage A") and the value itself for each needed variable. A Multipart HTML/text is also generated and merged with the plain-text. When using an email client to view the message, the user can select with version of the message should be displayed, e.g., a plain text view as shown in FIG. 21 or an HTML view as shown in FIG. 22. The HTML/text has the same information as the plain text version but visually enhanced using several features of the hyper text mark-up language. Optionally, in step 1528, if it is determined that the data should be formatted as a CSV or XML attachment, in step 1530, the CSV or XML attachment is generated. As described above, the CSV attachment is a file with the first line being a header, and then name and value separated with a comma, one name-value set per line. The XML attachment is a structured marked-up language file with fields for naming and values of every item. After the CSV or XML file is generated in step 1530, any file generated (CSV or XML) is coded using MIME, in step 1532. It is to be appreciated that other email encoding and/or protocols may be used, for example, UUencoding.

After the data has been formatted as a CSV or XML file (step 1530) or as a plain text (step 1534), in step 1536, the formatted data is appended to the first part of the message (the converted human readable string described in step 1504). Once the formatted data is appended to the first part of the message, in step 1538, the full message is sent to SMTP FIFO buffer 1126 to be sent as an email using SMTP client 1128.

After either of steps 1522 or 1538 have been completed, in step 1540, it is determined whether there are more events in FIFO buffers 1116 or 1118 that need to be formatted by email formatter 1120 into an email-body. If it is determined in step 1540 that there are more event-packets in FIFO buffers 1116 or 1118 that need to be formatted by email formatter 1120 into an email-body, in step 1504, the event-packets that need to be formatted are retrieved from FIFO buffers 1116 or 1118 by email formatter 1120. However, if it is determined in step 1540 that there are no more event-packets in FIFO buffers 1116 or 1118 that need to be formatted by email formatter 1120 into an email body, the process 1500 in FIG. 15 will end, in step 1542.

Referring again to FIG. 11, SMTP client 1128 is used to effectively send messages (as emails) stored in FIFO buffers 1124 and 1126. Alarm and Notification FIFO buffers 1124 and 1126 are checked with a specific predetermined periodicity. For example, alarm FIFO buffer 1124 is checked approximately every 1 minute, and notification FIFO buffer 1126 is checked in periodic intervals ranging from 5 minutes to 24 hours as determined by user settings stored in programmable settings 1110.

When it is time to service one of this FIFO buffers, the SMTP Client Block 1128 restarts the Traveler counter in the FIFO buffers 1124, 1126 (so it is pointing to the oldest email, the Consumer counter), connects to email server and tries to send the email. If the email is successfully sent, the SMTP client 1128 tags that entry in the FIFO buffer as sent and if it's the oldest item it removes it from the FIFO buffer and moves to the next email. If the email is not successfully sent, the entry is not tagged, nor removed, and the next email in the FIFO buffer is selected. The process repeats until all the emails in the FIFO buffer are serviced. The next service time, only the emails in the FIFO buffer which are not tagged as deleted, are sent. This design allows keeping emails that were not properly sent for a second chance (retry). Even though, if the FIFO buffers run out of space or the oldest item becomes too old (for example, greater than 24 hours or other adjustable time period), the oldest email is removed the next time a new email arrives. This process of discarding the oldest item only when needed, allows the newest emails to go to the server.

Figure 16:
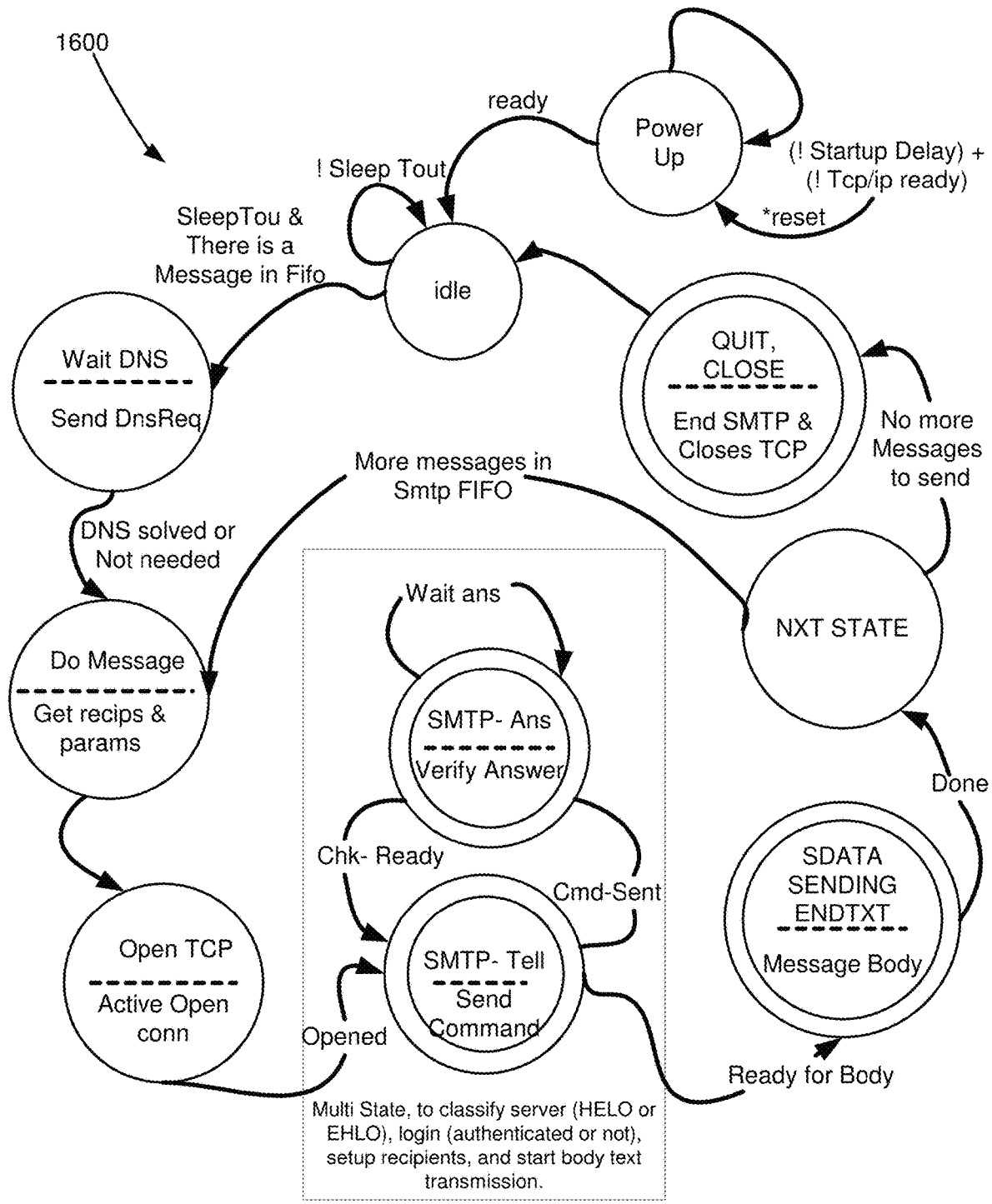
FIG. 16 illustrates a state machine of a function used to send emails through an SMTP client according to an embodiment of the present disclosure.

FIG. 16 illustrates a State machine 1600 of the function used to send the message through SMTP (client). The SMTP Client Block 1128 connects to the TCP/IP stack 1130 of the network communication card 1104, which than transmits the e-mail to the appropriate server.

It is to be appreciated that the size of the email Alarm/Notification is around 32 KB for the code and 8 Megabytes for RAM. Processing of the email Alarm/Notification, with no other communication (e.g., no Modbus TCP/IP activity) takes less than 4% of the CPU/DSP time. When email is being sent and the email formatter 1120 is working, peak measured processing takes around 6% of CPU time.

In one embodiment, the IED 101 further includes a cryptographic module including stored instruction signals that is executed by the CPU 1032 or 1036, a cryptographic processor, and/or the like. Preferably, cryptographic processor interfaces will allow for expedition of encryption and/or decryption requests by the cryptographic module; however, the cryptographic module, alternatively, may run on CPU 1032 or 1036. Preferably, the cryptographic module allows for the encryption and/or decryption of provided data, e.g., email messages. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a client to engage in secure transactions if so desired by users. The cryptographic module facilitates the secure accessing of resources on a client and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses. In one non-limiting example embodiment, such a cryptographic tool may be provided as a library within the operating system accessible to all other modules in a module collection through an application program interface (API). The cryptographic tool enables local processing of authentication information.

In one embodiment, the cryptographic module employs transport level encryption, for example, STARTTLS. STARTTLS is a TLS (SSL) layer over the plaintext communication, allowing email servers to upgrade their plaintext communication to encrypted communication. Assuming that the email servers on both the sender and the recipient side support encrypted communication, an eavesdropper snooping on the communication between the mail servers can not see the email contents. Similar extensions exist for the communication between an email client and the email server.

In another embodiment, the cryptographic module employs end-to-end encryption. In end-to-end encryption, the data is encrypted and decrypted only at the end points. In other words, an email sent with end-to-end encryption would be encrypted at the source (i.e., the IED), unreadable to service providers like Gmail in transit, and then decrypted at its endpoint. The email would only be decrypted for the end user on their computer and would remain in encrypted, unreadable form to an email service like Gmail, which wouldn't have the keys available to decrypt it. OpenPGP is a data encryption standard that allows end-users to encrypt the email contents. There are various software and email-client plugins (FireGPG, Enigmail, GPGMail, etc.) that allow users to encrypt the message using the recipient's public key before sending it. At its core, OpenPGP uses a Public Key Cryptography scheme where each email address is associated with a public/private key pair. OpenPGP provides a way for the end users to encrypt the email without any support from the server and be sure that only the intended recipient can read it. It is to be appreciated that IED 1010 described above in relation to FIG. 10 and the email Alarm/Notification implementation described above in relation to FIG. 11 may be configured to provide email Alarm/Notification capabilities (as described in relation to FIGS. 10-16) in other embodiments of the present disclosure.

For example, referring to FIG. 6, IEDs 410, 412, and/or 414 may be configured in a similar manner to IED 1010. Email messages (in the form of Alarms or Notifications) may be sent from an SMTP client (e.g., SMPT client 1128) in IED 410, 412, or 414 to server 440. From server 440, the email message may be provided to client 428 via network 422. Client 428 may be configured in accordance with an email protocol used for receiving emails, such as Post Office Protocol 3 (POP3) or Internet Message Access Protocol (IMAP), although many other protocols may be used as desired.

In another example, referring to FIG. 8, IEDs 510, 512, and/or 514 may be configured in a similar manner to IED 1010. Email messages (in the form of Alarms or Notifications) may be sent from an SMTP client (e.g., SMPT client 1128) in IED 510, 512, or 514 to server 530 on internal network 516. From server 530, the email message may be sent to server 540 on an external network 522. From server 540, the email message may be provided to client 528 via network 522. Client 528 may be configured in accordance with an email protocol used for receiving emails, such as POP3 or IMAP, although many other protocols may be used as desired.

In yet another example, referring to FIG. 9, IEDs 610, 612, and/or 614 may be configured in a similar manner to IED 1010. Email messages (in the form of Alarms or Notifications) may be sent from an SMTP client (e.g., SMPT client 1128) in IED 610, 612, or 614 to server 630 on internal network 616. From server 630, the email message may be provided to client 628 via network 622. Client 628 may be configured in accordance with an email protocol used for receiving emails, such as such as POP3 or IMAP, although many other protocols may be used as desired.

In one embodiment, the systems of FIGS. 6, 8 and 9 employ secure messaging. Secure messaging is a server based approach to protect sensitive data when sent beyond the corporate borders, e.g., beyond a firewall 418, 518, 618, and provides compliance with industry regulations such as Health Insurance Portability and Accountability Act, Gram-Leach-Bliley Act and Sarbanes-Oxley Act. Advantages over classical secure e-Mail are that confidential and authenticated exchanges can be started immediately by any internet user worldwide since there is no requirement to install any software nor to obtain or to distribute cryptographic keys beforehand. Secure messages provide non-repudiation as the recipients are personally identified and transactions are logged by the secure email platform.

Secure messaging works as an online service. Users, e.g., clients 428, 528, 628 enroll to a secure messaging platform. The user logs into his account by typing in his username and password (or strong authentication) similar to a web based email account. Out of a message center messages can be sent over a secure SSL-connection or via other equally protecting methods to any recipient. If the recipient is contacted for the first time a message unlock code is needed to authenticate the recipient. Alternatively, secure messaging can be used out of any standard email program without installing software. Secure Messaging possesses different types of delivery: secured web interface, S/MIME or PGP encrypted communication or TLS secured connections to email domains or individual email clients. One single secure message can be sent to different recipients with different types of secure delivery the sender does not have to worry about. Secure Messaging relies on the method of the dynamic personal web of trust. This method synthesizes the authentication approach of web of trust, known from PGP, with the advantages of hierarchical structures, known from centralized PKI systems. Those combined with certificates provide high quality of electronic identities. This approach focuses on the user and allows for immediate and personal bootstrapping of trust, respectively revocation.

Figure 23:
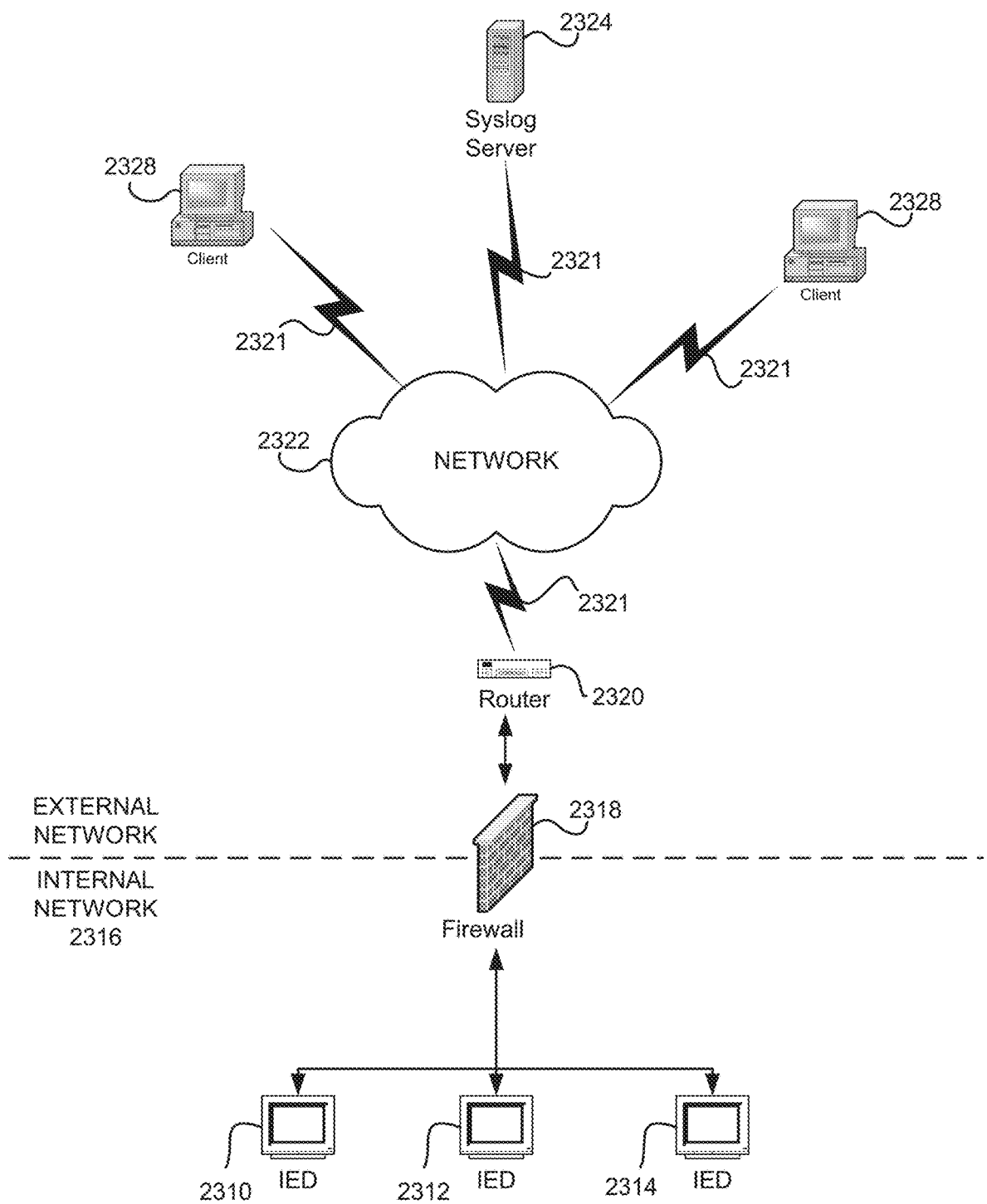
FIG. 23 illustrates another environment in which the present disclosure may be utilized.

The secure messages are encrypted bidirectionally and are stored on a network or internet server, e.g., server 426, 440, 530, 540, 630, 640. This has the advantage of archiving the data centrally and providing added security—since message data downloaded to a local hard drive are subject to breach if the computer is ever lost or stolen. Secure messaging can be easily integrated into the corporate email infrastructures (for example, Microsoft Exchange Server, Mozilla Thunderbird, Lotus Notes, Groupwise, Microsoft Entourage, Postfix, Exim, Sendmail, etc.). In one embodiment, the secure messaging employed utilizes FTP/S, SFTP, and VPNs for secure data transmission. Additionally, secure messaging utilizes Triple DES, SSL, and RC4 128-bit encryption to secure documents, recipient interactions, and document attachments. In certain embodiments, the secure messaging provides electronic Registered mail functions. In a further embodiment, each IED sends event messages to a logging server, e.g., a syslog server, as shown in FIG. 23. Referring to FIG. 23, IEDs or meters 2310, 2312 2314 reside on an internal network 2316, e.g., an intranet, private network, corporate network, etc. The internal network 2316 is coupled to an external network 2322, e.g., the Internet, via a router 2320 or similar device over any known hardwire or wireless connection 421. Optionally, a firewall 2318 is disposed between the internal network 2316 and external network 2322 to prevent unauthorized access from outside the internal network 2316 to the IEDs or meters 2310, 2312, 2314. Although the firewall 418 is shown between the internal network 2316 and the router 2320 it is to be appreciated that other configurations are possible, for example, the firewall 2318 being disposed between the router 2320 and external network 2322. In other embodiments, the firewall 2318 and router 2320 may be configured as a single device. It is further to be appreciated that firewall 418 can be implemented in both hardware and software, or a combination of both. The communication device or network interface of the meter (as described above in relation to FIGS. 1 and 10) will communicate through the firewall 2318 and send event messages to logging server 2324, e.g., syslog server.

The syslog server 2324 includes at least a syslog listener, a database and management and filtering software/module. The syslog server 2324 needs to receive messages sent over the network. A listener process gathers syslog data sent over UDP port 514. UDP messages aren't acknowledged or guaranteed to arrive, therefore, alternatively, the IEDs may send the syslog data via TCP 1468 to ensure message delivery. Large networks of IEDs can generate a large amount of syslog data, therefore, a database is to store syslog data for quick retrieval by, for example, clients 2328. Because of the potential for large amounts of data, it can be cumbersome to find specific log entries when needed. The management and filtering software/module filters important log messages and manages subsequent actions. The syslog server generates alerts, notifications, and alarms in response to select messages—so that administrators know as soon as a problem occurs and can take swift action.

It is to be appreciated that most network devices, e.g., router 2320, firewall 2318, etc., can generate and send syslog messages in addition to IEDs 2310, 2312, 2314. In this manner, the syslog server 2324 can determine the overall "health" of the various devices on the network. Operators of various systems, for example, utility infrastructure, physical plants, buildings, campuses, etc., can use syslog for system management and security auditing as well as general informational, analysis and debugging messages.

The event messages generated, as described above in relation to FIGS. 11-22, can be configures a syslog messages. The syslog messages include information to help identify basic information about where, when, and why the log was sent, e.g., ip address, timestamp, the actual log message, etc. Each syslog message is labeled with a facility code or number and assigned a severity label. A configuration file defines the destination of the messages, based on facility and severity, to various devices, files or forwards the message to remote syslog servers or relays.

Syslog messages uses a facility number to identify the source of a message on any given machine or IED The facility number enables the configuration file of the IED to specify that messages from different facilities will be handles differently. For example, a facility of "0" would be a Kernel message, and a facility of "11" would be an FTP message. The table below identified the list of facilities available as defined by RFC 3164 (http://tools.ietf.org/html/rfc3164):

TABLE 1

List of facilities

| Facility Number | Keyword | Facility Description |
|---|---|---|
| 0 | kern | kernel messages |
| 1 | user | user-level messages |
| 2 | mail | mail system |
| 3 | daemon | system daemons |
| 4 | auth | security/authorization messages |
| 5 | syslog | messages generated internally by syslogd |
| 6 | lpr | line printer subsystem |
| 7 | news | network news subsystem |
| 8 | uucp | UUCP sub system |
| 9 | | clock daemon |
| 10 | authpriv | security/authorization messages |
| 11 | ftp | FTP daemon |
| 12 | — | NTP sub system |
| 13 | — | log audit |
| 14 | — | log alert |
| 15 | cron | scheduling daemon |
| 16 | local0 | local use 0 (local0) |
| 17 | local1 | local use 1 (local1) |
| 18 | local2 | local use 2 (local2) |
| 19 | local3 | local use 3 (local3) |
| 20 | local4 | local use 4 (local4) |
| 21 | local5 | local use 5 (local5) |
| 22 | local6 | local use 6 (local6) |
| 23 | local7 | local use 7 (local7) |

Syslog messages also have a severity level field. The severity level indicates how important the message is deemed to be. A severity of "0" is an emergency, "1" is an alert that needs immediate action, and the scale continues right down to "6" and "7"—informational and debug messages. Table 2 below identifies the severity levels available:

TABLE 2

| Severity Number | Severity | Keyword | Description/Examples |
|---|---|---|---|
| 0 | Emergency | Emerg | Multiple apps/servers/sites. |
| 1 | Alert | Alert | Should be corrected immediately. |
| 2 | Critical | Crit | May be used to indicate a failure in the system's primary application. |
| 3 | Error | Err | An application has exceed it file storage limit and attempts to write are failing. |
| 4 | Warning | Warning | May indicate that an error will occur if action is not taken. |
| 5 | Notice | Notice | Events that are unusual but not error conditions. |
| 6 | Informational | Info | Normal operational messages-no action required. |
| 7 | Debugging | debug | Info useful to developers for debugging the application. |

In one embodiment, the syslog events may be configured via the user interface as shown in FIG. 18. Referring to FIG. 18, the following "Watched Events" may be identified as syslog events: Log Reset, Log Retrieve Begin, Log Babbling, Failed Secure Access, Clock Settings Changed, V-switch Changed and Unit Start Up.

Upon a syslog events occurring in an IED 2310, 2312, 2314, the syslog event is transmitted to syslog server 2324. The syslog server 2324 may then send an alert or notification, via e-mail or other means, to various clients 2328. Additionally, clients 2328 can access the syslog server 2324 to review the various messages that have been logged in the database of the syslog server 2324.

To prevent unauthorized access to the syslog server 2324 or any of the IEDs 2310, 2312, 2314, several different security methods and scheme may be employed within the scope of the present disclosure. In one embodiment, Multi-factor authentication (MFA) is employed. MFA is a method of access control which a user can pass by successfully presenting several separate authentication stages which include knowledge factors, possession factors and inherence factors. Knowledge factors include a password or secret word, a personal identification number (PIN), secret questions, among others. Possession factors include a key or device, e.g., a disconnected or connected token, which only the user has. Inherence factors are factors associated with the user, and are usually biometric methods, including fingerprint readers, retina scanners or voice recognition. It is to be appreciated that the MFA may include at least one factor or any combination thereof to authenticate a user.

In one embodiment, a security token is used to prevent unauthorized access to the syslog server 2324 or any of the IEDs 2310, 2312, 2314. A security token (also known as a hardware token, authentication token, USB token, cryptographic token, software token, virtual token, or key fob) may be a physical device that an authorized user of a computer service or device is given to gain access to the information stored therein. Security tokens are used to prove one's identity electronically. Some tokens may store cryptographic keys, such as a digital signature, or biometric data, such as fingerprint minutiae. Some designs feature tamper resistant packaging, while others may include small keypads to allow entry of a PIN or a simple button to start a generating routine with some display capability to show a generated key number. Special designs include a USB connector, RFID functions or Bluetooth wireless interface to enable transfer of a generated key number sequence to a client system.

Security tokens include password types and physical types. Password token types include some secret information that are used to prove identity. There are four different ways in which this information can be used 1.) Static password token—The device contains a password which is physically hidden (not visible to the possessor), but which is transmitted for each authentication; 2.) Synchronous dynamic password token—A timer is used to rotate through various combinations produced by a cryptographic algorithm, where the token and the authentication server must have synchronized clocks; 3.) Asynchronous password token—A one-time password is generated without the use of a clock, either from a one-time pad or cryptographic algorithm; and 4.) Challenge response token—Using public key cryptography, it is possible to prove possession of a private key without revealing that key, the authentication server encrypts a challenge (typically a random number, or at least data with some random parts) with a public key; the device proves it possesses a copy of the matching private key by providing the decrypted challenge.

Password token types include time-synchronized one-time passwords and mathematical-algorithm-based one-time passwords. Time-synchronized one-time passwords change constantly at a set time interval, e.g. once per minute. Another type of one-time password uses a complex mathematical algorithm, such as a hash chain, to generate a series of one-time passwords from a secret shared key.

Physical token types include disconnected tokens, connected tokens, contactless tokens, Single sign-on software tokens and mobile device tokens. Disconnected tokens have neither a physical nor logical connection to the client computer or device. Disconnected tokens typically do not require a special input device, and instead use a built-in screen to display the generated authentication data, which the user enters manually themselves via a keyboard or keypad. Connected tokens are tokens that must be physically connected to the computer with which the user is authenticating. Tokens in this category automatically transmit the authentication information to the client computer or device once a physical connection is made, eliminating the need for the user to manually enter the authentication information. However, in order to use a connected token, the appropriate input device must be installed. The most common types of physical tokens are smart cards and USB tokens, which require a smart card reader and a USB port respectively.

Unlike connected tokens, contactless tokens form a logical connection to the client computer or device but do not require a physical connection. The absence of the need for physical contact makes them more convenient than both connected and disconnected tokens. An exemplary contactless token uses RFID to transmit authentication info from a keychain token. Another exemplary contactless token is a Bluetooth token, which is often combined with a USB token, thus working in both a connected and a disconnected state. Bluetooth authentication works when closer than 32 feet (10 meters). If the Bluetooth is not available, the token must be inserted into a USB input device to function. In the USB mode of operation sign off required care for the token while mechanically coupled to the USB plug. The advantage with the Bluetooth mode of operation is the option of combining sign-off with a distance metrics.

Some types of Single sign-on (SSO) solutions, like enterprise single sign-on, use the token to store software that allows for seamless authentication and password filling. As the passwords are stored on the token, users need not remember their passwords and therefore can select more secure passwords, or have more secure passwords assigned. Additionally, a mobile computing device such as a smartphone or tablet computer can also be used as the authentication device. This provides secure two-factor authentication that does not require the user to carry around an additional physical device. Some vendors offer a mobile device authentication solution that uses a cryptographic key for user authentication. This provides a high level of security protection including protection from a Man-in-the-middle attack, which can occur from a rogue Hotspot (Wi-Fi).

Token designs meeting certain security standards are certified in the United States as compliant with FIPS (Federal Information Processing Standard) 140-2, a federal security standard. The standard provides four increasing, qualitative levels of security intended to cover a wide range of potential applications and environments. The security requirements cover areas related to the secure design and implementation of a cryptographic module. These areas include cryptographic module specification; cryptographic module ports and interfaces; roles, services, and authentication; finite state model; physical security; operational environment; cryptographic key management; electromagnetic interference/electromagnetic compatibility (EMI/

EMC); self-tests; design assurance; and mitigation of other attacks. FIPS 140-2 defines four levels of security as follows:

Level 1

Security Level 1 provides the lowest level of security. Basic security requirements are specified for a cryptographic module (e.g., at least one Approved algorithm or Approved security function shall be used). No specific physical security mechanisms are required in a Security Level 1 cryptographic module beyond the basic requirement for production-grade components. An example of a Security Level 1 cryptographic module is a personal computer (PC) encryption board.

Level 2

Security Level 2 improves upon the physical security mechanisms of a Security Level 1 cryptographic module by requiring features that show evidence of tampering, including tamper-evident coatings or seals that must be broken to attain physical access to the plaintext cryptographic keys and critical security parameters (CSPs) within the module, or pick-resistant locks on covers or doors to protect against unauthorized physical access.

Level 3

In addition to the tamper-evident physical security mechanisms required at Security Level 2, Security Level 3 attempts to prevent the intruder from gaining access to CSPs held within the cryptographic module. Physical security mechanisms required at Security Level 3 are intended to have a high probability of detecting and responding to attempts at physical access, use or modification of the cryptographic module. The physical security mechanisms may include the use of strong enclosures and tamper detection/response circuitry that zeroes all plain text CSPs when the removable covers/doors of the cryptographic module are opened.

Level 4

Security Level 4 provides the highest level of security. At this security level, the physical security mechanisms provide a complete envelope of protection around the cryptographic module with the intent of detecting and responding to all unauthorized attempts at physical access. Penetration of the cryptographic module enclosure from any direction has a very high probability of being detected, resulting in the immediate zeroization of all plaintext CSPs.

In a further embodiment, the IED transmits data in addition to the message via secure FTP as described above. Referring to FIG. 6, in one embodiment, an IED 410 sends a message, e.g., an e-mail, secure message, etc., to a client, e.g., client 428. In addition, the IED 410 sends a data file, e.g., a log, error report, etc., via FTP or secure FTP. The IED 410 employs secure FTP to place the data file on the client device, for example, in a predetermined folder on the client device. Since the client device 428 may have no indication that the data file was transferred, the message sent to the client includes an indication that a data file has been transferred and is available for viewing. The indication may be a file location on the client device or a link to the file location on the client device. In another embodiment, the message includes a link to a file location on the IED 410, which upon activating the link, the client device 428 initiates a secure FTP session with the IED 410 to retrieve the data file. In a further embodiment, the message sent to the client 428 includes instructions for the client to automatically initiate a secure FTP session with the IED 410 to retrieve the data file without user input. In yet another embodiment, server 426 (or any other server) initiates a secure FTP session with the IED 410 to retrieve a data file upon receipt of a message indicating an alarm or notification.

In another embodiment of the present disclosure, an IED, for example, IED 1010, may be configured to operate in the environment of the "Internet of Things" (IoT). The IoT is a term used to refer to a network of physical objects or "things" embedded with electronics, software, sensors, actuators, and connectivity to enable objects to exchange data with the production, operator and/or other connected devices based on the infrastructure of International Telecommunication Union's Global Standard Initiative. In other words, IoT represents the evolution on how networks can be used among all things or objects and not only in computers. Included within the realm of "things" are management devices, monitoring equipment, automation systems, etc. However, "things" also include home appliances, wearable items like clothes and watches, furniture, tools, house items (e.g., walls, pipes, floors), and even simple accessories like pingents, belts or purses. One of the goals of IoT is to let various objects or things in a network interchange information among the objects or things that can be potentially used within the area of relevance of the objects or things. For example, the IoT can be used to increase time of use of a chair, increase the efficiency of a washing machine, increase functionality of a person's shoes, etc.

IED 1010 is configured to operate in the environment of the IoT by providing information about the capabilities of IED 1010 (like the capability of metering power usage) and the metering data of IED 1010 to other devices (things or objects) such as, but not limited to, a display screen for showing the demand a house is using, to the power grid distribution system for billing purposes, etc. Furthermore, IED 1010 may be configured use IoT to provide metering data to appliances on IoT in a home to provide many advantages. For example, in the case where the current consumed by the house exceeds a predetermined setpoint, IED 1010 can inform the appliances and one of them can decide to reduce its power consumption or pause usage altogether (e.g., a clothing dryer). The appliance may have its own current sensor and decide if another appliance is responsible for the excess. As another example, IED 1010 may provide metering data to a washing machine, for example, that the washing machines harmonics are too high (as measured by IED 1010 using a sensor of IED 1010 coupled to the washing machine). The washing machine may then use this data to communicate to a user that the washing machine needs service. Alternatively, IED 1010 may use this data to communicate to the user that the washing machine needs service. The possibilities of interaction are countless. It is to be appreciated that the above described examples are merely exemplary and that there are many potential uses for an IED that is configured to communicate with other objects or things on IoT.

Figure 24:
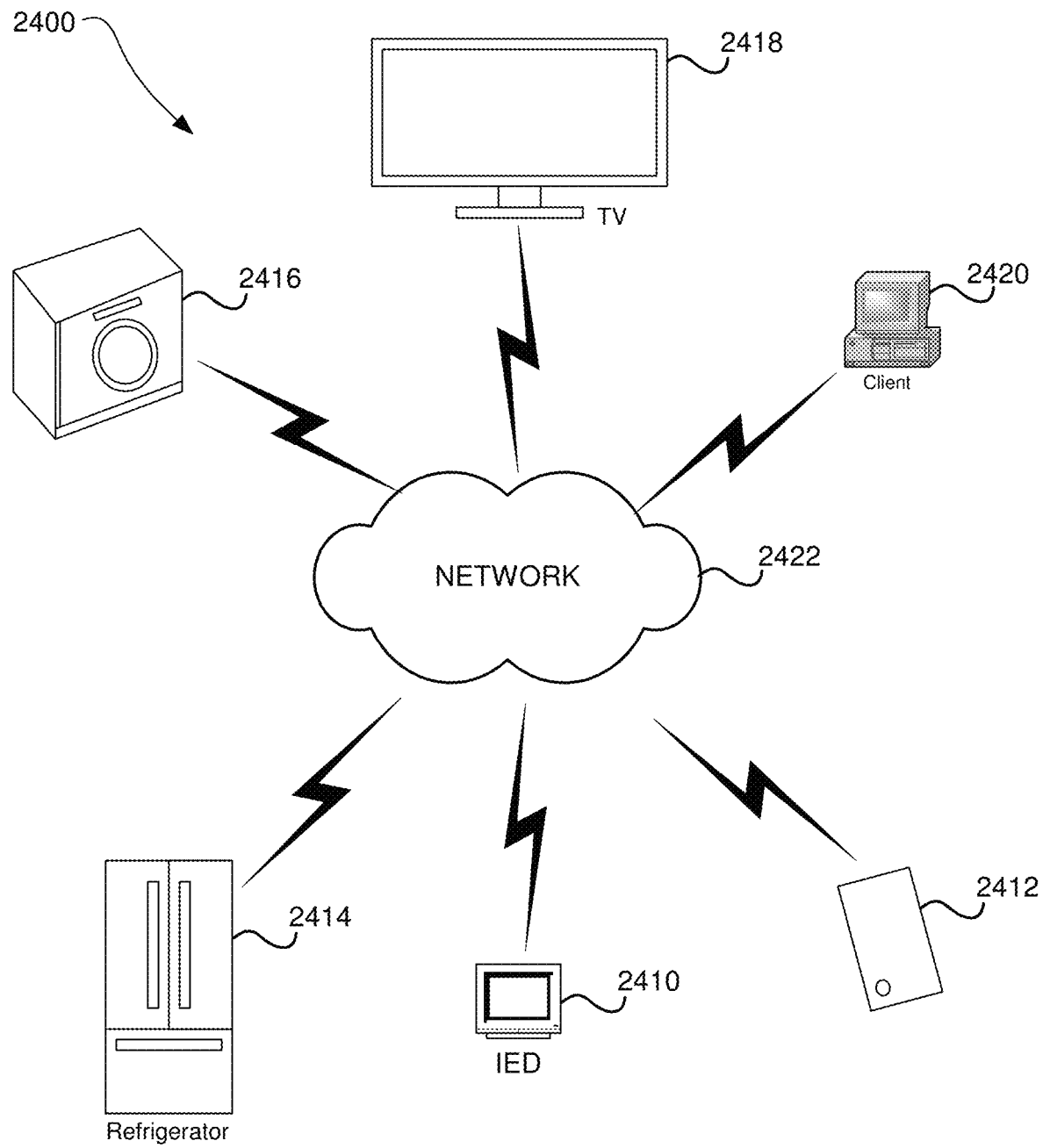
FIG. 24 illustrates an environment including an IED configured to use the Internet of Things (IoT) communication to communicate with other IoT enabled objects in accordance with an embodiment of the present disclosure.

Turning to FIG. 24, an environment 2400 is shown in accordance with an embodiment of the present disclosure including an IED 2410 configured to use IoT to communicate with other objects or things. Environment 2400 includes IED 2410 coupled to a network 2422. Environment 2400 also includes objects or things 2412, 2413, 2416, 2418, and 2420, where objects or things 2412, 2413, 2416, 2418, and 2420 are also coupled to network 2422. It is to be appreciated that network 2422 may be any wireless or wired network used for communications. For example, network 2422 may be the Internet or a home network coupled to the Internet, or alternatively, network 2422 may be a mobile network. Furthermore, it is to be appreciated that objects or things 2412, 2413, 2416, 2418, and 2420 may be any devices configured for use with IoT. For example, in FIG. 24, object or thing 2412 may be a smartphone or tablet, object 2414 may be a refrigerator, object 2416 may be a washing machine, object 2418 may be a smart TV, and object 2420 may be a personal computer or laptop. It is to be appreciated the objects 2412, 2413, 2416, 2418, and 2420 may be in a single home or disposed in remote locations. Although not shown, it is to be appreciated that software acting as a logical entity may be addressable and become an object or thing on network 2422.

It is to be appreciated that IED 2410 includes a network card, such as network card 1033 shown in FIG. 10 and described above. The network card in IED 2410 is capable of IoT connectivity with objects 2412, 2413, 2416, 2418, and 2420 via network 2422. In one embodiment, IED 2410 is configured to measure and calculate metering data associated with objects 2412, 2413, 2416, 2418, and 2420 and/or the home (as a whole or partial, depending on the deployment), where 2412, 2413, 2416, 2418, and 2420 are disposed in IED 2410 is further configured to communicate the metering data to 2412, 2413, 2416, 2418, and 2420 via IoT, so that objects 2412, 2413, 2416, 2418, and 2420 may make use of this data. Alternatively, objects 2412, 2413, 2416, 2418, and 2420 may communicate relevant data to IED 2410 via IoT, and IED 2410 is configured to receive the relevant data and make use of it.

It is to be appreciated that many different technologies are implemented in network 2422 to enable IoT communication between IED 2410 and objects 2412, 2413, 2416, 2418, and 2420. For example, in some embodiments, some or all of the following technologies are implemented in network 2422: Radio-frequency identification (RFID); near field communication (NFC); Optical technologies—such as, but not limited to, Li-Fi and/or Bi-Di; image sensors and optical tags and optical mediums; Bluetooth; Blue tooth low energy; low energy wireless IP network—including, but not limited to, embedded radio in system-on-a-chip designs, low power WiFi, sub-GHz radio in an ISM (industrial, scientific, and medical) band, often using a compressed version of IPv6 called 6LowPAN; ZigBee; Z-Wave; Thread; LTE-Advanced (e.g., in vehicle-to-vehicle communications); WiFi-Direct; HomePlug (used to enable IoT communication over a home or building's power lines); Multimedia over Coax Alliance (MoCA) (used to enable IoT communication over CATV-type coaxial cable); and Ethernet, where Ethernet may be used to enable IoT communication over twisted pair and/or fiber network links. It is to be appreciated that the above described technologies are merely exemplary and that many more technologies may be implemented with the teachings of the present disclosure to enable IoT communication between IED 2410 and objects or things coupled to network 2422.

To communicate with objects 2412, 2413, 2416, 2418, and 2420, IED 2410 is configured to talk the "language" of IoT. It is to be appreciated the "language" of IoT, is a collection of different protocols. It is further to be appreciated that in some embodiments, IED 2410 is configured to use IoT to communicate with objects 2412, 2413, 2416, 2418, and 2420 in one of protocol, while in other embodiments, IED 2410 is configured to communicate via IoT using many different protocols.

In one embodiment, Constrained Application Protocol (CoAP) is used by IED 2410 as the first option for Device to Server or Data Collector (D2S) communication, and Simple Object Access Protocol (SOAP) and Constrained RESTful Environment (CoRE) protocol are used as the first option for Device to Device (D2D). Additionally, in some embodiments, IED 2410 may use MQ Telemetry Transport (MQTT) to connect to things acting as servers (D2S), and DDS can be used to connect to other things acting as peers (D2D). It is to be appreciated that many other protocols, such as, but not limited to, XMPP (Extensible Messaging and Presence Protocol), AQMP (Advanced Message Queuing Protocol), Mosquito, M3DA, IPSO (Internet Protocol for Smart Objects), Wolfram, and more, may be implemented for use with IED 2410 as desired to accommodate different scenarios that may arise in an environment, such as, environment 2400. Most of the protocols mentioned above have defined entry points or ports of service. Currently, there is no conversion process among the various protocols mentioned above, so to establish the communication between IED 2410 and an IoT capable thing or object coupled to network 2422, the objects or things need at least to share a common protocol in its specific port. It is to be appreciated that IED 2410 is configured to simultaneously support many protocols to ensure communication can be established between IED 2410 and IoT capable things or objects utilizing different protocols coupled to network 2422.

It is to be appreciated that the network card in IED 2410, for example, a network card similar to network card 1033, includes a CPU, non-volatile memory, and volatile memory, where the CPU, non-volatile memory, and volatile memory included in the network card in IED 2410 are similar to CPU 1036, non-volatile memory 1038, and volatile memory 1040. Furthermore, it is to be appreciated that the various protocols for communicating with objects via IoT may be stored in either the non-volatile or volatile memory in the network card in IED 2410. Additionally, the protocols may be executed in the CPU of the network card in IED 2410.

In one embodiment, the network card in IED 2410 uses a subset of CoAP standard (Constrained Application Protocol—RFC7252) and the CoRE Link Format (Constrained RESTful Environments Link Format—RFC6690). However, Smart Grid also uses peer-to-peer connectivity and CoAP is a Client-Server protocol model only, therefore to allow the IED 2410 to be integrated in a peer-to-peer environment, IED 2410 is implemented to support both client and server roles over the same communication channel (i.e., bi-directional flow is allowed in CoAP). Thus, a distributed topology can be achieved when needed, facing similar capabilities of the Industrial Internet of Things (IIoT). In this way, IED 2410 can be integrated in a Smart Grid under IoT, and therefore provide services or request information to/from other IoT devices, such as objects 2412, 2413, 2416, 2418, and 2420.

Since power meters, such as IED 2410, report data to operational and control devices, and IoT allows a thing to communicate to other things locally or remotely, the IoT can be used in the SmartGrid to transfer information locally from a meter, such as IED 2410, to IoT connected breakers or power conditioners, and remotely to supervision stations and power transmission control stations (or other remote objects or things). Since more than the regular metering/controller devices can be connected by the IoT, extended safety measurements for example, can be taken into account—i.e. in a substation an IoT connected access door lock (a thing) can prevent an operator to access the facility if there is high humidity detected by an IoT connected internal sensor (another thing) while the measurements of voltage are very high (as determined for example by a meter, such as IED 2410, acting as a thing). It is to be appreciated that this is merely an exemplary scenario of an IoT being used in conjunction with a Smart Grid and that other uses are intended to be within the scope of the present disclosure.

Also, it is important to note that the exchange of information is not limited only to accessories to the system but also to real time data like waveform sampling or on the fly harmonic computation, depending on the capabilities of the network transport employed in the meter.

It is to be appreciated that many transport mediums can be used to implement IoT with IED 2410. For example, in one embodiment, IED 2410 uses UDP over TCP/IP as wired data transport medium. However, in another embodiment, IED 2410 will use wireless transport in the sub GigaHertz band (with a GPRS card) and 2.4 GigaHertz band. It is to be appreciated that many wireless communication protocols may be implemented with IED 2410 for IoT communication over a wireless network. For example, IED 2410 may support at least some or all of the following wireless communication protocols: ANT/ANT+, Bluetooth, Bluetooth (Low Energy) LE, Dali, DASH7, Echelon, EnOcean, Ethernet, KNX, Mbus, Modbus, (Near Field Communication (NFC), X-10, Insteon, Low-Power Wide-Area Network (LoRaWAN), Long-Term Evolution (LTE), Universal Mobile Telecommunications System (UMTS), code division multiple access (CDMA), Radio-Frequency Identification (RFID), Weightless-N/W/P, 802.11/Wi-Fi, 802.15.4, IPv6 over Low power Wireless Personal Area Networks (6LoWPAN), Thread, ZigBee, and/or Z-Wave. Furthermore, it is to be appreciated that the above described transport mediums are merely exemplary and that other transport mediums may be used to implement IoT with IED 2410.

For example, an electric car may be considered a thing. When the user plugs the electric car into a charge outlet at home, a meter device (a thing), such as IED 2410, at the home can exchange data with the car (another thing) over a home network, such as, network 2422 and decide what is the best time of the day or night to perform the charge, and the strength of the charge (fast charge—a large amount of current, or slow charge), based on a plurality of factors, e.g., the usage of the car, price of electricity throughout the day, etc. The next day, the user takes the car and as the user drives it and the charge goes down, the car can report by wireless network (e.g., 3G, 4G, LTE, etc.) back to the home network 2422, how low the energy levels within the battery of the car are going to the IED 2410, so at home a battery buffer (another thing) after talking to the metering device (the first thing), such as IED 2410, decides it will be efficient to buffer some energy from the power grid to be able to supply enough energy to the car once it arrives back home.

It is to be appreciated that each object or thing on the network 2422 is configured with a unique address to enable addressability of each object or thing during IoT communication. For example, in one embodiment, an IPv4 (i.e., within a subnetwork) or IPv6 (i.e., over a bigger universe) address may be assigned and used with each object or thing on the network 2422. IPv6 provides an identification and location system for computing devices on networks and routes traffic across the Internet. IPv6 was developed, in large part, to account for the limited addressing space of IPv4 and the influx of internet connected devices on the market. In one embodiment, each of objects 2412, 2413, 2416, 2418, and 2420 and IED 2410 have a unique IPv6 address.

IED 2410 may act as both a server and a client depending on the use context. As a server, IED 2410 is constantly listening for a client request (e.g., from any of objects 2412, 2413, 2416, 2418, and 2420) on the service port (by default UDP:5683) of IED 2410. In one embodiment, when a request is received by IED 2410, the request is processed on a first-in-first-out basis. If IED 2410 determined that the request received by IED 2410 needs a response, the response is sent by IED 2410 (or scheduled to be sent by IED 2410) for that particular client. Transactions for exchanging data or sending commands are called methods. It is to be appreciated that many methods are supported by IED 2410, including, but not limited to, GET, HEAD, POST, PUT, DELETE and CONNECT.

It is to be appreciated that IED 2410 is secure, in the sense that, to gather information from IED 2410 there are levels of access: Authenticated, Registered, and AnyOne. Authenticated access is the topmost level. Authenticated access requires that the requester (e.g., a client or object) be authenticated in IED 2410 using a login-schema with encryption key (as will be described in greater detail below). In one embodiment, the authenticated method also supports schedules and counters, where the authenticated client or object is allowed to be connected to IED 2410 at specific times of day, per days, or a specific number of times per defined period of time. Registered access is the middle level. Registered access requires that the client or object is at least known by IED 2410. Therefore, the client or object should be registered in IED 2410 by means of a configuration profile or other configuration method besides IoT. In one embodiment, the registered access level also supports the schedules and counters. AnyOne access is the lowest level of access. AnyOne level of access allows any client or object on the network to gather information from IED 2410 with no restrictions for reading, but with some restrictions for configuring or changing resources in IED 2410. It is to be appreciated that some requests are always available independently of the access level. Requests that are always available independently of the access level including, but are not limited to, resource discovery (as will be described below), the date/time resource, and the identification resource. In other embodiments, other security or authorization schemes or measures may be taken to accommodate any of the other protocols being used for IoT communication described above.

It is to be appreciated that, in some embodiments, IED 2410 also has the ability to act as a client (in addition to the ability to act as a server described above). There are many client functions that may be implemented with IED 2410. For example, IED 2410 can request the date/time (referred to as a GET function) from any IoT device, such as, any one of objects 2412, 2413, 2416, 2418, and 2420 using IoT on network 2422. To execute the date/time function, IED 2410 is configured to poll objects on network 2422 for the time/date at predetermined time intervals. Specifically, IED 2410 broadcasts a conditional discovery resource request for Date, Time, and Date/Time. Objects, such as objects 2412, 2413, 2416, 2418, and 2420, on network 2422 that support date/time resources will reply to IED 2410, and then IED 2410 will issue GETs periodically for date/time information.

Another function implemented with IED 2410 when IED 2410 is acting as a client (thing #1) is to send resource data to another IoT device (say thing #2) (such as one of objects 2412, 2413, 2416, 2418, and 2420), which was previously requested to be updated/posted with metering information from IED 2410 (thing #1) or by the internal meter configuration.

For example, suppose in a house there is an IED 2410 already installed (thing #1) and a new washing machine (thing #2) is put into service in the house. When the washing machine is turned on, the washing machine searches on the network for a meter and it finds IED 2410. The washing machine is interested in knowing information about harmonics and demand so it configures the IED 2410 (via a request or method) to periodically send this metering information to it (i.e., the washing machine) or under certain conditions. That is, washing machine (thing #2) configured IED 2410 (thing #1) to share metering data with the washing machine periodically. IED 2410 may then use POST methods to send the data to the washing machine over the network 2422. It is to be appreciated that many different types of POST functions are possible in accordance with the present disclosure. In one embodiment, if IED 2410 does not support reporting periodically, then the washing machine may periodically issue GET methods to retrieve the data as it needs it. In another embodiment, when the washing machine is put into service, the washing machine is configured to monitor any request made to it IED 2410 discovers the new washing machine (thing #2) and voluntary sends metering information to it. In this embodiment, it is up to the washing machine to use the data voluntarily sent to it by IED 2410 or not. In yet another embodiment, a user could manually configure IED 2410 and the washing machine to exchange or share data.

When acting as a client and sending resource information, IED 2410 can send resource information in any of 3 modes: (1) Isochronous; (2) Asynchronously; and (3) Queries. Isochronous POSTs occur when a specific resource is sent constantly with a predetermined period and with the best possible accuracy in the time to be sent (i.e., sending consumed energy every minute). Asynchronously POSTs occur when a resource is sent because the resource became available or because an associated event happened (e.g., sending harmonics data when the T.H.D value hits a configured value). It is to be appreciated that many different resources and associated events may be chosen. Queried POSTs occur when a specific resource becomes available and the resource is sent only once. Usually the latter is the result of a request made to the server when the data was not available, so it is a delayed response.

For IED 2410 to be identified within the network it is on (i.e., network 2422), IED 2410 is configured to tell other IoT devices (i.e., objects 2412, 2413, 2416, 2418, and 2420, or at least to any IoT devices requesting it specifically) about the capabilities, features, and resources of IED 2410. This is referred to as resource discovery.

Initially, when IED 2410 is connected to network 2422, other IoT devices (such as objects 2412, 2413, 2416, 2418, and 2420) will query IED 2410 for its resources (i.e., resource discovery occurs). Alternatively, when IED 2410 connects to network 2422, IED 2410 may be configured to send a list of its resources to other IoT devices or objects on network 2422 without receiving a query. Resource discovery allows other IoT devices (such as objects 2412, 2413, 2416, 2418, and 2420) on network 2422 to become aware of IED 2410 and how the data, capabilities and features of IED 2410 can be used. It is to be appreciated that not all the data, capabilities, and/or features will be suitable for all IoT devices on the network 2422. For example, an IoT device that counts how many times a door was opened may not care about IED 2410, but a solar charger may be interested in the current consumed by a house from the external power grid (which IED 2410 could measure and calculate).

The resource discovery is accessed using the GET method. For example, one exemplary GET command is: 'GET/.well-known/core'. It is to be appreciated that the GET method is described in greater detail below, and the './well-known/core string' is the standard URI (Uniform Resource Identifier) for retrieving resources and capabilities from an IoT device.

IED 2410 will respond to a resource discovery request with a list of all the available metering variables (e.g., Voltage, Current, Watts) as well as their branches (for Voltage: phaseAB, phaseBC, etc.). In one embodiment, the reply sent by IED 2410 is formatted as CoRE Format Link dictates and the reply will include resource type, interface, size and other attributes.

An example of a response to a resource discovery request sent by IED 2410 is '</sensors/voltage>;if="sensor",</sensors/current>;if="sensor" ', where in the response shown IED 2410 is reporting that there are two sensor nodes, one for voltage and the other for current. Furthermore, each of these nodes might have branches to be reported as '</sensors/voltage/phase/ab>; </sensors/voltage/phase/bc>'.

As stated above, IED 2410 supports several "methods." For example, the GET method or command is supported, where the GET method is used to get data. The GET command requests the IED 2410 to return a representation of the solicited data in the Requested-URI passed with the GET method. This is the standard form to place a request. If IED 2410 has the requested information, IED 2410 replies with the information immediately. If IED 2410 has no information ready, IED 2410 sends a response telling the client (i.e., objects 2412, 2413, 2416, 2418, and 2420) that the information will be sent later, so it will be scheduled to be sent by IED 2410 either after a predetermined time interval or when it becomes available. If IED 2410 does not know about the requested information (i.e., IED 2410 does not recognize the information that is being requested), IED 2410 will reply to the request with an error code. An example of the GET method requesting voltage on phase An would be: "GET/sensors/voltage/phase/an".

In one embodiment, the GET method also supports conditional requests. In this embodiment, reply information sent by IED 2410 to a conditional request received by IED 2410 is only sent if the request and/or the information passes or satisfies the condition in the request received by IED 2410. For example, "GET/sensors/voltage/phase/*?va<100", would return any voltage phase element which value is less than 100. It is to be appreciated that the above is merely an exemplary use of the GET method using a conditional request, and that that many other conditional requests are possible.

Another "method" that is supported by IED 2410 is the HEAD method. The HEAD method is similar to the GET method, however, when the HEAD method is used the HEAD method does not return actual data (i.e., IED 2410 does not send data to objects 2412, 2413, 2416, 2418, and 2420 after receiving the request). The HEAD method is used merely as a confirmation that the requested resources exist on IED 2410. For example, one of objects 2412, 2413, 2416, 2418, and 2420 may use the HEAD method to see if IED 2410 includes metering data that is useful to the object's operation. When the HEAD method is used by one of objects 2412, 2413, 2416, 2418, and 2420, the object using the HEAD method will merely receive a response from IED 2410 indicating whether IED 2410 has the information that was requested available, the object will not receive the actual information from IED 2410. It is to be appreciated that the HEAD method is used mostly to construct a list or tree of the available resources. It is to be appreciated that IED 2410 can also use the HEAD method to determine what resources other objects on network 2422 have.

Another "method" supported by IED 2410 is the POST method. Objects using the POST method send requests to IED 2410 to use the representation enclosed in the POST request. It is to be appreciated that most of the uses implemented for the POST method are related to settings parameters into IED 2410, but the actual function is determined by a related Uniform Resource Identifier (URI). As an example, a POST can be used by one of objects 2412, 2413, 2416, 2418, and 2420 to configure IED 2410 to send periodic information about a specific URI or resource, without the need of a request. It is to be appreciated that IED 2410 is configured to always respond to the POST with ok (code 200) if IED 2410 determines that the requested information is available to be sent or the appropriate error code if IED 2410 cannot parse the argument of the POST command or IED 2410 determines that the requested information will not become available at any point (i.e., IED 2410 does not have access to that type of information).

Another "method" supported by IED 2410 is the PUT method. The PUT method is used by objects (such as objects 2412, 2413, 2416, 2418, and 2420) to request IED 2410 to update or create a new resource. One use for the PUT method with IED 2410 is so the objects on a network (such as network 2422) can add a client (such as any of objects 2412, 2413, 2416, 2418, and 2420) to a list for periodic notification of a specific resource.

Another "method" supported by IED 2410 is the DELETE method. One use of the DELETE method with IED 2410, is to remove a client from a notification list, previously created with the PUT method.

Another "method" supported by IED 2410 is the CONNECT method. The CONNECT method has a special implementation. Since this method cannot currently be satisfied by an HTTP-CoAP proxy native function (as TLS to DTLS tunneling has not yet been specified) it is usually replied with 501 error code ("Not Implemented"), but one embodiment of IED 2410 uses a Key-Logging Schema for connecting (as will be described in greater detail below).

To access the resources of IED 2410, when the access level is set to the topmost value, the client (i.e., one of objects 2412, 2413, 2416, 2418, and 2420) may need to follow a procedure to gain access to IED 2410. This is referred to as a login procedure.

Initially, a client (such as one of objects 2412, 2413, 2416, 2418, and 2420) requests a list of the resources of IED 2410 (which is always available, using GET or HEAD methods). Then, the specific resource called ACCESS-KEY is used from a server (such as one of objects 2412, 2413, 2416, 2418, and 2420). This key and a preconfigured user name in IED 2410 are used to generate a Secure Hash Algorithm 1 (SHA1) token (160 bits), or any other known cryptographic hash token algorithm used for authentication, which is sent to IED 2410 using a POST method. If the token matches the one internally computed by IED 2410 based on the same user name and password, IED 2410 will allow all other requests from the originator device (i.e., the device or object that sent the original request). It is to be appreciated that the originator device is known because the IP address and port of the originator device is stored internally by IED 2410 with the successful login, and IED 2410 uses this information to match subsequent requests.

It is to be appreciated that, in one embodiment, IED 2410 is configured to allow all other requests from the originator device for 30 seconds since the last transaction and each subsequent transaction between IED 2410 and the originator device will renew this 30 second period of allowance. However, the allowance period (i.e., the period when IED 2410 will accept all requests from the originator device) will not be maintained more than 5 minutes after the original login. After the 5 minute window, a new login needs to be performed. It is to be appreciated that the allowance periods described above are merely exemplary and that many other allowance periods may be used as desired.

It is to be appreciated that any request made to IED 2410 to a resource that requires access (by means of login or registered access), if not allowed, will return error 401 (Unauthorized) (i.e., IED 2410 will inform the requesting device that it is not authorized to make the request).

It is to be appreciated that IED 2410 is configured such that operational parameters in IED 2410 cannot be changed through the IoT. Only parameters related to responses connected IoT client can be configured.

Below a table is shown that summarizes some of the error codes that IED 2410 can issue in the event of a failed request:

| Error Code | Name | Description |
|---|---|---|
| 2.01 | Created | The object (IoT device) was added to the list for notification. |
| 2.02 | Deleted | The object (IoT device) was removed from the list for notification. |
| 2.03 | Valid | The object is valid and exists in IED 2410. |
| 2.04 | Changed | The object exists and was updated in IED 2410. |
| 4.00 | Bad Request | Unknown Method |
| 4.01 | Unauthorized | Access level does not allow this request at this moment. |
| 4.02 | Bad Option | Option for condition or configuration is not valid. |
| 4.03 | Forbidden | This object cannot be modified or accessed. |
| 4.04 | Not Found | Unknown Resource or URI |
| 4.05 | Method Not Allowed | This method is not allowed at this moment |
| 4.06 | Not Acceptable | The URI condition is not acceptable. |
| 4.12 | Precondition Failed | A pre-requisite has not been executed. |
| 4.13 | Request Entity Too Large | The request is too large for the internal buffer. Split required. |
| 4.15 | Unsupported Content-Format | The POST or PUT arguments cannot be parsed. |

-continued

| Error Code Name | | Description |
| --- | --- | --- |
| 5.00 | Internal Server Error | Server error or Server too busy. |
| 5.01 | Not Implemented | Not implemented. |
| 5.02 | Bad Gateway | Configured gateway route is not IPv4 format. |
| 5.03 | Service Unavailable | Service is suspended or permanently disabled. |
| 5.04 | Gateway Timeout | Configured gateway route is not responding. |

Figure 25:
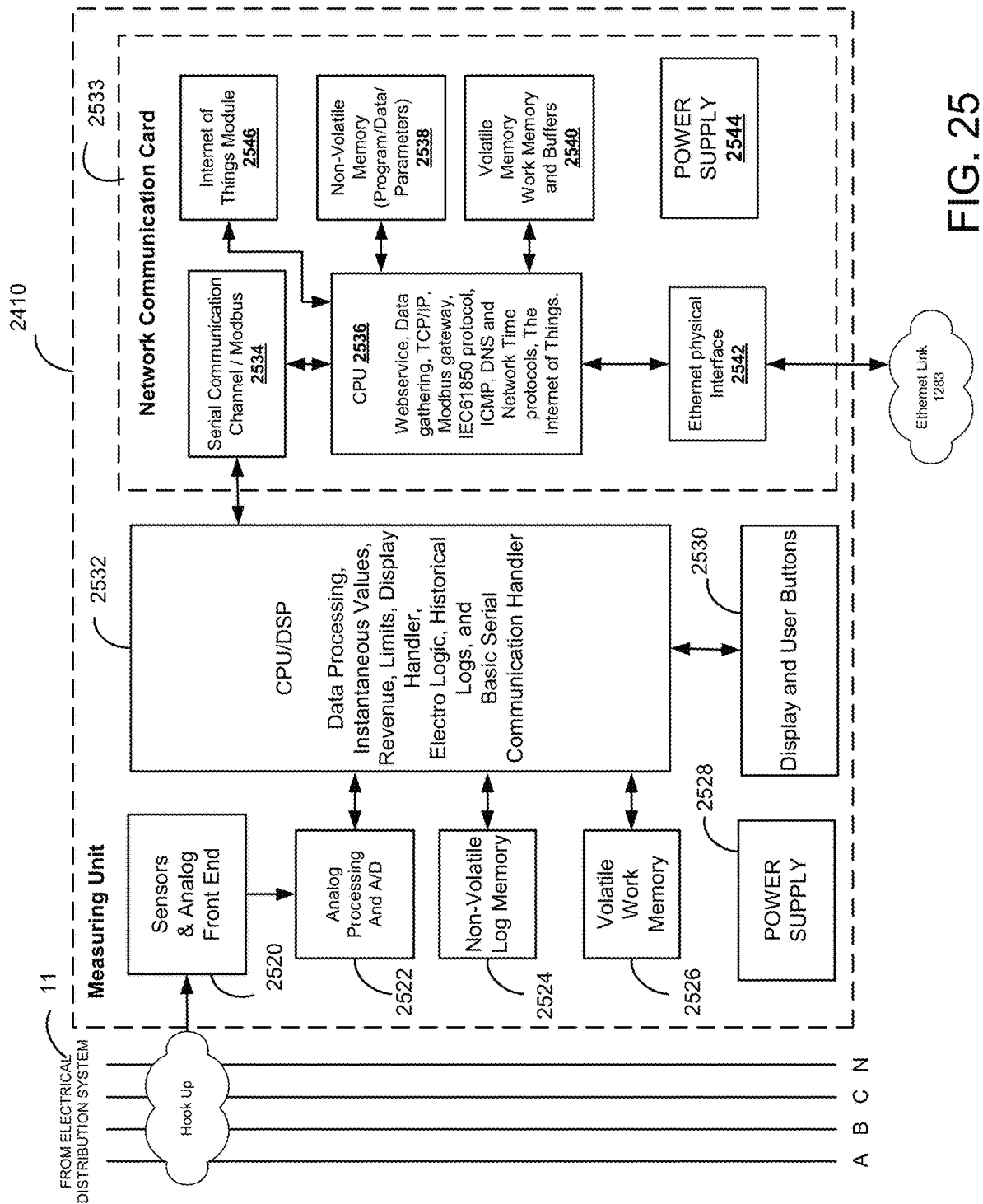
FIG. 25 is a block diagram another IED in accordance with an embodiment of the present disclosure.

Referring to FIG. 25, a block diagram of IED 2410 coupled to electrical distribution system 11 is shown in accordance with an embodiment of the present disclosure. IED 2410 includes at least one sensor & analog front end 2520, at least one analog processing and analog-to-digital (A/D) converter 2522, at least one non-volatile log memory 2524, at least one volatile work memory 2526, a power supply 2528, display and user buttons interface 2530, and a central processing unit (CPU) 2532. The CPU 2532 may be a processor, the functions of which may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

IED 2410 also includes a communication card 2533. The network communication card 2533 is shown to include, in one embodiment, a serial communication interface 2534 to communicate with CPU 2532, a CPU 2536, non-volatile memory 2538, volatile memory 2540, an Ethernet physical interface 2542, a power supply 2544, and an Internet of Things (IoT) module 2546. It is to be appreciated that IoT module 2546 may be implemented as firmware embedded into interface 2542. The Ethernet physical interface 2542 couples the measuring unit 2410 to at least one network, e.g., network 2422, via an Ethernet link 1283. It is to be appreciated that in one embodiment interface 2542 is configured for wireless connectivity with network 2422. Also, power supply 2544 in the network card 2533, for example, is a block that represents the conversion of the host provided voltage (5 VDC) from power supply 2528 into a voltage suited for the network card components, and electric isolation between both power rails.

In one embodiment, the IoT module 2546 is coupled to CPU 2536. The IoT module 2546 is configured to process IoT commands (i.e., GET, POST, HEAD, PUT, etc., described above) that are received via network 2422 from one of IoT objects 2412, 2413, 2416, 2418, and/or 2420. Furthermore, IoT module 2546 is configured to generate responses to commands sent to IED 2410, where the responses are sent to one or more of IoT objects 2412, 2413, 2416, 2418, and/or 2420. It is to be appreciated that IoT module 2546 is configured for use with each of the IoT protocols (e.g., CoAP, DDS, MQTT, XMPP, AQMP, Mosquito, etc.) described above. Furthermore, it is to be appreciated that IoT module 2546 is configured to provide an interface between objects or things on network 2422 and the components of IED 2410, such that, communication received from objects or things on network 2422 is received by IoT module 2546 and translated into a suitable protocol for CPU 2536, Serial Communication Channel/Modbus 2534, and/or other components of IED 2410. It is to be appreciated that, in one embodiment, IoT module 2546 may be included in CPU 2536 or interface 2542.

As described above, since IED 2410 is IoT compatible, any metering parameters (i.e., resources) sensed by IED 2410 via sensors 2520 may be shared with other IoT objects on network 2422 without human intervention. The metering parameters are measured by sensors 2520, converted from analog signals to digital signals in A/D converter 2522, and calculated in CPU 2532. Any calculated parameters in CPU 2532 (or that have been stored in memories 2524 or 2526) are available to CPU 2535 and IoT module 2546 and can then be shared with other IoT objects coupled to network 2422.

Figure 26:
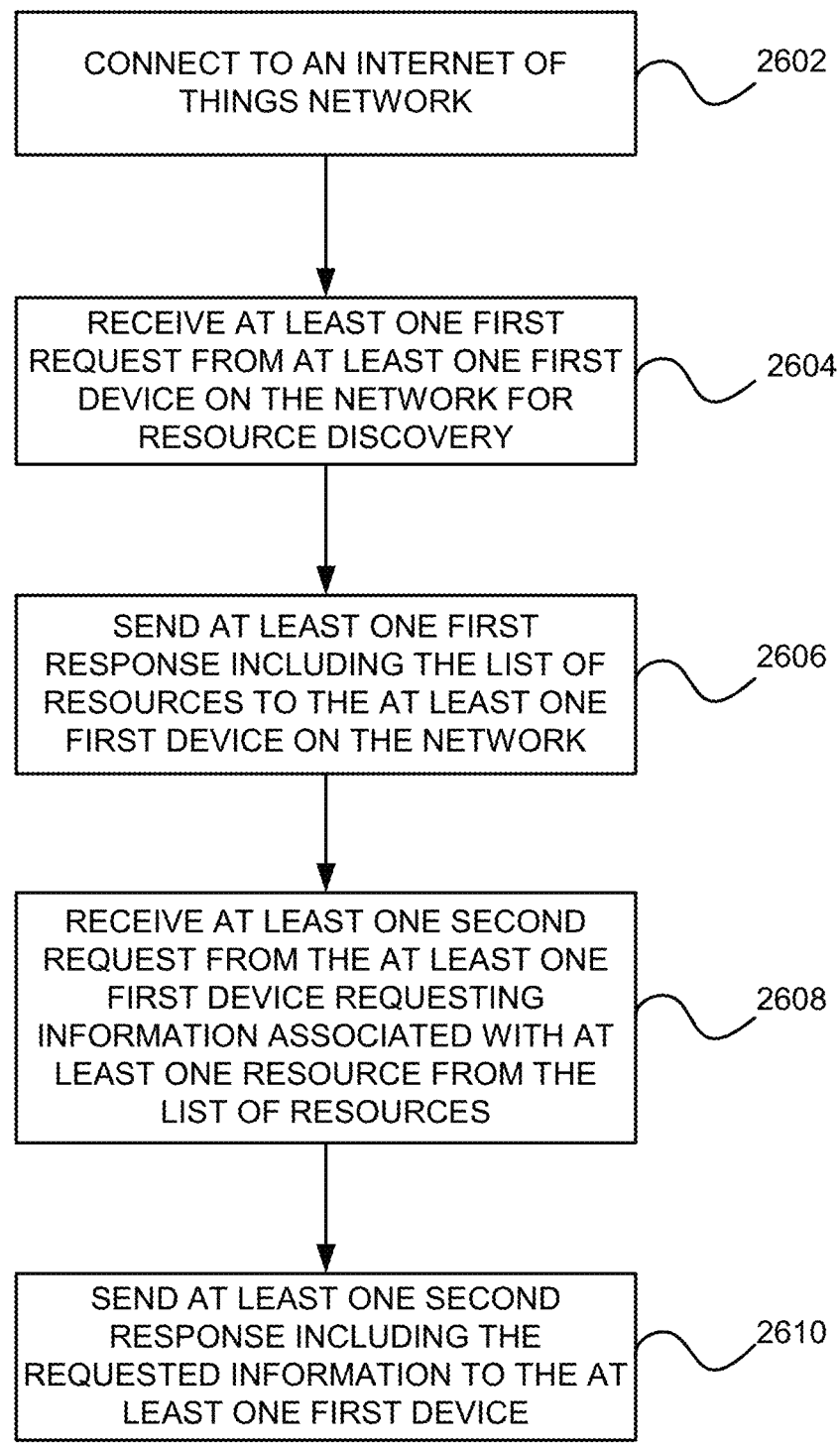
FIG. 26 is an exemplary flowchart illustrating the usage of the IED of FIG. 25 to communicate with IoT enabled objects in accordance with an embodiment of the present disclosure.

Referring to FIG. 26 a method for using IED 2410 in an IoT environment 2400 is shown in accordance with the present disclosure. Initially, IED 2410 connects to a network, such as an IoT network 2422, including a plurality of objects or IoT enabled devices, such as, objects 2412, 2413, 2416, 2418, and/or 2420, in step 2602. In step 2604, network communication card 2533 receives a first request (i.e., an IoT communication) from at least one first device or object on the network for IED 2410 to send the at least one first device or object a list of all of the resources of IED 2410 (i.e., resource discovery). In one embodiment, this mode of resource discovery is referred to as passive mode, where the other devices on the network are aware of the meter or IED 2410, or the other devices poll the network trying to find the meter or IED 2410. In a further embodiment, the resource discovery is active or in an active mode, i.e., the meter or IED 2410 broadcasts that it is present and it is a IoT device with some frequency (also known as self-publishing), usually in a range of milliseconds to days; so the other devices learn that the meter or IED 2410 is on the network and the other devices can ask the meter or IED 2410 for further information. The first request sent from the at least one first device or object is processed by CPU 2536 or IoT module 2546, where, as described above, CPU 2536 and/or IoT module 2546 is configured for IoT communication. The first request for a list of all of the resources of IED 2410 may then be sent to CPU 2532, where CPU 2532 will generate a first response including all known resources of IED 2410. It is to be appreciated that the list of resources may be stored in one of CPU 2532, memory 2524, and/or memory 2526. In another embodiment, the response may be generated by CPU 2536. The first response generated by CPU 2532 is then processed by CPU 2536 and/or IoT module 2546 in accordance with the IoT protocol being used for communication with the at least one first device and sent to the at least one first device via interface 2542 of card 2533, in step 2606.

It is to be appreciated that, in another embodiment, when IED 2410 connects to network 2422, IED 2410 is configured to automatically broadcast its resources over network 2422 via network communication card 2533. In this way, each IoT device or object on network 2422 is aware of IED 2410 and all of the resources of IED 2410 that may be used by the IoT devices or objects on network 2422.

In either case, after the at least one first device receives the list of available resources of IED 2410 included in the first response, the at least one first device may desire to receive information associated with one or more of the resources in the list of resources. In this way, the at least one first device sends at least one second request to IED 2410 for information associated with at least one resource and the at least one second request is received by network communication card 2533 via interface 2542, in step 2608.

As stated above, the IED 2410 is configured to support a plurality of "methods" or commands, such as, but not limited to GET, POST, PUT, HEAD, DELETE, CONNECT, etc., that may be included in an IoT communication. The methods or commands in a communication, for example, the at least one first or second request sent to IED 2410, may be parsed by one of CPU 2532, CPU 2536, and/or IoT 2546 so that IED 2410 may comply with the method or command in the first or second request. In this way, if the at least one second request received by IED 2410 in step 2608 includes a GET method or command for information associated with a first resource (e.g., voltage, current, or power measured on distribution system 11 by IED 2410), CPU 2532 may then retrieve the information associated with the first resource (e.g., a voltage, current, or power measurement for distribution system 11) and generate at least one second response to the at least one second request including the information retrieved by CPU 2532 and send the at least one second response to the at least one first device via network communication card 2533, in step 2610. After receiving the at least one second response from IED 2410, the at least one first device may use the information included in the at least one second response to change one operational parameter of the at least one second device (e.g., based on a current or voltage measurement measured by IED 2410 being above a predetermined threshold).

It is to be appreciated that if the at least one second request sent by the at least one first device includes a POST method or command for a first resource of IED 2410, CPU 2532 is configured to periodically generate responses including updated information associated with the resource and send the messages to the at least one first device, without needing to receive additional requests for the information associated with the resource from the at least one first device.

It is to be appreciated that if the at least one second request includes a GET method or command for information associated with a first resource of IED 2410, CPU 2532 may determine that the first resource is not available at this time, but will be available at a later time. In this scenario, CPU 2532 may schedule at least one second response including information associated with the first resource to be sent to the at least one first device when the information becomes available. Furthermore, as described above the GET method or command may include at least one condition. In this scenario CPU 2532 is configured to determine which information, if any, satisfies the condition and only include information satisfying the condition in the at least one second response to the at least one second request.

It is to be appreciated that if the at least one second request includes a HEAD method or command for a first resource of IED 2410, CPU 2532 is configured to determine if the first resource exists on the IED 2410. Based on the determination by CPU 2532, CPU 2532 is configured to generate the at least one second response to the at least one second request including a confirmation of the existence of the first resource.

It is to be appreciated that if the at least one second request includes a PUT method or command for a first resource, CPU 2532 is configured to add the at least one first device to a notification list associated with the first resource, where any device on the notification list will be sent periodic notification including updates for the information associated with the first resource. The periodic notifications are generated by CPU 2532 and sent to the at least one first device via network communication card 2533.

After being added to the notification list, the at least one first device may send at least one third request to IED 2410 including a DELETE method or command. When network communication card 2533 receives the at least one third request including the DELELTE method or command, the request will be provided to CPU 2532 (and/or CPU 2536 or IoT module 2546), where CPU 2532 will remove the at least one first device from the notification list.

It is to be appreciated that in one embodiment, IED 2410 and each object or thing on network 2422 may be in communication with a dashboard or web application hosted on a server (i.e., cloud-based software) existing on, or otherwise coupled to, network 2422. It is to be appreciated that, in other embodiments, the dashboard or web application may be hosted in a memory or processor of IED 2410. IED 2410 and each object or thing on network 2422 may provide information or resources related to each of IED 2410, the object or things on network 2422, or other relevant information gathered, to the dashboard or web application. It is to be appreciated that the dashboard or web application may itself act as an object or things configured for IoT communication with IED 2410 and the objects or things on network 2422. Furthermore, the dashboard or web application described above may be configured to send/receive one or more of the methods or commands (e.g., GET, POST, etc.) described above to/from IED 2410 and/or the objects or things on network 2422. The information provided to the dashboard or web application by IED 2410 and the objects or things on network 2422 is then presented in a graphical user interface of the dashboard or web application that can be accessed by an authorized user to retrieve desired information relating to network 2422, IED 2410, and/or objects or things on network 2422.

In another embodiment, the IED 2410 may include a web service interface coupled to the dashboard or web application described above. The web service interface may be similar to the web interface 204 in U.S. patent application Ser. No. 14/742,302, the contents of which are incorporated herein by reference. The web service interface of IED 2410 may allow the dashboard or web application to access one or more internal resources and/or dynamic resources of the IED 2410.

Figure 27:
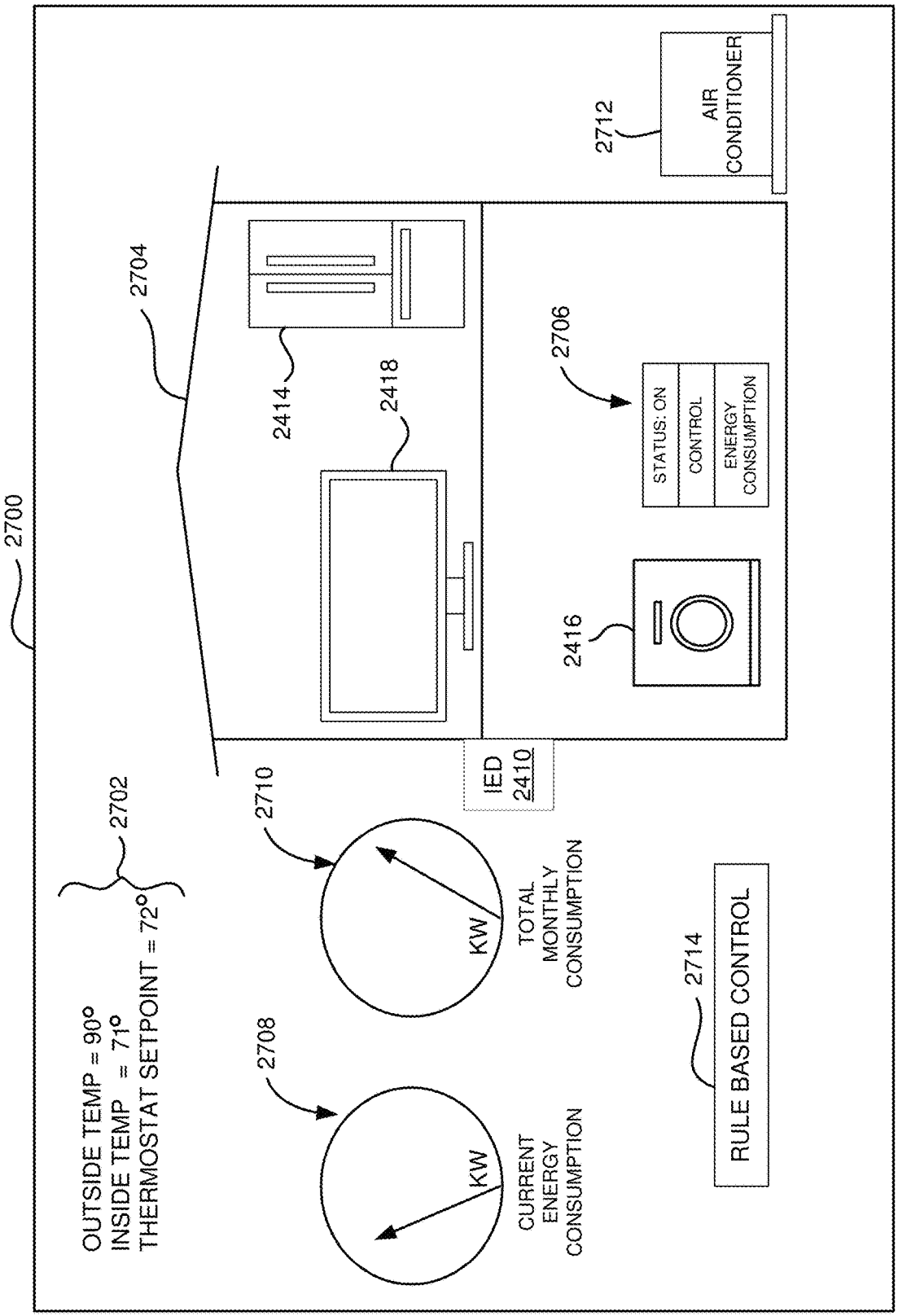
FIG. 27 is an exemplary dashboard interface in accordance with an embodiment of the present disclosure.

Referring to FIG. 27, an exemplary dashboard interface 2700 is shown in accordance with an embodiment of the present disclosure. It is to be appreciated that, as stated above, dashboard interface 2700 may be a web page or application hosted by a memory and/or processor of IED 2410 or alternatively dashboard interface 2700 may be a web page or application hosted on a remote server coupled to network 2422.

The dashboard interface 2700 may include a wide variety of information related to the objects or things coupled to network 2422, where the information is presented to the user in dashboard interface 2700. For example, a representation of a home or facility 2704 may be shown in interface 2700, where home or facility 2704 will also include representations of the objects or things on network 2422 and in home or facility 2704. As shown in FIG. 27, representations for IED 2410, TV 2418, refrigerator 2414, laundry machine

2416, and an air conditioner 2712 are included in the representation of home or facility 2704.

In one embodiment, each of the objects shown in home or facility 2704 are selectable by a user accessing interface 2700, such that, when an object is selected within interface 2700 additional information/options 2706 may "pop up" or be generated and shown within interface 2700, where the additional information/options 2706 relate to the selected object or thing. For example, in FIG. 27, laundry machine 2416 has been selected by the user, and, in response to the user's selection, additional information/options 2706 relating to laundry machine 2416 is shown within interface 2700. The additional information/options 2706 may include a wide variety of information and options related to the selected object. In one non-limiting embodiment, the additional information/option 2706 may include status information (i.e., indicating if the object 2416 is currently on), a control button (e.g., directing the user to control options for object 2416, for example, to turn object 2416 on or off or put object 2416 on a schedule, etc.), and energy consumption (i.e., how much energy object 2416 is currently consuming (calculated by the object 2416 and/or IED 2410)). It is to be appreciated that additional information/options 2706 may include many more types of controls and/or information in accordance with the present disclosure.

In one embodiment, dashboard interface 2700 may include additional information that is relevant to the user regarding the user's home or facility 2704 and the objects or things within the home or facility 2704. For example, as shown in FIG. 27, information 2702 may be pooled or requested (by dashboard 2700) from a thermostat acting as an object or thing within home 2704 (or another object or thing in home 2704 that has the requested information), where information 2702 includes the temperature outside the home or facility 2704 (as measured by the thermostat, IED 2410, and/or another object or sensor coupled to an object), the temperature inside the home (again, as measured by the thermostat, IED 2410, and/or another object or sensor coupled to an object), and the current thermostat setpoint. Dashboard interface 2700 may also include power consumption 2708, 2710 information calculated by IED 2410 relating to home or facility 2704. For example, dashboard interface 2700 may include the current or present energy consumption 2708 and the total monthly power consumption of home or facility 2704 (as measured by IED 2410). It is to be appreciated that many other types of information may be shown in dashboard interface 2700 in accordance with the present disclosure. It is also to be appreciated that the information needed to generate dashboard interface 2700 may be periodically sent to dashboard interface 2700 by the objects or things coupled to network 2422 or dashboard interface 2700 may actively request the information according to the user-selected settings of dashboard interface 2700.

In another embodiment, dashboard interface 2700 may include a selectable button 2714 to enable rule based control of the objects or things coupled to network 2422 and present in home or facility 2704. In one embodiment, when a user selects button 2714, the user is given configurable options for rules and/or control parameters to be sent from dashboard interface 2700 to the objects or things coupled to network 2422. For example, the user may place certain restrictions on when (i.e., time and/or according to different user-selectable conditions) certain objects or things are to be turned on (i.e., allowed to consume power) and off, when notifications regarding an object or thing are to be received, etc. In another example, a load shedding program may be implemented, i.e., certain non-essential loads as defined by the user may be turned off when energy consumption reaches a predetermined threshold. It is to be appreciated that many rule based control parameters may be set by the user for objects or things coupled to network 2422 via dashboard 2700.

It is to be appreciated that dashboard 2700 may be configured for IoT communication with and control of the objects or things coupled to network 2422 in any one of the protocols described above.

In one embodiment, the present disclosure includes an intelligent electronic device (IED) comprising: at least one sensor coupled to an electrical distribution system, the at least one sensor configured to measure at least one parameter of the electrical distribution system and generate at least one analog signal indicative of the at least one parameter; at least one analog-to-digital (A/D) converter configured to receive the at least one analog signal and convert the at least one analog signal to at least one digital signal; at least one processor configured to receive the at least one digital signal and calculate at least one power parameter of the electrical distribution system; and a network communication card configured for Internet of Things (IoT) communication and coupled to a network, wherein the network communication card receives at least one first request from at least one first device coupled to the network requesting a list of all available resources of the IED, wherein the at least one processor generates at least one first response including a list of all available resources of the IED to the at least one first request and the network communication card sends the at least one first response to the at least one first device.

In another embodiment, the IED is included wherein the network communication card receives at least one second request from the at least one device requesting information associated with at least one resource of IED, and the at least one processor generates at least one second response to the at least one first request with the information related to the at least one resource, and the network communication card sends the at least one second response to the at least one first device.

In another embodiment, the IED is included wherein the at least one resource is at least one power parameter calculated by the at least one processor.

In another embodiment, the IED is included wherein the at least one second request includes a condition, and the at least one processor is configured include only information satisfying the condition in the at least one second response.

In another embodiment, the IED is included wherein the at least one processor generates at least one second request requesting information associated with at least one resource from the at least one first device, and the network communication card sends the at least one second request to the at least one first device and receives at least one second response from the at least one first device including information associated with the at least one resource of the at least one first device.

In another embodiment, the IED is included wherein the network communication card receives at least one second request requesting a confirmation that a requested resource exists on the IED, and the at least one processor determines if the requested resource exists on the IED and generates at least one second response confirming or denying the existence of the requested recourse, and the at least one communication card sends the at least one second response to the at least one first device.

In another embodiment, the IED is included wherein the network communication card receives at least one second request from the at least one first device to add the at least one first device to a notification list stored in a memory of the IED, the notification list associated with receiving periodic notifications including information associated with at least one resource of the IED, and the at least one processor is configured to periodically generate notifications including information associated with the at least one resource at predetermined intervals, and the network communication card sends each notification to the at least one first device at the predetermined intervals.

In another embodiment, the IED is included wherein the network communication card receives at least one third request from the at least one first device requesting the at least one first device to remove the at least one first device from the notification list, and the at least one processor removes the at least one first device from the at least one notification list in response to the at least one third request.

In another embodiment, the IED is included wherein the network communication card receives at least one second request from the at least one first device requesting information associated with at least one resource of the IED and the at least one processor determines that the IED does not currently have the requested information, and scheduling at least one second response to be sent to the at least one first device when the requested information becomes available.

In another embodiment, the IED is included wherein the IoT communication operates in accordance with at least one of Constrained Application Protocol, Simple Object Access Protocol, Constrained RESTful Environment, MQTT, Data Distribution Service Protocol, Extensible Messaging and Presence Protocol, Advanced Message Queuing Protocol, Mosquito, M3DA, Internet Protocol for Smart Objects, and/or Wolfram.

In another embodiment, the IED is included wherein the at least one first request is at least one of a GET, HEAD, POST, PUT, DELETE and/or CONNECT command.

In another embodiment, the IED is included wherein the at least one first response is at least one of a GET, HEAD, POST, PUT, DELETE and/or CONNECT command.

In another embodiment, the present disclosure includes a method comprising: connecting, by a network communication card, to a network, the network communication card configured for Internet of Things (IoT) communication; receiving, by the network communication card, at least one first request from at least one first device connected to the network requesting a list of all available resources of an intelligent electronic device (IED), the at least one first device also configured for IoT communication; generating, by at least one processor, at least one first response including a list of all available resources of the IED to the at least one first request; and sending, by the network communication card, the at least one first response to the at least one first device.

In another embodiment, the method includes: receiving, by the network communication card, at least one second request from the at least one first device requesting information associated with at least one resource of IED; generating, by the at least one processor, at least one second response to the at least one first request with the information related to the at least one resource; and sending, by the network communication card, the at least one second response to the at least one first device.

In another embodiment, the method includes wherein the at least one resource is at least one power parameter of an electrical distribution system that is calculated by the at least one processor.

In another embodiment, the method includes wherein the at least one second request includes a condition, and the at least one processor is configured include only information satisfying the condition in the at least one second response.

In another embodiment, the method includes: generating, by the at least one processor, at least one second request requesting information associated with at least one resource from the at least one first device; sending, by the network communication card, the at least one second request to the at least one first device; and receiving, by the network communication card, at least one second response from the at least one first device including information associated with the at least one resource of the at least one first device.

In another embodiment, the method includes: receiving, by the network communication card, at least one second request requesting a confirmation that a requested resource exists on the IED; determining, by the at least one processor, if the requested resource exists on the IED; generating, by the at least one processor, at least one second response confirming or denying the existence of the requested recourse; and sending by the network communication card, the at least one second response to the at least one first device.

In another embodiment, the method includes: receiving, by the network communication card, at least one second request from the at least one first device to add the at least one first device to a notification list stored in a memory of the IED, the notification list associated with receiving periodic notifications including information associated with at least one resource of the IED; generating, by the at least one processor, notifications including information associated with the at least one resource periodically at predetermined intervals; and sending, by the network communication card, each notification to the at least one first device at the predetermined intervals.

In another embodiment, the method includes: receiving, by the network communication card, at least one third request from the at least one first device requesting the at least one first device to remove the at least one first device from the notification list; and removing, by the at least one processor, the at least one first device from the at least one notification list in response to the at least one third request.

In another embodiment, the method includes: receiving, by the network communication card, at least one second request from the at least one first device requesting information associated with at least one resource of the IED; determining, by the at least one processor, that the IED does not currently have the requested information; and scheduling, by the at least one processor, at least one second response to be sent to the at least one first device when the requested information becomes available.

In another embodiment, the method includes wherein the IoT communication operates in accordance with at least one of Constrained Application Protocol, Simple Object Access Protocol, Constrained RESTful Environment, MQTT, Data Distribution Service Protocol, Extensible Messaging and Presence Protocol, Advanced Message Queuing Protocol, Mosquito, M3DA, Internet Protocol for Smart Objects, and/or Wolfram.

In another embodiment, the method includes wherein the at least one first request is at least one of a GET, HEAD, POST, PUT, DELETE and/or CONNECT command.

In another embodiment, the method includes wherein the at least one first response is at least one of a GET, HEAD, POST, PUT, DELETE and/or CONNECT command.

In another embodiment, the present disclosure includes a system comprising: a network; at least one first device coupled to the network and configured for IoT communication, wherein the at least one first device is configured to send at least one first request to at least one intelligent electronic device (IED) requesting a list of all available resource of the IED; the least one IED including: at least one sensor coupled to an electrical distribution system, the at least one sensor configured to measure at least one parameter of the electrical distribution system and generate at least one analog signal indicative of the at least one parameter; and at least one analog-to-digital (A/D) converter configured to receive the at least one analog signal and convert the at least one analog signal to at least one digital signal; at least one processor configured to receive the at least one digital signal and calculate at least one power parameter of the electrical distribution system; and a network communication card configured for Internet of Things (IoT) communication, the network communication card coupled to the network, wherein the network communication card receives the at least one first request from the at least one first device and the at least one processor generates at least one first response to the at least one first request and the network communication card sends the at least one first response to the at least one first device, the at least one first response including a list of all available resources of the at least one IED, and wherein the at least one first device receives the at least one first response.

In another embodiment, the system includes wherein the at least one first device send a second request to the at least one IED requesting information associated with at least one resource of the IED and the network communication card receives the at least one second request, and the at least one processor generates at least one second response to the at least one second request with the information related to the at least one resource, and the network communication card sends the at least one second response to the at least one first device.

In another embodiment, the system includes wherein the at least one first device receives the at least one second response and changes an operational parameter of the at least one first device in response to the information received from the at least one IED in the at least one second response.

In another embodiment, the system includes wherein the IoT communication operates in accordance with at least one of Constrained Application Protocol, Simple Object Access Protocol, Constrained RESTful Environment, MQTT, Data Distribution Service Protocol, Extensible Messaging and Presence Protocol, Advanced Message Queuing Protocol, Mosquito, M3DA, Internet Protocol for Smart Objects, and/or Wolfram.

In another embodiment, the system includes wherein the at least one first request is at least one of a GET, HEAD, POST, PUT, DELETE and/or CONNECT command.

In another embodiment, the system includes wherein the at least one first response is at least one of a GET, HEAD, POST, PUT, DELETE and/or CONNECT command.

It is to be appreciated that the various features shown and described are interchangeable, that is a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An intelligent electronic device (IED) comprising:
a housing;
at least one sensor disposed in the housing and coupled to at least one power line of an electrical distribution system, the at least one sensor configured to measure at least one parameter of the electrical distribution system and generate at least one analog signal indicative of the at least one parameter;
at least one analog-to-digital (A/D) converter disposed in the housing and configured to receive the at least one analog signal and convert the at least one analog signal to at least one digital signal;
at least one first processor disposed in the housing and configured to receive the at least one digital signal and calculate at least one power parameter of the electrical distribution system; and
a network communication card including at least one second processor and an Internet of Things (IoT) communication module disposed in the housing and coupled to a network, wherein the IoT communication module is configured to discover one or more devices coupled to the network,
wherein the network communication card is configured to send a list of all available resources of the IED to the one or more devices on the network without receiving a query, the list of all available resources including metering variables and any associated branches without specific values,
wherein the IED is configured to host a dashboard accessible by a remote user device, the dashboard including a graphical user interface that displays a representation of the IED, at least one parameter of the IED, a representation of the one or more devices and at least one parameter of the one or more devices, the graphical user interface further configured to enable a user to set at least one rule-based control parameter from the remote user device for controlling at least one first device based on at least one resource of the IED, the at least one second processor of the IED configured to generate at least one command based on the at least one rule-based control parameter based on the at least one resource of the IED exceeds a threshold and transmit the at least one command to the at least one first device via the IoT communication module of the IED, wherein the network communication card is configured to receive a HEAD request from the at least one device requesting whether the IED has metering data useful to an operation of the device and the network communication card is configured to submit a HEAD response indicating whether the requested information is available without sending the actual information, wherein the HEAD response includes metering variables and any associated branches without specific values, wherein the dashboard interface is configured to display the metering variables and any associated branches associated with the operation of the at least one device, and wherein the information needed to generate the dashboard interface may be periodically sent to the dashboard by the device and the dashboard may actively request the information on a periodic basis without a request from the remote user device.

2. The IED of claim 1, wherein the IoT communication module is configured to receive at least one request from the at least one device requesting information associated with at least one resource of the IED, and the IED generates a response to the at least one request with the information related to the at least one resource, and the IoT communication module sends the response to the at least one first device, and wherein the response includes specific values.

3. The IED of claim 2, wherein the at least one resource is at least one power parameter calculated by the at least one first processor.

4. The IED of claim 2, wherein the at least one request includes a condition, and the at least one first processor is configured to include only information satisfying the condition in the at least one second response.

5. The IED of claim 2, wherein the IoT communication module receives at least one second request from the at least one first device to add the at least one first device to a notification list stored in a memory of the IED, the notification list associated with receiving periodic notifications including information associated with at least one resource of the IED, and the at least one first processor is configured to periodically generate notifications including information associated with the at least one resource at predetermined intervals, and the IoT communication module sends each notification to the at least one first device at the predetermined intervals.

6. The IED of claim 5, wherein the IoT communication module receives at least one third request from the at least one first device requesting the at least one first device to remove the at least one first device from the notification list, and the at least one first processor removes the at least one first device from the at least one notification list in response to the at least one third request.

7. The IED of claim 2, wherein the at least one request is at least one of a GET, HEAD, POST, PUT, DELETE and/or CONNECT command.

8. The IED of claim 1, wherein the IED generates at least one request requesting information associated with at least one resource from the at least one first device, and the IoT communication module sends the at least one request to the at least one first device and receives at least one second response from the at least one first device including information associated with the at least one resource of the at least one first device.

9. The IED of claim 1, wherein the IoT communication module receives at least one request from the at least one first device requesting information associated with at least one resource of the IED and the at least one first processor determines that the IED does not currently have the requested information, and scheduling at least one response to be sent to the at least one first device when the requested information becomes available.

10. The IED of claim 1, wherein the IoT communication operates in accordance with at least one of Constrained Application Protocol, Simple Object Access Protocol, Constrained RESTful Environment (CORE), Message Queuing Telemetry Transport (MQTT), Data Distribution Service Protocol, Extensible Messaging and Presence Protocol, Advanced Message Queuing Protocol, Mosquito, M3DA, Internet Protocol for Smart Objects (IPSO), and/or Wolfram.

11. The IED of claim 1, wherein the available resources of the IED are automatically broadcasted over the network.

12. A system comprising,
a network;
a plurality of devices coupled to the network and configured for Internet of Things (IoT) communication, wherein at least one first device is configured to send at least one first request to at least one electronic metering device requesting a list of all available resource of the electronic metering device;
the at least one electronic metering device including:
a housing;
at least one sensor disposed in the housing and coupled to at least one power line of an electrical distribution system, the at least one sensor configured to measure at least one parameter of the electrical distribution system and generate at least one analog signal indicative of the at least one parameter; and
at least one analog-to-digital (A/D) converter disposed in the housing and configured to receive the at least one analog signal and convert the at least one analog signal to at least one digital signal;
at least one first processor disposed in the housing and configured to receive the at least one digital signal and calculate at least one power parameter of the electrical distribution system; and
a network communication card including a IoT communication module disposed in the housing and configured for IoT communication with the plurality of devices, the IoT communication module coupled to the network, wherein the IoT communication module discovers the plurality of devices and receives the at least one first request from the at least one first device and the at least one first processor generates at least one first response to the at least one first request and the IoT communication module sends the at least one first response to the at least one first device, the at least one first response including a list of all available resources of the at least one electronic metering device without specific values, and
wherein the at least one first device receives the at least one first response,
wherein the network communication card is configured to receive a HEAD request from the at least one device requesting whether the least one electronic metering device has metering data useful to an operation of the device and the network communication card is configured to submit a HEAD response indicating whether the requested information is available without sending the actual information, wherein the HEAD response includes metering variables and any associated branches without specific values, wherein at least one electronic metering device is configured to host a dashboard accessible by a remote user device, the dashboard including a graphical user interface that displays a representation of each of the plurality of devices, a representation of the at least one electronic metering device, at least one parameter of the at least one electronic metering device, a representation of the at least one first device and at least one parameter of the at least one device, wherein the graphical user interface is further configured to enable the remote user device to set at least one rule-based control parameter from the remote user device for controlling the at least one first device based on at least one resource of the electronic metering device, the at least one first processor of the least one electronic metering device configured to generate at least one command based on if the at least one rule-based control parameter based on the at least one resource of the at least one electronic metering device exceeds a threshold and transmit the at least one command to the at least one first device via the IoT communication module of the least one electronic metering device, wherein the dashboard interface is configured to display the metering variables and any associated branches associated with the operation of the at least one device, and wherein the information needed to generate the dashboard interface may be periodically sent to the dashboard by the device and the dashboard may actively request the information on a periodic basis without a request from the remote user device.

13. The system of claim 12, wherein the at least one first device is configured to send a second request to the at least one electronic metering device requesting information associated with at least one resource of the electronic metering device and the IoT communication module receives the at least one second request, and the at least one first processor generates at least one second response to the at least one second request with the information related to the at least one resource, and the IoT communication module sends the at least one second response to the at least one first device.

14. The system of claim 13, wherein the at least one first device receives the at least one second response and changes an operational parameter of the at least one first device in response to the information received from the at least one electronic metering device in the at least one second response.

15. The system of claim 13, wherein the at least one first device is configured to send the first request and the second request without human intervention.

16. The system of claim 12, wherein the IoT communication operates in accordance with at least one of Constrained Application Protocol, Simple Object Access Protocol, Constrained RESTful Environment (CoRE), Message Queuing Telemetry Transport (MQTT), Data Distribution Service Protocol, Extensible Messaging and Presence Protocol, Advanced Message Queuing Protocol, Mosquito, M3DA, Internet Protocol for Small Objects (IPSO), and/or Wolfram.

17. The system of claim 12, wherein the at least one first request is at least one of a GET, HEAD, POST, PUT, DELETE and/or CONNECT command.

18. The system of claim 12, wherein the at least one first request is sent without human intervention.

19. The system of claim 12, wherein the at least one first device is configured to send the at least one first request without human intervention.

* * * * *